(12) United States Patent
Zenoff

(10) Patent No.: US 10,606,543 B2
(45) Date of Patent: Mar. 31, 2020

(54) SYSTEMS FOR DISPLAYING MEDIA ON DISPLAY DEVICES

(71) Applicant: Beam Authentic, Inc., San Anselmo, CA (US)

(72) Inventor: Andrew Zenoff, San Anselmo, CA (US)

(73) Assignee: BEAM Authentic, Inc., San Anselmo, CA (US)

( * ) Notice: Subject to any disclaimer, the term of this patent is extended or adjusted under 35 U.S.C. 154(b) by 135 days.

(21) Appl. No.: 15/897,160

(22) Filed: Feb. 15, 2018

(65) Prior Publication Data
US 2018/0173488 A1 Jun. 21, 2018

Related U.S. Application Data

(63) Continuation of application No. 14/827,101, filed on Aug. 14, 2015, now abandoned.

(60) Provisional application No. 62/038,047, filed on Aug. 15, 2014, provisional application No. 62/038,053, filed on Aug. 15, 2014.

(51) Int. Cl.
G06F 3/14 (2006.01)
H04N 9/31 (2006.01)
G06F 3/147 (2006.01)
G06F 17/24 (2006.01)
H04L 29/08 (2006.01)

(52) U.S. Cl.
CPC ............ *G06F 3/1454* (2013.01); *G06F 3/147* (2013.01); *G06F 17/248* (2013.01); *H04N 9/3173* (2013.01); *H04L 67/306* (2013.01)

(58) Field of Classification Search
CPC ...................................................... G06F 3/1454
USPC ............................................................ 715/734
See application file for complete search history.

(56) References Cited

U.S. PATENT DOCUMENTS

| 4,924,613 | A | 5/1990 | Levin |
| 5,167,559 | A | 12/1992 | Power-Fardy |
| 5,437,062 | A | 8/1995 | Douglas |
| 5,454,120 | A | 10/1995 | Rowlands |

(Continued)

FOREIGN PATENT DOCUMENTS

| CN | 203327079 U | 12/2013 |
| WO | WO 0072723 A1 | 12/2000 |

(Continued)

OTHER PUBLICATIONS

Alibaba.com. Mobile billboard advertising led truck new technology product in china mobile truck led tv screen. 2015, 14 Pages, Available at http://www.alibaba.com/product-detail/mobile-billboard-advertising-led-truck-new_60181386676.html. Accessed on Jul. 24, 2015.

(Continued)

*Primary Examiner* — William D Titcomb

(57) ABSTRACT

The present disclosure provides methods and computer systems for displaying or projecting media on a remote visual curvilinear display. In a computer system, a computer server may be in network communication with a mobile electronic device of a user. A selection of the media may be received at a computer server from the mobile electronic device. The media may be provided from the computer server for display or projection on the remote visual curvilinear display per a display and/or location preference or schedule.

20 Claims, 52 Drawing Sheets

(56) References Cited

U.S. PATENT DOCUMENTS

| | | |
|---|---|---|
| 5,462,471 A | 10/1995 | Power-Fardy |
| 5,548,847 A | 8/1996 | Spicijaric |
| 5,632,044 A | 5/1997 | Sloot |
| 5,794,267 A | 8/1998 | Wallace |
| 5,943,698 A | 8/1999 | Blanks, I |
| 6,154,992 A | 12/2000 | Lee |
| 6,323,846 B1 | 11/2001 | Westerman et al. |
| 6,470,499 B1 | 10/2002 | Joiner |
| 6,570,557 B1 | 5/2003 | Westerman et al. |
| 6,677,932 B1 | 1/2004 | Westerman et al. |
| 6,677,936 B2 | 1/2004 | Jacobsen et al. |
| 6,751,805 B1 | 6/2004 | Austion |
| 6,810,533 B1 | 11/2004 | Nahabedian et al. |
| 7,030,855 B2 | 4/2006 | Metcalf |
| 7,331,064 B1 | 2/2008 | Quintal |
| 7,519,703 B1 | 4/2009 | Stuart et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,787,240 B2 | 8/2010 | Swain |
| 7,844,914 B2 | 11/2010 | Andre et al. |
| D635,976 S | 4/2011 | Lee et al. |
| 8,006,002 B2 | 8/2011 | Kalayjian et al. |
| D647,286 S | 10/2011 | Malek |
| 8,239,784 B2 | 8/2012 | Hotelling et al. |
| 8,279,180 B2 | 10/2012 | Hotelling et al. |
| 8,364,220 B2 | 1/2013 | Sandmore |
| 8,381,135 B2 | 2/2013 | Hotelling et al. |
| 8,453,265 B2 | 6/2013 | Forte et al. |
| 8,479,122 B2 | 7/2013 | Hotelling et al. |
| 8,530,074 B2 | 9/2013 | Krammer |
| 8,600,430 B2 | 12/2013 | Herz et al. |
| 8,626,586 B1 | 1/2014 | Biere et al. |
| D701,504 S | 3/2014 | Christopher et al. |
| 8,677,515 B2 | 3/2014 | Ishihara et al. |
| D703,069 S | 4/2014 | Adams et al. |
| 8,762,201 B1 | 6/2014 | Noonan |
| D710,220 S | 8/2014 | Daniel |
| D711,002 S | 8/2014 | Ohnemus et al. |
| 8,869,312 B2 | 10/2014 | Tuohy et al. |
| 8,884,874 B1 * | 11/2014 | Kim ................. G06F 3/017 345/156 |
| D718,731 S | 12/2014 | Lee et al. |
| D729,650 S | 5/2015 | Phillips et al. |
| D733,130 S | 6/2015 | Kim et al. |
| D734,329 S | 7/2015 | Lee |
| D736,768 S | 8/2015 | Kuwabara et al. |
| 2002/0015027 A1 | 2/2002 | Lee et al. |
| 2002/0167483 A1 | 11/2002 | Metcalf |
| 2003/0073412 A1 | 4/2003 | Meade |
| 2003/0184575 A1 | 10/2003 | Reho et al. |
| 2005/0071418 A1 | 3/2005 | Kjellberg et al. |
| 2005/0264558 A1 | 12/2005 | Vesely et al. |
| 2006/0026536 A1 | 2/2006 | Hotelling et al. |
| 2006/0033724 A1 | 2/2006 | Chaudhri et al. |
| 2006/0117458 A1 | 6/2006 | Ishihara et al. |
| 2006/0197753 A1 | 9/2006 | Hotelling |
| 2006/0209218 A1 | 9/2006 | Lee et al. |
| 2007/0106950 A1 | 5/2007 | Hutchinson et al. |
| 2007/0182664 A1 | 8/2007 | Himmele |
| 2007/0247312 A1 | 10/2007 | Sekine |
| 2008/0040354 A1 | 2/2008 | Ray et al. |
| 2008/0109242 A1 | 5/2008 | Shear et al. |
| 2008/0204440 A1 | 8/2008 | Swain |
| 2009/0136212 A1 | 5/2009 | Klein |
| 2009/0179867 A1 | 7/2009 | Shim et al. |
| 2009/0251888 A1 | 10/2009 | Douglas |
| 2009/0310290 A1 | 12/2009 | Tennent |
| 2009/0322740 A1 | 12/2009 | Carlson |
| 2010/0070925 A1 | 3/2010 | Einaudi et al. |
| 2010/0095573 A1 | 4/2010 | Lifshitz |
| 2010/0100004 A1 | 4/2010 | van Someren |
| 2010/0131613 A1 | 5/2010 | Jonsson et al. |
| 2010/0235245 A1 | 9/2010 | Grossman et al. |
| 2010/0292886 A1 | 11/2010 | Szczerba et al. |
| 2010/0306808 A1 | 12/2010 | Neumeier et al. |
| 2011/0041238 A1 | 2/2011 | Brzoska |
| 2011/0113354 A1 | 5/2011 | Thiyagarajan et al. |
| 2011/0187681 A1 | 8/2011 | Kim et al. |
| 2011/0199389 A1 | 8/2011 | Lu et al. |
| 2011/0246908 A1 | 10/2011 | Akram et al. |
| 2011/0295749 A1 | 12/2011 | Scalisi |
| 2012/0005809 A1 | 1/2012 | Johnson |
| 2012/0016735 A1 | 1/2012 | Park et al. |
| 2012/0026396 A1 | 2/2012 | Banavara |
| 2012/0029981 A1 | 2/2012 | Barton |
| 2012/0089437 A1 | 4/2012 | Amento et al. |
| 2012/0117019 A1 | 5/2012 | Wolf et al. |
| 2012/0163269 A1 | 6/2012 | Shuster et al. |
| 2012/0256902 A1 | 10/2012 | Tam et al. |
| 2012/0278728 A1 | 11/2012 | Malin et al. |
| 2012/0278837 A1 | 11/2012 | Curtis et al. |
| 2012/0324076 A1 | 12/2012 | Zerr et al. |
| 2013/0188322 A1 | 7/2013 | Lowe |
| 2013/0222270 A1 | 8/2013 | Winkler et al. |
| 2013/0241820 A1 | 9/2013 | Keh et al. |
| 2013/0293530 A1 | 11/2013 | Perez et al. |
| 2013/0332248 A1 | 12/2013 | Lim |
| 2014/0019259 A1 | 1/2014 | Dung et al. |
| 2014/0082822 A1 | 3/2014 | Rober et al. |
| 2014/0098009 A1 | 4/2014 | Prest et al. |
| 2014/0111323 A1 | 4/2014 | Strout et al. |
| 2014/0121539 A1 | 5/2014 | Chatterjee et al. |
| 2014/0160055 A1 | 6/2014 | Margolis et al. |
| 2014/0176417 A1 | 6/2014 | Young et al. |
| 2014/0257962 A1 | 9/2014 | Franzetti et al. |
| 2015/0061588 A1 | 3/2015 | Alves et al. |
| 2015/0146903 A1 | 5/2015 | Mariasov |
| 2016/0018846 A1 * | 1/2016 | Zenoff ............... G09G 3/002 345/174 |
| 2016/0018978 A1 | 1/2016 | Zenoff et al. |
| 2016/0026423 A1 | 1/2016 | Zenoff et al. |
| 2016/0048370 A1 | 2/2016 | Zenoff et al. |
| 2017/0205854 A1 * | 7/2017 | Zenoff ............... G06F 1/163 |
| 2018/0173488 A1 * | 6/2018 | Zenoff ............... G06F 3/1454 |
| 2019/0171405 A1 * | 6/2019 | Zenoff ............... G06F 3/1454 |

FOREIGN PATENT DOCUMENTS

| | | |
|---|---|---|
| WO | WO 2008079891 A2 | 7/2008 |
| WO | WO 2012061438 A2 | 5/2012 |
| WO | WO 2014054211 A1 | 4/2014 |
| WO | WO 2016014513 A1 | 1/2016 |
| WO | WO 2016014577 A1 | 1/2016 |
| WO | WO 2016025853 | 2/2016 |

OTHER PUBLICATIONS

Wireless Charging Available at http://powerbyproxi.com/wireless-charging. 2016, 10 Pages, Accessed on Jan. 11, 2016.

Webbozz.com. Stylish Circular Display Smart Watch—Motorola Mato 360. Feb. 2013. 3 Pages, Available at http://www.webbozz.com/stylish-circular-display-smart-watch-motorola-moto-360. Accessed on Jul. 23, 2015.

"How to Make a Wireless Li-Ion Battery Charger Circuit," Jan. 12, 2012, 25 Pages, Available at http://www.homemadecircuits.com/2012/01/how-to-make-inductive-li-ion-battery.html. Accessed on Jan. 11, 2016.

International search report and written opinion dated Nov. 2, 2015 for PCT Application No. PCT/US2015/42507, 25 Pages.

International search report and written opinion dated Nov. 3, 2015 for PCT Application No. PCT/US2015/045308, 12 Pages.

International search report and written opinion dated Nov. 23, 2015 for PCT Application No. PCT/US2015/45309, 21 Pages.

International search report and written opinion dated Dec. 8, 2015 for PCT Application No. PCT/US2015/41308, 12 Pages.

International search report and written opinion dated Oct. 23, 2015 for PCT Application No. PCT/US2015/041391, 11 Pages.

(56) References Cited

OTHER PUBLICATIONS

Office Action for U.S. Appl. No. 14/827,101, dated Jul. 26, 2017, 24 Pages.

* cited by examiner

Modular Band – multi use / adjustable

Modular Hat
removable screen band separate removable parts
band
bill

- 1 mm lens
- 1.47 mm display
- 0.06 mm adhesive
- 3.2 mm PCBA
- 4.5 mm battery
- 0.06 mm adhesive
- 0.6 mm for tolerances
- 0.8 mm steel cover

SYSTEMS FOR DISPLAYING MEDIA ON DISPLAY DEVICES

CROSS-REFERENCE TO RELATED APPLICATIONS

This application is a continuation of U.S. application Ser. No. 14/827,101, filed Aug. 14, 2015, which claims priority to U.S. Provisional Patent Application No. 62/038,047, filed Aug. 15, 2014, and U.S. Provisional Patent Application No. 62/038,053, filed Aug. 15, 2014, all of which are entirely incorporated herein by reference.

BACKGROUND

People experience and create all kinds of intentions and expressions which yield different energies and results that affect and impact what their experience of life is like and the results they yield how they feel and what they accomplish throughout their day, week, month and lifetime. Some intentions, expressions and energies are powerful and easily recognizable, while others are more subtle and often only intuitively felt.

The things one says, thinks and expresses do produce energy and results that impacts a person and the people around a person. Creating more positive intentions, expressions and energy leads to improvements, and favorable results in a person's life and to society as a whole.

Negative outcomes and negative and/or not thought out intentions, and negative energy, come in many forms. Developing more positive and focused intentions and expressions, of these intentions and positive energy can take many forms including but not limited to being around positive people, self-talk, uplifting music, inspirational messages, and inspirational books, being around positive people, communicating with positive people, practicing positive affirmations and the like.

When we emit positive intentions and expressions energy, including but not limited to communications, messages, thoughts, feelings, vibrations and the like, we attract more positives to us. Newton's law of action and reaction may be at play here. When we dwell on the negatives, or do not focus on what positive outcomes we want to have happen, we attract negatives, we also are victim to chance circumstance the collective consciousness, and this creates endless cycles of suffering and repetition that sap our energy strength in the process.

There are various ways of increasing our positive outcomes as a society and as an individual. The first thing is becoming clear about how our intentions and expressions impact our lives. The secondly thing is, creating vehicles and methods to support positive intentions, collective conscious expressions, reducing the experience of feeling powerless, having a voice, sharing, feeling connected to the greater whole and a relationship with something bigger than ones small self. Others include, love and accept yourself as you are, free yourself from past resentments and disappointments, letting go of any and all resentment you're hanging onto about everyone and everything else, stop looking for reasons to criticize and blame others for their acts and omissions, letting go of your desire to control others, using your time, energy, and vitality wisely, using creative visualization and imagination to your advantage, not your detriment, developing an attitude of gratitude, being happy, appreciating the moment, and the like.

With consciousness evolving and a need for its evolution, we as people have the ability and power to impact the outcomes that serve our lives and the greater community in which we live. Be it self, family, group affiliations, neighborhood, city, state, country, globe.

It may be important to share, give back, feel connected, feel heard, counted and considered while being of service to self and others, and to share this with others in social media.

SUMMARY

The present disclosure provides display devices with or without sensors that may be worn on a user or an inanimate object. A display device of the present disclosure may be mounted on various objects, such as on or near the head of a user, a vehicle, or building. Display devices of the present disclosure may provide, individual, customizable, creative self-expression, in the form of images and/or words, which may be shared by the user.

The present disclosure provides a display device that may enable a user to have self-expression. The self-expression may be changeable. The self-expression may be in the form of words, images and combinations thereof. The display device may also provide a user with the ability to have dynamic individual creative self-expression, in the form of words, images and combinations thereof. The display device may enable connection between the user and one or more other individuals, and may provide other uses, such as being counted, collective expressions and possible manifestation in a variety of different forms.

A display device can be wearable. The display device can be mountable on a user or an inanimate object. A display device of the present disclosure may be a dynamic life strong band that may be connected to a platform which allows the user to connect socially to the things the user may care about, learn more about things the user may not have known about, take action by donating or offering resources to organizations, charities and events, and become an individual philanthropist. The display device may be a customizable button or band for self-expression and a customizable dynamic live strong band for expression and social engagement, which may allow for social impact.

In some examples, the display device is usable by a user for self-expression. The display device can be a button, such as a smart button for self-expression connection, which can enable action and impact. The display device can be worn on an article of clothing of the user, such as a shirt jacket or cap, or other object, such as a bag. The display device can be placed at the rear of a vehicle, such as a car. The display device can be a bumper sticker, such as a digital bumper sticker, on the vehicle.

The display device can allow for instantaneous customizable self-expression. The display device can be connected to a platform that can allow for social connection, learning and taking action, which may result in social impact.

The display device may be equipped with a geolocation unit, which can enable the location of the display device to be determined. The geolocation unit can include a global positioning system (GPS) or wireless receiver (e.g., WiFi) for wireless triangulation. This may enable the display device to be used in various locations, such as stadiums, and other settings, such as group events as well as individual everyday life.

The display device may be connectable to an application (app) on an electronic device of the user. The app can support self-expression and social opportunities around expression, and flowing resources to charities and organizations.

The display device can have a touchscreen, such as a capacitive touchscreen or a resistive touchscreen. The touchscreen can enable scrolling and creating expressions, animation opportunities for a queue, and for video and full animation.

The display device can have a display with power management capabilities. The display can be dimmable. For example, the display can dim or turn off and turn on per a schedule, such as a schedule selected by the user, or upon a trigger event, such as upon achieving a given goal (e.g., donation goal).

The display device can be module to an article of clothing (e.g., cap) or a vehicle. In some examples, the display device is module for a cap or a car.

In some cases, the display device is not a watch. For example, the display device may not have a primary function of telling time or browsing the internet. The display device may not have a band, such as a wristband.

The present disclosure also provides applications (apps) that are usable to prepare expressions for display on display devices. The app can enable the user to wear and share what the user may find important, connect and take action. The app can be a social app that creates community and social experience, in some cases enabling individual philanthropy. The app can enable the user to be a philanthropist. The app can empower the user to connect with other individuals based around expressing what the user may find important. The app may enable social impact.

The app can enable the user to provide or create expressions within a predefined area. The predefined area may be in the form of a display of the display device (e.g., circle if the display device is a button).

Expressions can be accessed online or offline. An expression can be online, such as accessible by an electronic device of the user at a remote server, or offline, such as accessible on the electronic device of the user.

The app can enable the user to set goals (e.g., monthly goals), and provide the user with the opportunity to make donations each time the user uploads a pay-for expression, which may be connected to a charity, organization or event. For example, when the user expresses a pink ribbon for breast cancer treatment or prevention, a fee may flow to a charity associated with breast cancer treatment or prevention and the user can wear that expression relating to breast cancer or treatment.

The app can permit the user to download expressions. The app can permit the user to download expressions for a fee. The app can permit the user to edit expressions. The app can operate with our without a display device of the present disclosure (e.g., the user can create expressions for display on display devices of other users).

The app can empower social impact and self-expression, and connecting people around what they care about or want to learn more about. The app can provide geolocation, which can enable the user to identify other users, individuals or entities that are at or in proximity to the user, or at another location. The app can identify what other users are displaying or projecting on their display devices, which can enable the user to identify what may be of interest to other users, such as shared interests.

The app may illustrate an area that may be representative of the display device or a display of the display device (e.g., button). The user can provide all expressions for display in the area. The expressions may be shared with other users, such as shared online. The app can enable the user to pair with the display device to display an expression on the display device, which may be worn on a shirt, jacket, bag or hat of the user.

The app can enable a user to: create expressions; browse a library of expressions (e.g., taggable expressions); download expressions; connect to causes, concert or events (e.g., breast cancer walk); connect to interest groups; purchase expressions for causes or events; make a donation to a cause or event (e.g., make a donation with a single touch); upload an expression for use by other users; share an expression with other users; receive updates from other users with respect to the other users' causes, events, interests or expressions; or mark causes, events or interests for future review.

An aspect of the present disclosure provides a method for displaying or projecting media on a remote visual curvilinear display, comprising (a) bringing a computer server in network communication with a mobile electronic device of a user, wherein the mobile electronic device comprises a display screen having a graphical user interface (GUI) with one or more graphical elements that permit the user to input a selection of the media to be displayed or projected by the remote visual curvilinear display device per a display and/or location preference or schedule selected by the user, which display and/or location preference or schedule is for displaying or projecting the media on the remote visual curvilinear display device; (b) receiving the selection of the media at the computer server from the mobile electronic device, wherein the selection includes the media to be displayed or projected by the remote visual curvilinear display device; and (c) providing the media from the computer server for display or projection on the remote visual curvilinear display per the display and/or location preference or schedule.

In some embodiments, the remote visual curvilinear display device is flexible. In some embodiments, the display is circular, oval, triangular, square rectangular, or other suitable polygonal. In some embodiments, the remote visual curvilinear display device includes a display and a support member. In some embodiments, the support member is a button. In some embodiments, the support member includes a pin, clip, hook, loop, lanyard or magnetically attractable lock. In some embodiments, the remote visual curvilinear display device is mounted on a body of the user. In some embodiments, the remote visual curvilinear display device is not mounted on a wrist of the user. In some embodiments, the remote visual curvilinear display device is mounted on an inanimate object.

In some embodiments, the method further comprises prior to (c), receiving an input of a selection for one or more additional media from the user. In some embodiments, the method further comprises receiving an input from the user as to an order in which the media and the one or more additional media is to be displayed on the remote visual curvilinear display.

In some embodiments, the method further comprises receiving, at the computer server, an item of value in exchange for displaying or projecting the media on the remote visual curvilinear display; and directing the media from the computer server to the mobile electronic device in exchange for the item of value for displaying or projecting on the remote visual curvilinear display. In some embodiments, the item of value is a donation. In some embodiments, the donation is associated with a cause or organization associated with the media.

In some embodiments, the method further comprises receiving, at the computer server from the mobile electronic device, an input or selection from the user with respect to the display and/or location preference or schedule. In some embodiments, the method further comprises receiving input from the user to edit the media. In some embodiments, the method further comprises receiving an input content from the user to create the media, wherein the input content comprises one or more images and/or text elements. In some embodiments, the method further comprises providing a template comprising one or more parameters for creating the media based on the input content, wherein the template is stored on the computer server. In some embodiments, the method further comprises generating a template comprising one or more parameters based on the input content. In some embodiments, the template is stored on the computer server. In some embodiments, the user inputs the selection of the media subsequent to viewing the media on a visual curvilinear display of another user.

Another aspect of the present disclosure provides a computer system for displaying or projecting media on a remote visual curvilinear display, comprising a communication interface in network communication with a mobile electronic device of a user, wherein the mobile electronic device comprises a display screen having a graphical user interface (GUI) with one or more graphical elements that permit the user to input a selection of the media to be displayed or projected by the remote visual curvilinear display device per a display and/or location preference or schedule selected by the user, which display and/or location preference or schedule is for displaying or projecting the media on the remote visual curvilinear display device; and a computer processor in communication with the communication interface, wherein the computer processor is programmed to (i) receive the selection of the media at the computer server from the mobile electronic device, wherein the selection includes the media to be displayed or projected by the remote visual curvilinear display device, and (ii) provide the media from the computer server for display or projection on the remote visual curvilinear display per the display and/or location preference or schedule.

In some embodiments, the remote visual curvilinear display device is flexible. In some embodiments, the display is circular, oval, triangular, square rectangular, or other suitable polygonal. In some embodiments, the remote visual curvilinear display is circular, oval, triangular, square rectangular, or other suitable polygonal. In some embodiments, the remote visual curvilinear display device includes a display and a support member. In some embodiments, the support member includes a button, a pin, a clip, a hook, a loop, a lanyard or a magnetically attractable lock. In some embodiments, the remote visual curvilinear display device is mounted on a body of the user. In some embodiments, the remote visual curvilinear display device is mounted on an inanimate object.

In some embodiments, the computer processor is further programmed to receive an input of a selection for one or more additional media from the user. In some embodiments, the computer processor is further programmed to receive an input from the user as to an order in which the media and the one or more additional media is to be displayed on the remote visual curvilinear display. In some embodiments, the computer processor is programmed to receive an item of value in exchange for displaying or projecting the media on the remote visual curvilinear display; and direct the media from the computer server to the mobile electronic device in exchange for the item of value for displaying or projecting on the remote visual curvilinear display. In some embodiments, the term of value is a donation. In some embodiments, the donation is associated with a cause or organization associated with the media.

In some embodiments, the computer processor is programmed to receive input from the user to edit the media. In some embodiments, the computer processor is programmed to receive an input content from the user to create the media, wherein the input content comprises one or more images and/or text elements. In some embodiments, the computer processor is programmed to provide a template comprising one or more parameters for creating the media based on the input content, wherein the template is stored on the computer server. In some embodiments, the computer processor is programmed to generate a template comprising one or more parameters based on the input content. In some embodiments, the template is stored on the computer server. In some embodiments, the user inputs the selection of the media subsequent to viewing the media on a visual curvilinear display of another user.

Another aspect of the present disclosure provides a method for sharing media displayed on a remote visual curvilinear display, comprising: (a) bringing a computer server in network communication with a mobile electronic device of a first user, wherein the mobile electronic device comprises a display screen having a graphical user interface (GUI) for displaying media; (b) at the computer server, receiving a media request from the mobile electronic device, wherein the media request is a request for media displayed or projected on the remote visual curvilinear display of a second user; and (c) directing the media from the computer server to the mobile electronic device of the first user for display on the GUI of the display of the mobile electronic device, thereby sharing the media from the second user to the first user.

In some embodiments, the media is directed for display on a remote visual curvilinear display of the first user. In some embodiments, the method further comprises bringing the computer server in network communication with an additional mobile electronic device and/or the remote visual curvilinear display of the second user. In some embodiments, the method further comprises storing the media displayed or projected on the remote visual curvilinear display of the second user at the computer server; and in response to the media request, transmitting a set of media associated with the second user, wherein the set of media includes the media, and wherein the media is identified by the first user from the set of media retrieved from the server.

In some embodiments, the method further comprises at the computer server, identifying the media displayed or projected on the remote visual curvilinear display of the second user subsequent to receiving the media request. In some embodiments, the media displayed or projected on the remote visual curvilinear display of the second user is identified by the mobile electronic device using image recognition. In some embodiments, the media is directed from the computer server to the mobile electronic device in exchange for an item of value from the first user. In some embodiments, the item of value is a donation associated with a cause or organization associated with the media.

In some embodiments, the remote visual curvilinear display is circular, oval, triangular, square rectangular, or other suitable polygonal. In some embodiments, the remote visual curvilinear display comprises a support member, and wherein the support member includes a button, a pin, a clip, a hook, a loop, a lanyard or a magnetically attractable lock. In some embodiments, the remote visual curvilinear display device is mounted on a body of the second user. In some embodiments, the remote visual curvilinear display device is mounted on an inanimate object associated with the second user.

Another aspect of the present disclosure provides a computer system for sharing media displayed on a remote visual curvilinear display, comprising: a communication interface in network communication with a mobile electronic device of a first user, wherein the mobile electronic device comprises a display screen having a graphical user interface (GUI) for displaying media; and a computer processor in communication with the communication interface, wherein the computer processor is programmed to: (i) receive a media request from the mobile electronic device, wherein the media request is a request for media displayed or projected on the remote visual curvilinear display of a second user, and (ii) direct the media from the computer server to the mobile electronic device of the first user for display on the GUI of the display of the mobile electronic device, thereby sharing the media from the second user to the first user.

In some embodiments, the processor is further programmed to direct the media for display on a remote visual curvilinear display of the first user. In some embodiments, communication interface is further in network communication with a mobile electronic device and/or the remote visual curvilinear display of the second user. In some embodiments, the processor is further programmed to store the media displayed or projected on the remote visual curvilinear display of the second user at the server; and transmit a set of media associated with the second user. In some embodiments, the set of media including the media, and the media is identified by the first user from the set of media retrieved from the server.

In some embodiments, the processor is further programmed to identify the media displayed or projected on the remote visual curvilinear display of the second user. In some embodiments, the media displayed or projected on the remote visual curvilinear display of the second user is identified by the mobile electronic device using image recognition. In some embodiments, the media is directed from the computer server to the mobile electronic device in exchange for an item of value from the first user. In some embodiments, the item of value is a donation associated with a cause or organization associated with the media.

In some embodiments, the remote visual curvilinear display is circular, oval, triangular, square rectangular, or other suitable polygonal. In some embodiments, the remote visual curvilinear display comprises a support member, and the support member includes a button, a pin, a clip, a hook, a loop, a lanyard or a magnetically attractable lock. In some embodiments, the remote visual curvilinear display device is mounted on a body of the second user. In some embodiments, the remote visual curvilinear display device is mounted on an inanimate object associated with the second user.

Another aspect of the present disclosure provides a method for transmitting media for display or projection on a remote visual curvilinear display, comprising: (a) bringing a computer server in network communication with a mobile electronic device of a first user; (b) at the computer server, identifying the media for display or projection on a remote visual curvilinear display of the first user in communication with the mobile electronic device; and (c) transmitting the media from the computer server to the mobile electronic device of the first user, wherein the mobile electronic device transmits the media to the remote visual curvilinear display for display or projection per a display and/or location preference or schedule of the first user.

In some embodiments, the media is displayed or projected on an additional remote visual curvilinear display of a second user, and wherein the computer server identifies the media for display or projection on the remote visual curvilinear display of the first user. In some embodiments, the media is identified per one or more interests of the first user, which one or more interests are associated with a profile of the first user on the computer server. In some embodiments, the method further comprises prior to (b), the media for display or projection on the remote visual curvilinear display of the first user is identified in response to a triggering event.

In some embodiments, the remote visual curvilinear display device is flexible. In some embodiments, the remote visual curvilinear display is circular, oval, triangular, square rectangular, or other suitable polygonal. In some embodiments, the remote visual curvilinear display device includes a display and a support member, and the support member includes a button, a pin, a clip, a hook, a loop, a lanyard or a magnetically attractable lock. In some embodiments, the remote visual curvilinear display device is mounted on a body of the user. In some embodiments, the remote visual curvilinear display device is mounted on an inanimate object.

Another aspect of the present disclosure provides a computer system for transmitting media for display or projection on a remote visual curvilinear display, comprising: a communication interface in network communication with a mobile electronic device of a first user; and a computer processor in communication with the communication interface, wherein the computer processor is programmed to (i) identify the media for display or projection on a remote visual curvilinear display of the first user in communication with the mobile electronic device, and (ii) transmit the media from the computer server to the mobile electronic device of the first user, wherein the mobile electronic device transmits the media to the remote visual curvilinear display for display or projection per a display and/or location preference or schedule of the first user.

In some embodiments, the media is displayed or projected on an additional remote visual curvilinear display of a second user, and wherein the computer server identifies the media for display or projection on the remote visual curvilinear display of the first user. In some embodiments, the media is identified per one or more interests of the first user, which one or more interests are associated with a profile of the first user on the computer server. In some embodiments, the media for display or projection on the remote visual curvilinear display of the first user is identified in response to a triggering event.

In some embodiments, the remote visual curvilinear display device is flexible. In some embodiments, the remote visual curvilinear display is circular, oval, triangular, square rectangular, or other suitable polygonal. In some embodiments, the remote visual curvilinear display device includes a display and a support member, and the support member includes a button, a pin, a clip, a hook, a loop, a lanyard or a magnetically attractable lock. In some embodiments, the remote visual curvilinear display device is mounted on a body of the user. In some embodiments, the remote visual curvilinear display device is mounted on an inanimate object.

Another aspect of the present disclosure provides a computer-readable medium comprising machine executable code that, upon execution by one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
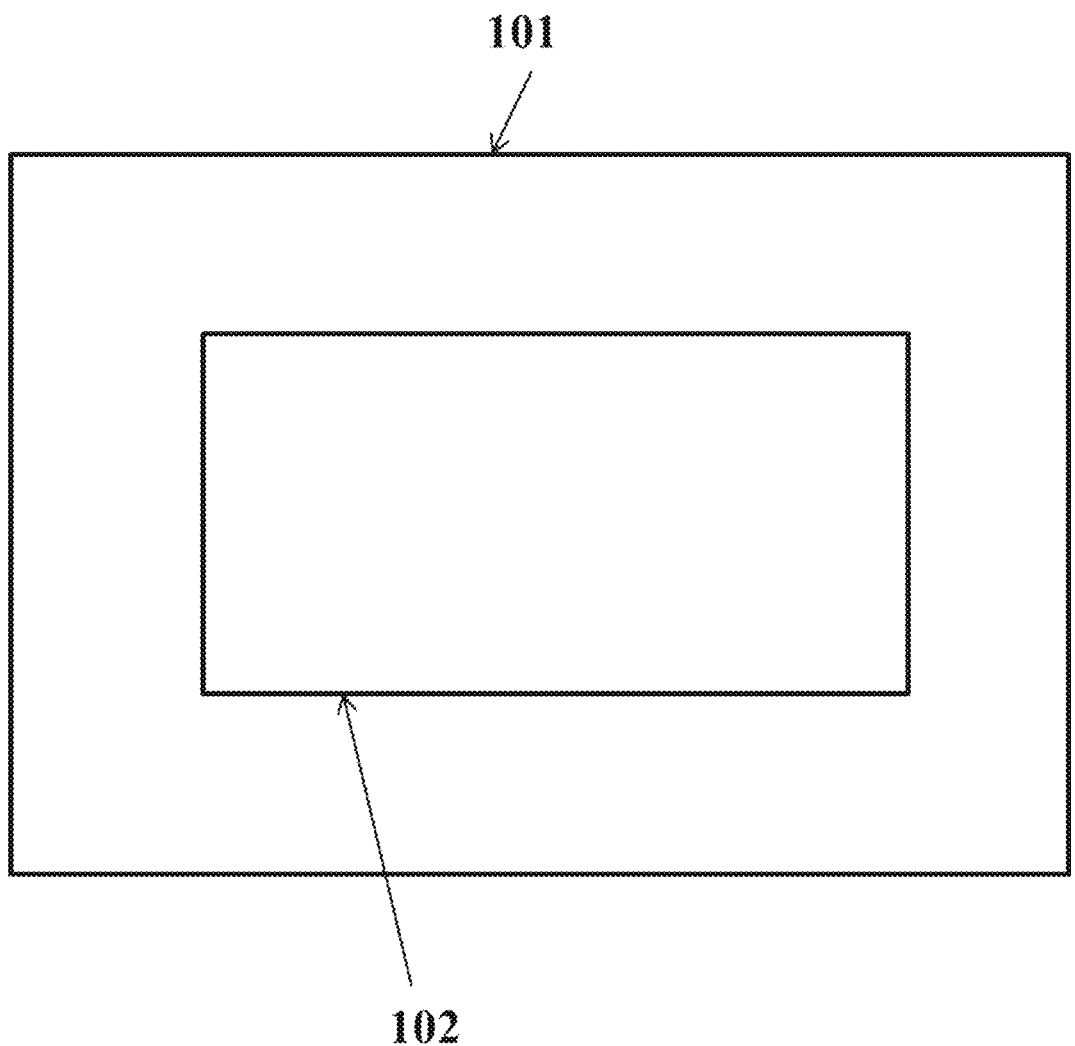
FIG. 1 shows a display device with a display screen.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "media," as used herein, generally refers to text, sounds, image or video. Media can include a combination of text, sounds, image and/or video. Media can include text and image, text and video, or video. Examples of media include text files, audio files, images files, or video files. Media may be editable by a user.

As used herein, the term "engine" refers to software, firmware, hardware, or other component that can be used to effectuate a purpose. The engine will typically include software instructions that are stored in non-volatile memory (also referred to as secondary memory). When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term "database" is used broadly to include any known or convenient approach for storing data, whether centralized or distributed, relational or otherwise.

As used herein, a "mobile device" includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving the signal, decoding if needed, exchanging information with a transaction server to verify the buyer and/or seller's account information, conducting the transaction, and generating a receipt. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

As used herein, the terms "social network" and "SNET" comprise a grouping or social structure of devices and/or individuals, as well as connections, links and interdependencies between such devices and/or individuals. Members or actors (including devices) within or affiliated with a SNET may be referred to herein as "nodes", "social devices", "SNET members", "SNET devices", "user devices" and/or "modules". In addition, the terms "SNET circle", "SNET group" and "SNET sub-circle" generally denote a social network that comprises social devices and, as contextually appropriate, human SNET members and personal area networks ("PANs").

A used herein, the term "wearable device" is anything that can be worn by an individual, it can include a back side that in some embodiments contacts a user's skin and a face side. Examples of wearable device include a head display/head covering display regardless of form, including but not limited to a cap, hat, crown, arm band, wristband, garment, belt, t-shirt, a screen which can show words and/or images on it attached to or mounted on a user's head and/or other parts of the body, a holographic display for words or images that can float in front of the forehead, a projected display where the image or words are projected from the bill of the forehead by a projector on a bill, and the like. A wearable device can also include a bag, backpack, or handbag. The term "wearable device" can also be a monitoring device if it includes monitoring elements.

As used herein, the term "computer" is a device that can be programmed to carry out a finite set of arithmetic or logical operations. The computer can be programmed for a tailored function or purpose. Since a sequence of operations can be readily changed, the computer can solve more than one kind of problem. A computer can include of at least one processing element, typically a central processing unit (CPU) with one form of memory. The processing element carries out arithmetic and logic operations. A sequencing and control unit can be included that can change the order of operations based on stored information. Peripheral devices allow information to be retrieved from an external source, and the result of operations saved and retrieved.

As used herein, the term "Internet" is a global system of interconnected computer networks that use the standard Internet protocol suite (TCP/IP) to serve billions of users worldwide. It may be a network of networks that may include millions of private, public, academic, business, and government networks, of local to global scope, that are linked by a broad array of electronic, wireless and optical networking technologies. The Internet carries an extensive range of information resources services, such as the interlinked hypertext documents of the World Wide Web (WWW) and the infrastructure to support email. The communications infrastructure of the Internet may include its hardware components and a system of software layers that control various aspects of the architecture.

As used herein, the term "extranet" is a computer network that allows controlled access from the outside. An extranet can be an extension of an organization's intranet that is extended to users outside the organization that can be partners, vendors, suppliers, in isolation from all other Internet users. An extranet can be an intranet mapped onto the public Internet or some other transmission system not accessible to the general public, but managed by more than one company's administrator(s). Examples of extranet-style networks include but are not limited to: LANs or WANs belonging to multiple organizations and interconnected and accessed using remote dial-up; LANs or WANs belonging to multiple organizations and interconnected and accessed using dedicated lines; Virtual private network (VPN) that is comprised of LANs or WANs belonging to multiple organizations, and that extends usage to remote users using special "tunneling" software that creates a secure, in some cases encrypted network connection over public lines, sometimes via an ISP.

As used herein, the term "Intranet" is a network that is owned by a single organization that controls its security policies and network management. Examples of intranets include but are not limited to: a local area network (LAN); wide-area network (WAN) that may be comprised of a LAN that extends usage to remote employees with dial-up access; WAN that is comprised of interconnected LANs using dedicated communication lines; virtual private network (VPN) that is comprised of a LAN or WAN that extends usage to remote employees or networks using special "tunneling" software that creates a secure, in some cases encrypted connection over public lines, sometimes via an Internet Service Provider (ISP).

For purposes of the present disclosure, the Internet, extranets and intranets collectively are referred to as ("Network Systems").

As used herein, the term "user" includes, but is not limited to, a person that uses devices, systems and methods of the present disclosure. A user may be a person interested in maintaining health, interested in maintaining a healthy lifestyle and/or physiologic balance, interested in monitoring lifestyle conditions, including but not limited to, the way a person goes about daily living including but not limited to, habits, exercise, diet, medical conditions and treatments, career, financial, emotional status, and the like. The user may be under a physician's care.

As used herein, the term "sensors" include those devices used for collecting data, such as from a user or an environment of the user. For example, a sensor can be for cardiac monitoring, which generally refers to continuous electrocardiography with assessment of the user's condition relative to their cardiac rhythm. A small monitor worn by an ambulatory user for this purpose is known as a Holter monitor. Cardiac monitoring can also involve cardiac output monitoring via an invasive Swan-Ganz catheter. As another example, a sensor can be used for Hemodynamic monitoring, which monitors the blood pressure and blood flow within the circulatory system. Blood pressure can be measured either invasively through an inserted blood pressure transducer assembly, or noninvasively with an inflatable blood pressure cuff. As another example, a sensor can be used for respiratory monitoring, such as pulse oximetry which involves measurement of the saturated percentage of oxygen in the blood, referred to as SpO2, and measured by an infrared finger cuff, capnography, which involves CO2 measurements, referred to as EtCO2 or end-tidal carbon dioxide concentration. The respiratory rate monitored as such is called AWRR or airway respiratory rate). As another example, a sensor can be used for respiratory rate monitoring through a thoracic transducer belt, an ECG channel or via capnography, and/or neurological monitoring, such as of intracranial pressure. Special user monitors can incorporate the monitoring of brain waves electroencephalography, gas anesthetic concentrations, and bispectral index (BIS), blood glucose monitoring using glucose sensors and the like. As another example, a sensor can be used for childbirth monitoring. This can be performed using sensors that monitor various aspects of childbirth. As another example, a sensor can be used for body temperature monitoring which in one embodiment is through an adhesive pad containing a thermoelectric transducer, and/or stress monitoring to provide warnings when stress levels signs are rising before a human can notice it and provide alerts suggestions. As another example, a sensor can be used for epilepsy monitoring, toxicity monitoring, and/or monitoring general lifestyle parameters.

In one embodiment users of the device connect with potential revenue streams based on what they are expressing on their devices, including but not limited to a walking or traveling billboard.

In one embodiment the present invention provides ability for organizations to hook up with users of the wearable device and/or screen for the purpose of communal expressions.

Systems and Methods for Displaying Media and Expressions

An aspect of the present disclosure provides systems and methods for displaying or projecting media on a display device in a computer server-client environment. A computer system for displaying or projecting media on a display device can comprise a communication interface in network communication with an electronic device of a user. The electronic device can comprise a display screen having a graphical user interface (GUI) with one or more graphical elements that permit the user to input a selection of the media to be displayed or projected by the display device per a display and/or location preference or schedule selected by the user. The display and/or location preference or schedule may be for displaying or projecting the media on the display device. The computer system can comprise a computer processor in communication with the communication interface. The computer processor can be programmed to receive the selection of the media at the computer server from the electronic device. The selection can include the media to be displayed or projected by the display device. The computer processor can be programmed to provide the media from the computer server for display or projection on the display device per the display and/or location preference or schedule.

The electronic device of the user can be mobile electronic device. For example, the electronic device can be a portable phone (e.g., Smart phone). The display device can be a remote visual curvilinear display.

The display and/or location preference or schedule of the user can be a display schedule, location schedule, or both. The user may use the display and/or location preference or schedule to set the manner in which media is displayed or projected. For example, the user may wish media to be displayed or projected during the day, at night, or at other times during the day, week, month, or year. The user may wish media to be displayed or projected at random points, upon manual input by the user, or both. The user may wish the media to be displayed or projected in response to an action or trigger, such as the user receiving electronic mail (email), a text message, having a meeting, or other action or trigger. The media may be displayed based on a context of the user.

The user may wish media to be displayed or projected when the user is at a given location, as may be determined by a geolocation device of the user. The geolocation device may be part of the system or display device.

The display device can have various shapes and sizes. The display device can be triangular, circular, oval, square, rectangular, other polygonal, or partial shapes or combinations of shapes thereof.

In some examples, the display device is a visual curvilinear display with circular or oval, or has circular or oval features. For example, the display device is circular or substantially circular, or is of another shape (e.g., square or rectangular) with sides or corners that are partially or fully circular.

The support member can have various shapes and sizes. The support member can be triangular, circular, oval, square, rectangular, or partial shapes or combinations of shapes thereof. The support member can be a button. The support member can include a pin, clip, hook, loop, lanyard or magnetically attractable lock.

The support member can be a cap, hat, screen, pin, belt, belt buckle, arm band, wristband, necklace, choker necklace, headband, visor, visor protective flap(s), screen camera, or band. The support member can be a surface or support object that is mountable (e.g., removably mountable) on a cap, hat, screen, pin, belt, belt buckle, arm band, wristband, necklace, choker necklace, headband, visor, visor protective flap(s), screen camera, or band.

The support member can be mountable on a head or torso of the user. In some cases, the support member is not mountable on a wrist, hand and/or arm of the user. The support member can be mountable and removable from the body with a single hand of the user. In an example, the user can mount or remove the support member solely with the user's left or right hand, thus enabling the support member to be readily mounted or removed with little or minimal effort by the user.

The display device can have a thickness that is less than or equal to about 100 millimeter (mm), 50 mm, 40 mm, 30 mm, 20 mm, 10 mm, 5 mm, or 1 mm. The support member can have a thickness that is less than or equal to about 100 mm, 50 mm, 40 mm, 30 mm, 20 mm, 10 mm, 5 mm, or 1 mm. When the display is mounted on the support member to yield the display device, the overall thickness of the device can be less than or equal to about 100 mm, 50 mm, 40 mm, 30 mm, 20 mm, 10 mm, 5 mm, or 1 mm. In some examples, the overall thickness is from 2 mm to 15 mm, or 5 mm to 10 mm. As an example, the overall thickness is less than or equal to 15 mm, 14 mm, 13 mm, 12 mm, 11 mm or 10 mm.

The display device can have a cover glass with a substantially small curvature. The display device can be formed of sapphire glass. The display device can be circular, oval, triangular, square or rectangular, for example. The display device can include a backlight and/or a masked front glass. The display device can be flexible.

The display device can be a touchscreen, such as a capacitive or resistive touchscreen. This can enable the user to select media, scroll through media, or access other features or functions of the device.

The device can include one or more buttons to enable a user to access various features or functions of the device. The one or more buttons can be on a side portion of the display or the support member. The one or more buttons can be coupled to the controller.

The support member can include a pin that pierces an article of clothing (e.g., shirt or hat) or other object (e.g., bag), which can enable the support member to secure against the article of clothing or other object. The pin can have a lock that secures the pin and support member in place. The pin can enable the support member to rotate. As an alternative, the support member can include a magnetically attractable lock. For example, the support member can include a metallic plate that is polarized with one pole of a permanent magnet and a lock that is polarized with another pole of a magnet). When the metallic plate and lock are brought in proximity to one another, a magnetic field force can draw them together, holding the support member in place, such as, for example, against an article of clothing. As an alternative, the support member can be mountable on an inanimate object, such as a vehicle. This can enable the display device to display or project the medial on the vehicle. For example, the display device can be a bumper sticker, such as a digital bumper sticker.

The display can be modular. This can enable the display to couple with other components, such as other displays. In some cases, the system can include one or more additional displays. The one or more additional displays can be in communication with the display. For example, each additional display can be mountable on the support member or a separate support member. If a separate support member is employed, the separate support member may be mountable on the support member, or vice versa. For example, support members can include mounting members (e.g., clips or interlocks) on their sides that enable the support members to be coupled to one another to form larger display devices. Once coupled, the individual display devices can provide separate media or communicate with one another to provide the same media or portions of the same media. For example, portions of a single image can be displayed through the individual devices.

The computer processor can be programmed to perform various functions. For example, the computer processor can be programmed to receive an item of value in exchange for displaying or projecting said media on said remote visual curvilinear display, and direct said media from said computer server to said mobile electronic device in exchange for said item of value for displaying or projecting on said remote visual curvilinear display. As another example, the computer processor can be programmed to receive an input from said user to edit or create said media.

The computer processor can be programmed to receive an input content from said user to create said media. The input content can comprise one or more images and/or text elements.

The computer processor can be programmed to provide a template comprising one or more parameters for creating said media based on said input content. The template can be stored on said computer server.

The computer processor can be programmed to generate the template. The template can include one or more parameters based on said input content. The template can be stored on said computer server.

In some examples, the user inputs the selection of the media subsequent to viewing the media on display device of another user. The display device can be a visual curvilinear display. This can enable the user to see media of another user and get a copy or otherwise gain access to the media.

Another aspect of the present disclosure provides a method for displaying or projecting media on a display device. The method comprises bringing a computer server in network communication with an electronic device of a user. The electronic device can comprise a display screen having a graphical user interface (GUI) with one or more graphical elements that permit the user to input a selection of the media to be displayed or projected by the display device per a display and/or location preference or schedule selected by the user. The display and/or location preference or schedule can be for displaying or projecting the media on the display device. Next, the selection of the media can be received at the computer server from the electronic device. The selection includes the media to be displayed or projected by the display device. Next, the media is provided (or directed) from the computer server for display or projection on the display device the display and/or location preference or schedule.

In some cases, an input of a selection can be received from the user for one or more additional media. The input can be received before providing the media for display or projection on the display device. An input can be received from the user as to an order in which the media and the one or more additional media is to be displayed on the remote visual curvilinear display. For example, the user can provide an input in which a given media is displayed first and another media is displayed second.

In some embodiments, an item of value in exchange for displaying or projecting the media on the display device can be received at the computer server. The media can be directed from the computer server to the electronic device in exchange for the item of value for displaying or projecting on the display device. The item of value can be money, such as a donation. The item of value can be credit or a promise of future service. The item of value can be associated with a cause or organization associated with the media.

In some embodiments, an input or selection from the user with respect to the display and/or location preference or schedule can be received at the computer server from the electronic device. In some embodiments, an input to edit the media can be received at the computer server. For example, the user may want to change certain text in the media, and the user may edit the media using the GUI or keyboard on the electronic device. The user's input can be sent to the computer server from the electronic device.

In some embodiments, an input content can be received from the user to create the media. The input content comprises one or more images, one or more text elements, and/or combinations thereof. In some embodiments, a template comprising one or more parameters for creating the media based on the input content can be provided. The template can be stored on the computer server. For example, the template can be created previously based on other media and store on the computer server. The template can also be created in other suitable ways, such as created by the administrator of the computer server or downloaded from the internet. For example, an input content can be parsed to identify multiple elements and/or parameters (metadata like location information, category, subject, etc.) By comparing the multiple elements and/or parameters, a template including similar elements and/or parameters stored at the computer server can be identified and provided to create the media.

In some embodiments, if no template stored on the computer server can be identified to have similar elements and/or parameters as the input content, a new template comprising one or more parameters based on the input content can be generated by the computer server. The generated template can be stored at the computer server. The template can include parts that are common to more than one media (e.g., some elements and/or parameters) and parts that can have variable information being inserted in (e.g., date, name, location, etc.).

In some embodiments, the user can input the selection of the media subsequent to viewing the media on a display device of another user.

Another aspect of the present disclosure provides systems and methods for sharing media displayed on a display device. The computer system for displaying or projecting media on a display device can comprise a communication interface in network communication with an electronic device of a first user. The electronic device can comprise a display screen having a graphical user interface (GUI) for displaying media. The electronic device can also comprise a computer processor in communication with the communication interface. The computer processor can be programmed to receive a media request from the electronic device. The media request can be a request for media to be displayed or projected on the display device of a second user. The computer processor can also be programmed to direct the media from the computer server to the electronic device of the first user for display on the GUI of the display of the electronic device. Thereby the media can be shared from the second user to the first user.

Another aspect of the present disclosure provides a method for sharing media displayed on a display device. The method can comprise bringing a computer server in network communication with an electronic device of a first user. The electronic device can comprise a display screen having a graphical user interface (GUI) for displaying media. Next, a media request can be received on the computer server from the electronic device. The media request can be a request for media displayed or projected on the display device of a second user. Next, the media can be directed from the computer server to the electronic device of the first user for display on the GUI of the display of the electronic device. The media can thereby be shared from the second user to the first user.

In some embodiments, the media can be directed for display on a display device of the first user. In some embodiments, the computer server can be in network communication with an additional electronic device and/or the display device of the second user. The media displayed or projected on the display device of the second user can be stored on the computer server. In response to the media request, a set of media associated with the second user can be transmitted to the electronic device of the first user. The set of media can include the media displayed or projected on the display device of the second user. The media can be identified by the first user from the set of media retrieved from the server. The media displayed or projected on the display device of the second user can be identified on the computer server subsequent to receiving the media request. For example, the media may include metadata, such as display date, time, location, subject, and/or display category, which can be used for server to identify the media. In some embodiments, the media displayed or projected on the display device of the second user can be identified by the electronic device using image recognition.

An aspect of the present disclosure provides systems and methods for transmitting media for display or projection on a display device. The computer system for transmitting media can comprise a communication interface in network communication with an electronic device of a first user. The compute system can also comprise a computer processor in communication with the communication interface. The computer processor can be programmed to identify the media for display or projection on a display device of the first user in communication with the electronic device. The computer processor can also be programmed to transmit the media from the computer server to the electronic device of the first user. The electronic device can transmit the media to the remote visual curvilinear display for display or projection per a display and/or location preference or schedule of the first user.

For example, a first user has a media on display or projection on the first user's display device. The server may identify a second user and then send a recommendation notification to the second user for recommending the second user to display or project the media which is displayed on the first user's display device. The first user and the second user may be friends or contacts of each other, colleagues in the same organization, attendees of the same event, or running errands in the nearby location from each other.

Another aspect of the present disclosure provides a method for transmitting media for display or projection on a display device. The method can comprise bringing a computer server in network communication with an electronic device of a first user. Next, the media for display or projection on a display device of the first user in communication with the electronic device can be identified on the computer server. Next the media from the computer server can be transmitted to the electronic device of the first user. The electronic device can transmit the media to the display device for display or projection per a display and/or location preference or schedule of the first user.

In some embodiments, the media can be displayed or projected on an additional display device of a second user. The computer server can identify the media for display or projection on the display device of the first user. The identified media can then be transmitted by the computer server to the additional display device of the second user.

In some embodiments, the media can be identified per one or more interests of the first user. The one or more interests can be associated with a profile of the first user on the computer server. In some embodiments, the media for display or projection on the display device of the first user can be identified in response to a triggering event before the media is identified for display or projection on a display device of the first user. For example, one of the user's friends may update his or her expressions or change activity/profile. The computer may recommend the updated expression or an expression associated with the updated activity/profile to the user.

Reference will now be made to the figures, wherein like numerals refer to like parts throughout. It will be appreciated that the figures and features therein are not necessarily drawn to scale.

FIG. 1 shows a display device 101 with a display screen 102. The display device 101 can be as described above. The display screen 102 can have various shapes and sizes. For example, the display screen 102 can be curvilinear (e.g., circular or oval). The display device 101 and the display screen 102 can have various form factors. For example, the display device 101 can be in the form of a pin or button.

Figure 2:
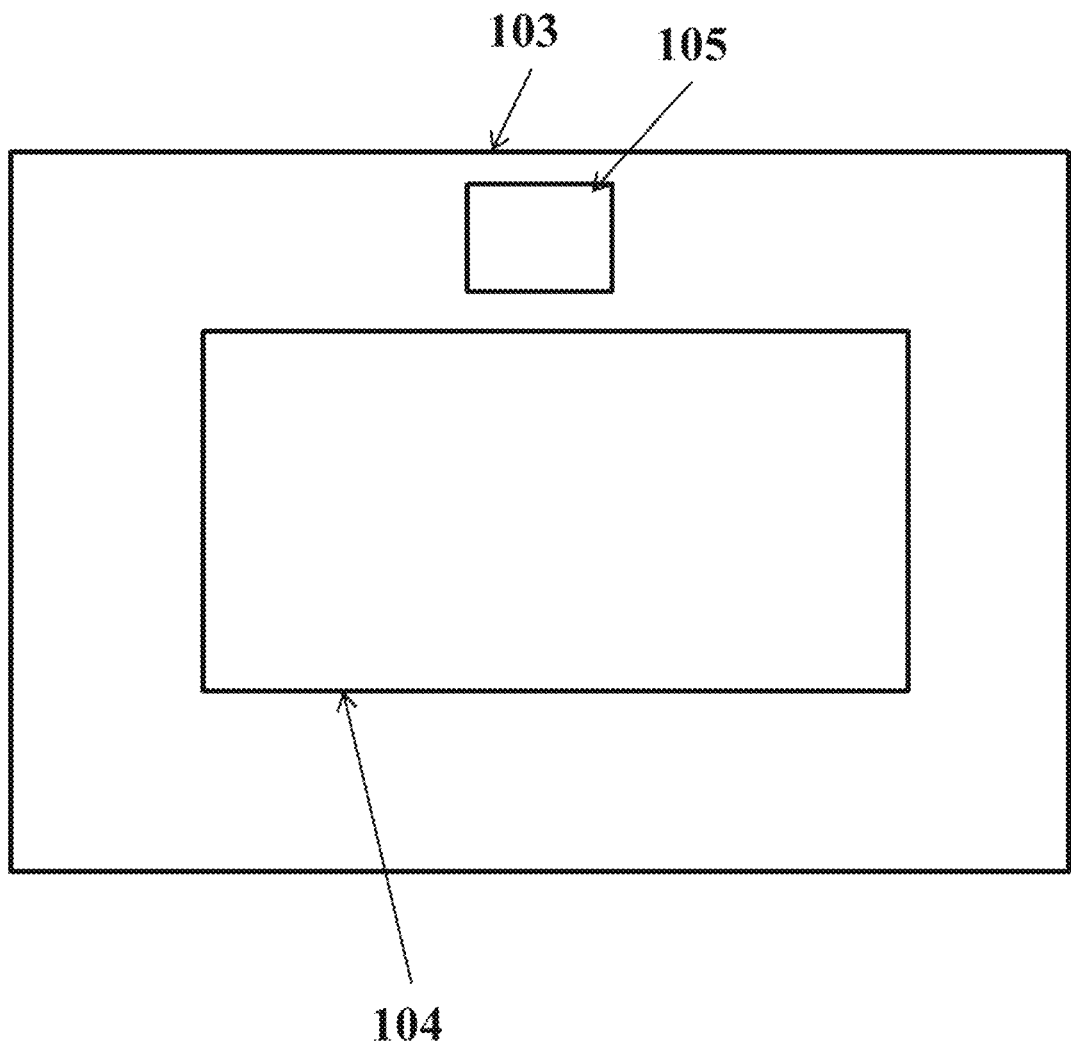
FIG. 2 shows another display device with a display screen.

FIG. 2 shows a display device 103 with a display screen 104. The display device 103 can be as described above. The display screen 104 can have various shapes and sizes. For example, the display screen 104 can be curvilinear (e.g., circular or oval). The display device 103 further includes a sensor 105. The sensor 105 can capture various signals from the user or an environment of the user, such as light or sound. The sensor 105 can be a camera, which can capture images or video from the user or other objects, such as other individuals. The display device 103 and the display screen 104 can have various form factors. For example, the display device 103 can be in the form of a pin or button.

The present disclosure provides a wearable device that can provide the ability to have self-expression, with the self-expression being changeable, and is in the form of words, images and combinations thereof.

In an embodiment, the wearable device provides the ability to have individual creative self-expression, with the self-expression being changeable, and is in the form of words, images and combinations thereof.

In another embodiment, the wearable device provides the ability to have dynamic individual creative self-expression, in the form of words, images and combinations thereof, and enables connection.

In another embodiment, the present disclosure provides a wearable device that provides an ability to have dynamic individual creative self-expression, in the form of words, images and combinations thereof, and enables manifestation in a variety of different forms.

In one embodiment, the present disclosure provides a wearable, customizable digital display device that combines technology and fashion to offer the user an opportunity for creative self-expression, connection and manifestation. A wearable device of the present disclosure can provide a tangible delivery system of a message and/or figure to create expression.

The wearable device can display images, complex words and messages, and text, uploads, displays, ends wirelessly. The wearable device can use a user's or a third party's mobile device to communicate. The wearable device is in communication with the mobile device.

In one embodiment the wearable device is a crown that may change color based on information received. Sensors can be included in the wearable device.

In various embodiments the wearable device can include a display or screen that can be flexible. In other embodiments the wearable device can be utilized by a wearable device user with an ability to impact positive social and environmental change through intentionally and expression from personal to global. In one embodiment the wearable distal is a customizable worn for the purpose of self-expression and the greater good. It can be used to express, connect and manifest positive change.

Display devices of the present disclosure can provide individuals with the opportunity to voice and express what is important to them via wearable devices, and in their vehicles, mini customizable billboards. Display devices of the present disclosure can provide individuals with the opportunity to be heard, counted and has their opinions and intentions mean something through creative customizable self-expression which they can wear or use in their vehicles.

Display devices of the present disclosure can support individuals collectively creating outcomes for their lives. Such devices can also enable individuals to have positive experiences and create all kinds of intentions and expressions which yield different energies and results that effect and impact what their experience of life is like, the results of how they feel and what they accomplish throughout their day, week, month and lifetime. Some intentions, expressions and energies are powerful and easily recognizable, while others are more subtle and often only intuitively felt.

Wearable devices of the present disclosure can provide the opportunity to support connection, being counted, in an aggregate dashboard of all the users of our device to reflect the collective mood and different expressions of the users. In one embodiment users of the device connect with potential revenue streams based on what they are expressing on their devices, including but not limited to a walking or traveling billboard. Organizations may be able to connect with users of wearable devices for the purpose of communal expressions.

Figure 15A:
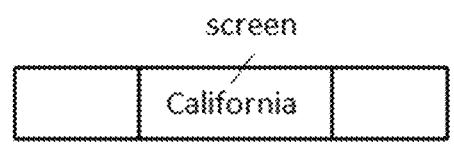
FIGS. 15A-15C illustrate various modular bands that can have multi use and be adjustable in various embodiments of the present disclosure.
Figure 15B:
Figure 15C:
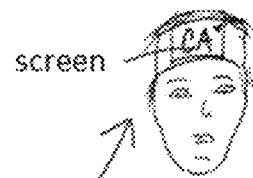
Figure 16A:
FIGS. 16A-16B illustrate modular hats with a removable screen band and separate removable parts in various embodiments of the present disclosure.
Figure 16B:

Modular displays of the present disclosure can be coupled to various support members. FIGS. 15A-15C illustrate various modular bands that can have multi use and be adjustable. FIGS. 16A-16B illustrate modular hats with a removable screen band and separate removable parts.

The display and/or support member can be flexible. This can enable a user to bend or twist the display and/or support member, as desired. The user can shape the display and/or support member into any desired or predetermined shape or configuration.

Figure 3:
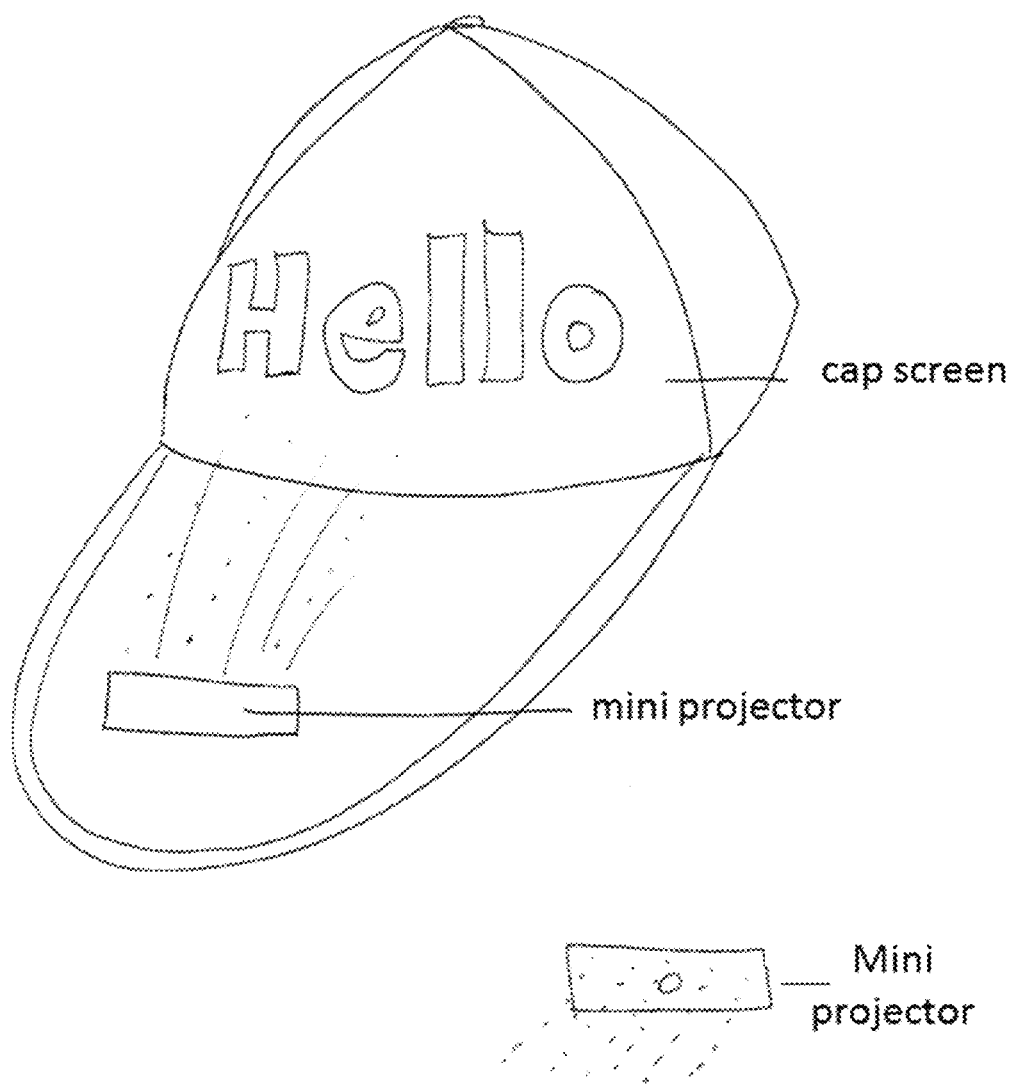
FIG. 3 illustrates a projector bill on a cap.

In some examples, the support member is formed of a polymeric material, such as a thermoplastic. The display can be formed of a light emitting diode (LED), such as an organic LED (OLED). The controller can include a printed circuit board (PCB) that can be flexible. As an alternative, the display is a projector that can project the media to a display surface, such as an article of clothing or other object (e.g., display screen). For example, the display can include a projector bill on a cap, as shown in FIG. 3.

The system can include an energy storage device, such as a battery, operatively coupled to the display and/or the controller. The battery can be a solid state battery, such as a lithium ion battery. The battery can be chargeable, such as through a charging port of the system, e.g., through a universal serial bus (USB) port. As an alternative or in addition to, the battery can be inductively chargeable.

The display can be removable from the support member. As an alternative, the display is not removable from the support member.

The system can include a communications bus for bringing the display in communication with the controller. The communications bus can be a circuit board, such as a PCB. The communications bus can be mounted on the support member. In some examples, the communications bus includes a communications interface (e.g., Bluetooth or WiFi) that brings the display in wireless communication with the controller.

The controller can be mounted on the support member. In some examples, the controller is unitary or integrated with the support member. As an alternative, the controller can be separable from the support member.

The system can include one or more sensors. A sensor among the one or more sensors can be an optical, pressure or proximity sensor. The sensor can be in communication with the controller.

The system can include a camera in communication with the controller. The camera can be a charge-coupled camera (CCD). The camera can enable capture of images or video of the user or other objects, such other individuals. This can enable the system to gauge response to the media.

The controller can be programmed to orient the media such that it is displayed or projected through the display at an orientation selected by the user. This can enable the user to mount the support member on a body of the user without concern for the media being displayed or projected in an intended manner. As an alternative or in addition to, the controller can be programmed to orient the media such that it is displayed or projected through the display along a direction that is parallel to the gravitational acceleration vector.

The system can include a gyroscope. The gyroscope can enable the controller to determine the orientation of the display.

The system can include an acceleration member that measures proper acceleration. The acceleration member can be an accelerometer. The acceleration member can be operatively coupled (e.g., in communication with) the controller.

The system can enable the user to create media. For example, the user can select a picture and modify the picture to generate media for display. The media can be created on a mobile electronic device of the user, such as a portable computer or Smart phone.

Display devices (e.g., wearable devices) of the present disclosure can include various features. A display device can have a display with a touchscreen (e.g., capacitive touchscreen), a GPS, and an accelerometer. The accelerometer may be used, for example, for movement detection and power management, as well as making sure that an image (or expression) on the display is always properly oriented (e.g., north/south or up/down). The display can be for customizable self-expression and connecting to a platform to allow for connection options. The display device may be readily mountable on the user or other object, and may be readily removable from the user or other object. The display device may be mountable with a magnet, which can allow the user to mount and remove the display device without having to take of the magnets. The display device can have an energy storage unit, such as a battery. The display device may be at least partially or fully powered by solar energy. In such a case, the display device can include solar cells. The display device may have an electronic paper display ("E ink") which may have electrophoretic ink. Such a display may be a bistable display that may be usable for reduced or low power consumption.

Figure 17:
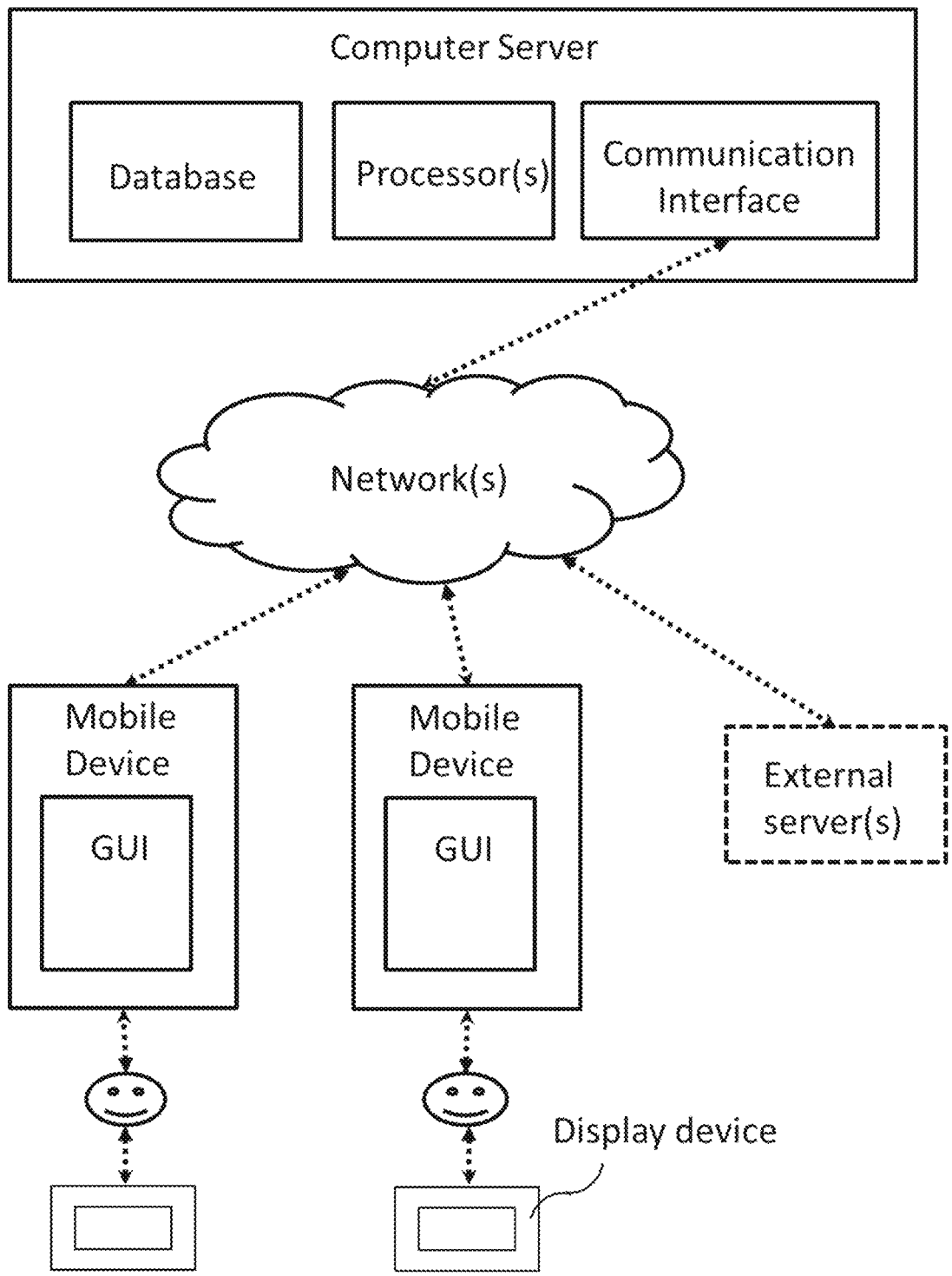
FIG. 17 shows a computer server-client environment in accordance with some embodiments.

In some embodiments, the computer server-client environment can comprise client-side processing executed on one or more mobile devices, and server-side processing executed on a computer server. The one or more mobile devices can communicate with the computer server through one or more networks. The one or more mobile devices can be associated with one or more users. As shown in FIG. 17, one or more display devices (e.g., wearable displays, flexible displays, remote visual curvilinear display, mobile displays) can be further associated with the one or more users.

With continued reference to FIG. 17, multiple display devices can be in communication with a computer server through electronic devices of users. The computer server can facilitate the generation, storage and sharing of media. In some examples, a user views media on a first display device and requests a copy of the media on an electronic device of the user. The computer server provides a copy of the media to the user for display on a display device of the user (e.g., visual curvilinear display device). The computer server may retrieve an item of value from the user, such as a donation.

In some embodiments, the computer server can comprise one or more processors, one or more databases, and a communication interface (e.g., I/O interface) to one or more mobile devices, one or more display devices, and/or one or more external servers. The communication interface to one or more mobile devices and/or display devices can facilitate the processing of input and output associated with the mobile devices and/or display devices. The communication interface to external servers can facilitate communications with the external services (e.g., merchant websites, credit card companies, social network platforms, advertisement services, and/or other processing services).

One or more processors can obtain requests for performing account operations from one or more mobile devices and/or display devices, process the requests, identify data associated with the user account on the one or more mobile devices and/or display devices. The database stores various information, including but not limited to, account information associated with each user, device information associated with each user account, media/expression information associated with each user account, and usage data associated with each user account on a certain mobile device. The database may also store a plurality of record entries relevant to the activities of respective accounts of each user (e.g., previously displayed expressions), and mobile devices and display devices associated with each user.

The present disclosure provides a digital LED, nanotechnology and other related display technology-based button that can combine technology and fashion to offer the user an opportunity for creative self-expression, connection and manifestation. The user has the ability to impact positive social and environmental change through intentionally and expression from personal to global. In one embodiment the digital LED, nanotechnology and other related display technology based wrist band is a customizable digital cap worn for the purpose of self-expression and the greater good. It can be used to express, connect and manifest positive change.

The present disclosure provides a digital LED, nanotechnology and other related display technology-based button that can provide: (i) a tangible delivery system of a message and the psychological spiritual intention of the messenger him/herself; (ii) a sense of identity, a pride, uniqueness, a cool factor and the like, (iii) a sense of self, belonging, connection, meaning, purpose, fulfillment, being heard and considered; and (iv) an ability to impact the outcomes that serve their lives and the greater community in which they live.

The digital LED, nanotechnology and other related display technology based wrist band displays images and text, uploads, displays, ends wirelessly. The digital LED, nanotechnology and other related display technology based wrist band can use a user's or a third party's mobile device to communicate. The digital LED, nanotechnology and other related display technology based wrist band is in communication with the mobile device.

Sensors can be included in the digital LED, nanotechnology and other related display technology based wrist band. In one embodiment color codes are utilized with the wristband that are displayed to reflect what causes the user is affiliated with and cares about.

The wristband can be uploaded with mobile devices, desktop computers, other devices including but not limited to BEAM devices.

As non-limiting examples, the wristband can display a variety of different messages, cause-based intentions such as a breast cancer ribbon, rainbow GLTG, and the like.

The present disclosure provides a digital LED, nanotechnology and other related display technology-based wrist band that can combine technology and fashion to offer the user an opportunity for creative self-expression, connection and manifestation. The user has the ability to impact positive social and environmental change through intentionally and expression from personal to global. In one embodiment the digital LED, nanotechnology and other related display technology based wrist band is a customizable digital cap worn for the purpose of self-expression and the greater good. It can be used to express, connect and manifest positive change.

The present disclosure provides a digital LED, nanotechnology and other related display technology-based wrist band that provides: (i) a tangible delivery system of a message and the psychological spiritual intention of the messenger him/herself; (ii) a sense of identity, a pride, uniqueness, a cool factor and the like, (iii) a sense of self, belonging, connection, meaning, purpose, fulfillment, being heard and considered; and (iv) an ability to impact the outcomes that serve their lives and the greater community in which they live.

The digital LED, nanotechnology and other related display technology based wrist band displays images and text, uploads, displays, ends wirelessly. The digital LED, nanotechnology and other related display technology based wrist band can use a user's or a third party's mobile device to communicate. The digital LED, nanotechnology and other related display technology based wrist band is in communication with the mobile device.

Sensors can be included in the digital LED, nanotechnology and other related display technology based wrist band.

In one embodiment color codes are utilized with the wristband that are displayed to reflect what causes the user is affiliated with and cares about.

The wristband can be uploaded with mobile devices, desktop computers, other devices including but not limited to BEAM devices.

As non-limiting examples, the wristband can display a variety of different messages, cause based intentions such as a breast cancer ribbon, rainbow GLTG, and the like.

Systems and Applications for Displaying or Projecting Media and Expressions

In another aspect, a method for displaying or projecting media on a display device comprises providing a mobile (or portable) electronic device comprising a display screen having a graphical user interface (GUI) with one or more graphical elements that permit a user to input a selection of the media to be displayed or projected by the display device per a display and/or location preference or schedule selected by the user for displaying or projecting the media on the display device. The GUI can include a plurality of graphical elements, such as text and/or images. The graphical elements may be static or dynamic. The display device can be a remote visual curvilinear display. Next, with the aid of the one or more graphical elements on the display screen, the input of the selection of the media can be received from the user. The remote visual curvilinear display can then be directed to display or project the media according to the display and/or location preference or schedule. The GUI can be part of an application (app) executed on the mobile electronic device.

An item of value can be received from the user in exchange for directing the remote visual curvilinear display to display the media. The item of value can be money, such as a donation. The item of value can be credit or a promise of future service.

The user can provide an input or selection for the display and/or location preference or schedule. The input or selection can be provided on the GUI. In some cases, the input or selection is provided using one or more graphical elements on the GUI.

The display device can be separate or remote from the mobile electronic device. For example, the display device is located at least 0.1 m, 1 m, 10 m, or 100 m away from the mobile electronic device. As another example, the display device is located from about 0.01 m to 1 m from the mobile electronic device. As another example, the display device is separate from but in proximity to or attached to the mobile electronic device.

The display device can be any display device describe herein. For example, the display device can be flexible. The display device can include a display and a support member. The display can be a capacitive or resistive touchscreen. The support member can be a button. The support member can include a pin, clip, hook, loop, lanyard or magnetically attractable lock. The display can be circular or have other shapes, as described elsewhere herein. The display device can be modular.

The display device can orient the media as necessary such that the media is displayed or projected at an orientation selected by the user. As an alternative or in addition to, the display device can orient the media as necessary such that the media is displayed or projected along a direction that is parallel to the gravitational acceleration vector.

The display device can be mounted on a body of the user. In some cases, the display device is not mounted on a wrist of the user. The display device can be mounted on an inanimate object.

The user can provide input to edit the media. The input can be provided in the GUI. The input can include a selection of various properties of the media (e.g., size, color or brightness). The input can include the addition of text and/or other media to the media.

The user can provide an input of a selection for one or more additional media. The user can provide an input as to an order in which the media and the one or more additional media is to be displayed on the remote visual curvilinear display. Such inputs can be provided by the user through the GUI.

In another aspect, a mobile electronic device for displaying or projecting media on a display device comprises a display screen having a graphical user interface (GUI) with one or more graphical elements that permit a user to input a selection of the media to be displayed or projected by the display device per a display and/or location preference or schedule selected by the user for displaying or projecting the media on the display device. The mobile electronic device can include a computer processor operatively coupled to the display screen and the display device, wherein the computer processor is programmed to (i) receive the input of the selection of the media, and (ii) direct the display device to display or project the media according to the display and/or location preference or schedule. The display device can be as described elsewhere herein. The GUI can be part of an application (app) executed on the mobile electronic device.

The GUI can include one or more graphical elements that permit the user to edit the media. The GUI can permit the user to input the selection by dragging and dropping the media, such as with a pointing device (e.g., mouse) or a finger of the user.

The controller can be programmed to receive an item of value from the user in exchange for displaying the media on the display device. The item of value can be money, such as a donation. The item of value can be credit or a promise of future service.

The one or more graphical elements can permit the user to input or select the display and/or location preference or schedule. The computer processor can be programmed to receive the input of the display and/or location preference or schedule.

The computer processor can be programmed to receive an input of a selection for one or more additional media from the user. The computer processor can be programmed to receive an input from the user as to an order in which the media and the one or more additional media is to be displayed on the remote visual curvilinear display. Such inputs can be received from the user through the GUI.

Another aspect of the present disclosure provides systems and applications for facilitating the display of expressions on a display device. The expressions can include media.

Flexible Displays

The flexible displays may be composed of one or more flexible layers and may be mounted on top of or under a cover layer. For example, a flexible display may be mounted on top of a rigid support member or may be mounted on the underside of a rigid cover layer. The display may be mounted on a rigid surface or a surface that is not rigid.

Electronic devices may also be provided with user interface components (input-output components) such as buttons, microphones, speakers, piezoelectric actuators (for receiving electrical input from a user or tactile feedback to users), or other actuators such as vibrators, pressure sensors, and other components. These components may be mounted under portions of a flexible display.

During operation of the electronic device, the flexibility of the display may allow a user to interact with the component through the display. For example, sound waves from a speaker or localized vibrations from an actuator in an electronic device may pass through the flexible display. The flexible display may also allow an internal microphone, pressure sensor, or force sensor (or other internal components) to receive external input. For example, a user may deflect a flexible display using a finger or other external object, barometric pressure may be monitored through the flexible display, or sound waves may be received through the flexible display.

Components may receive input or may supply output through a physically deformed portion of the flexible display (e.g., a deformation that occurs when a user presses on the display to compress the component). In some configurations, a portion of the flexible display may serve as a membrane that forms part of a microphone, speaker, pressure sensor, or other electronic component.

The ability of a user to compress a component such as a button switch by deforming the flexible display may allow the area of a device available for visual display to be enlarged. For example, the active area of a flexible display may overlap a component such as a button or speaker.

If desired, a flexible display may be deformed by an internal component to provide audio or tactile feedback to a user. For example, structures inside an electronic device may be pressed against portions of a flexible display to temporarily create an outline for a virtual on-screen button or to temporarily create a grid of ridges that serve to delineate the locations of keys in a keyboard (keypad).

Display Components

The present disclosure provides various displays for use with systems and methods of the present disclosure. In one embodiment, the display includes an electronic circuit stratum with signal transmitting components for transmitting user input signals to a display signal generating device for controlling display information transmitted from the display signal generating device. Signal receiving components receive the display information transmitted from the display signal generating device. Display driving components drive the display layer according to the received display information. A user input receives user input and generates the user input signals. A battery provides electrical energy to the electronic circuit stratum, the user input and display components. The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display and the second display information at a second location on the display stratum. At least some of the components in the battery, display, user input and electronic circuit stratums are formed by printing electrically active material to form circuit elements including resistors, capacitors, inductors, antennas, conductors and semiconductor devices.

The battery may comprise a first current collector layer; an anode layer; an electrolyte layer; a cathode layer and a second current collector layer. The electrolyte material may be microencapsulated, which may make the battery particularly suitable for formation by a printing method, such as inkjet printing, laser printing, magnetically reactive printing, electrostatically reactive printing, or other printing methods that are adaptable to the use of microencapsulated materials. The battery is formed substantially over the entire top surface of the flexible substrate. By this construction, the inventive wireless display device may be formed as thin as possible, while having suitable battery power density, and while being provided with the advantageous electronic shielding qualities provided by the battery layers. The user input may comprise a grid of conductive elements each conductive elements for inducing a detectable electrical signal in response to a moving magnetic field. The user input may comprise a touch screen formed by printing pressure sensitive or capacitance sensitive elements on an insulating layer.

The display may include conductive leads connected with each light emitting pixel for applying the electrical energy selectively to each light emitting pixel under the control of the display driving components.

The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display and the second display information at a second location on the display stratum.

At least some of the components in the electronic circuit are formed by printing electrically active material to form circuit elements including resistors, capacitors, inductors, antennas, conductors and semiconductor devices.

A content formatting method of formatting substantially static display content is disclosed that greatly reduces the onboard processing capacity required by the wireless display. This content formatting method is effective for enabling a large number of simultaneous users. The source computer composes the substantially static display content into a video frame of information. The wireless display only needs as much memory as is needed to store the desired number of single frames of video information.

In one embodiment the display includes light emitting pixels for displaying information. In one embodiment the light emitting pixels are formed by printing a pixel layer of light-emitting conductive polymer.

Use of Processors

In one embodiment, a user's displayed expression, connection and manifest for positive change. profile is received by one or more processors at the back-end where one or more of the following are performed: (i) extraction of unique features of the expression, connection and manifestation, and being counted as part of an aggregate dashboard reflection; (ii) enhances distinguishing aspects of the expression, connection and manifestation; and (iii) compression of data related to the expression, connection and manifestation. The one or more processors can compare received data from the display device with that in a database.

In one embodiment the display/screen is made larger through the use of optical components and creates a projection exterior to the display/screen. In one embodiment the display/screen can project out in front of the wearer's head. The screen may be clear in color, black, white or change colors when not being used.

In one embodiment colors are used for the display device as a key code for display devices that provide individual creative self-expression, connection, and manifestation. The display device can include add-ons, a GPS camera and the like.

The display device can have dimensionality to hold a display or screen coupled or included with it. The display or screen may be removable from the display device.

As non-limiting examples, the display device can be made of a variety of materials including but not limited to: recycled materials, cloth from different things; plastics; natural materials, an eco-friendly material and the like.

In one embodiment the display device houses the components, including electronics that drives the display. An energy source, including but not limited to one or more batteries, can be included. As non-limiting examples, other energy sources can be utilized including but not limited to: solar; walking or other motion; wind and the like. The wearable can be chargeable, e.g., plugged in. In one embodiment the display device is powered via mesh technology.

The display can be positioned on the front, back, side and the like and can be detachable. The display can be made of flexible and non-flexible materials including but not limited to glass, plastics and the like.

The display can be different sizes shapes. In one embodiment the display is light sensitive and change color relative to light. In one embodiment the display includes a frame to help protect it from sun reflection. In one embodiment the frame is up-loadable to change color. The display can be flat, protrude out to some degree, and be a visor and the like to make it more viewable.

The display device can adjust to different sizes. The display device can be module and also morph into a different product worn in a different way.

In one embodiment the display device and/or display/screen can change colors. This can be achieved through the use of LED's and the like. All or a portion of the display device can change color. In one embodiment, the display device includes one or more sensors that pick up different aspects of the wear's energy, brain function, heartbeat, level of stress and busy thinking, and the like.

In one embodiment the display device it can change colors both at the screen level and the entire display device or embodiment adjacent to the screen which can be based on sound, and other extremities which can influence the user. This may be identical or similar to a sound responsive sculpture.

The display device can include additional electronic components including but not limited to, a camera, in or behind the screen, GPS functionality and the like, and can do everything that a mobile device can do. In one embodiment, the display device does not need the full power of a mobile device.

The display device can communicate with a telemetry site with a backend. The telemetry site can include a database of identification references, including user activity, performance and reference information for each user, and/or for each sensor and location. The user activity, performance metrics, data and the like captured by system can be recorded into standard relational databases SQL server, and/or other formats and can be exported in real-time. All communication is done wirelessly.

The telemetry system provides a vehicle for a user to: (i) set up its profile which can include their basic information, use display devices that provide, individual creative self-expression, connection, manifestation intentions; (ii) create and upload what the user wants to upload such as images, pictures, text and combinations thereof; and (ii) look at third parties self-expression, connections and manifestations.

It is noted that when something has political fire or interest they often change their social network profiles. Display devices of the present disclosure may be used for such purposes and as a supplement. Display devices of the present disclosure may be used to join a communal expression, political or social, etc.

The present disclosure provides an aggregate dashboard of what people are sharing; takes this natural behavior and implement it in the virtual and physical world; uploads social media information, pictures, messages and images; provides a mechanism to communicate with organizations; and connects all of this to different organizations that can then take action.

Individuals may join community organizations that share similar values and goals, participate in an eco-system of shared expressions, be part of an aggregate dashboard that sees all of this and determines the mood derived from the expressions of users. This may be reflected back into social networks.

Display devices of the present disclosure can be used to create revenue streams for the user by logging into and sharing personal information with companies that will pay for their message to be worn for periods of time based no exposure. Walking billboards and revenue flow based on wearers impact for advertiser. This may provide the opportunity for paid and unpaid communal expression and advertising for revenue.

Software

Figure 4:
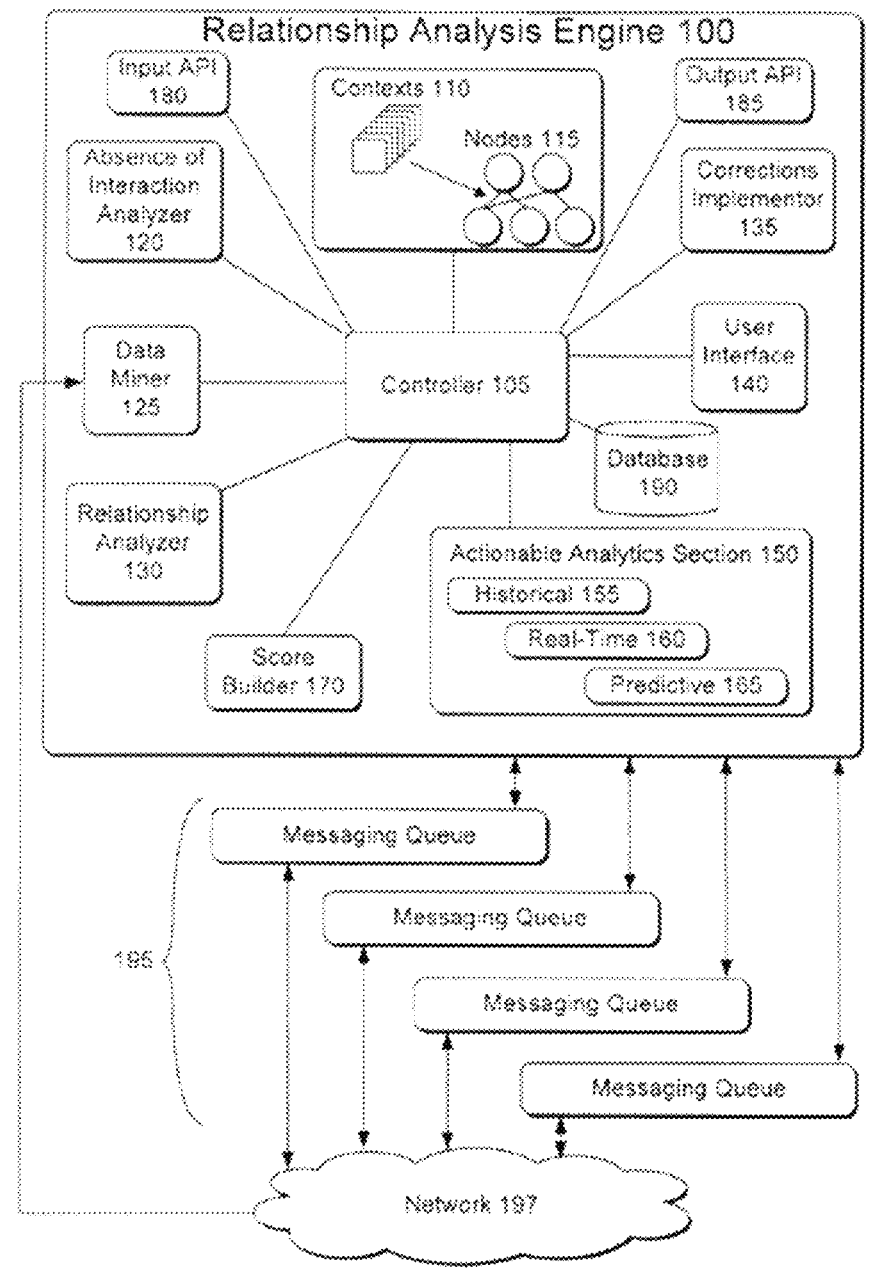
FIG. 4 illustrates a block diagram of a relationship analysis engine according to one embodiment of the present disclosure.

The present disclosure provides software that enables media to be displayed or projected using display devices provided herein. FIG. 4 illustrates a block diagram of a relationship analysis engine 100. The relationship analysis engine 100 can include a controller 105. The controller 105 is coupled to or otherwise associated with several different components, which can contribute to determining and quantifying the quality of one or more relationship between different persons or entities. The controller 105 can include a processor, circuit, software, firmware, and/or any combination thereof indeed, any of the components of the relationship analysis engine 100 can include a processor, circuit, software, firmware, and/or any combination thereof. It will be understood that one or more of the components of the relationship analysis engine 100 can be part of or otherwise implemented by the controller 105.

A data miner 125 is coupled to or otherwise associated with the controller 105 and can mine relationship information on a network (e.g., 197), such as Systems Network. The data miner 125 can determine or otherwise define a plurality of sender nodes, such as nodes 115. Each sender node represents a sender of a message, as further described in detail below. In addition, the data minder 125 can determine or otherwise define a plurality of recipient nodes, such as nodes 115. Each recipient node represents a receiver of a message, as further described in detail below.

The data miner 125 can automatically determine one or more contexts 110 in which each message is transmitted between a sender node and a recipient node. A context can include, for example, a work-related context, a personal friendship context, an acquaintance context, a business transaction context, or the like. The data miner 125 can also automatically determine a timing sequence for when each message is transmitted between the sender node and the recipient node.

An actionable analytics section 150 is coupled to or otherwise associated with the controller 105 and can analyze messages that are transmitted between the sender nodes and the recipient nodes. The messages can be received directly from one or more message queues such as message queues 195, analyzed, and returned to the message queues. Alternatively, the messages can be received over the network 197 by the data miner 125. The actionable analytics section 150 can produce historical analytics 155, real-time analytics 160, and predictive analytics 165 associated with at least one relationship based on the analyzed transmitted messages, the mined relationship information, the one or more contexts 110, and/or the timing sequence. The actionable analytics section 150 can also generate a relationship indicator for the relationship, which can include different icons, patterns, and/or colors representing past, present, and predictive quality of relationship values, as further described in detail below.

A relationship analyzer can determine one or more waypoints between transitions from one quality of relationship value to another. Such waypoints can be scored using a score builder 170. In addition, the quality of relationship values themselves can be assigned a score using the score builder 170. The scores can be used in determining the past, present, and predictive quality of relationship values, as further described in detail below. The relationship analyzer can be coupled to or otherwise associated with the controller 105, and can determine whether the relationship is productive or non-productive. The determination of whether the relationship is productive or non-productive can be made based on the context in which the message is sent or received. The relationship analyzer can also determine the weak points and/or the strong points of a relationship.

The analysis engine 100 can include a user interface 140. The user interface 140 can receive input from a user to manually define the sender nodes and the recipient nodes (e.g., 115). In other words, constructs of sender nodes and recipient nodes can be built, which represent the persons or entities that actually send and receive messages. Moreover, the user interface 140 can receive input from a user to manually define one or more contexts 110 in which each message is transmitted between a sender node and a recipient node.

The analysis engine 100 can further include a corrections implementer 135, which can be coupled to or otherwise associated with the controller 105. The corrections implementer 135 can detect one or more inaccuracies in the mined relationship information and automatically correct such inaccuracies. For instance, if weak points of a relationship should have been assessed as strong points, or vice versa, then the corrections implementer 135 can correct such inaccuracies and thereby improve the understanding of the relationship.

In some cases, an absence of interaction can be used to draw certain conclusions. An absence of interaction analyzer can be coupled to or otherwise associated with the controller 105, and can detect such absences of interaction. For instance, if a sender node sends a message to a recipient node, and the recipient node fails to reply to the message, then a conclusion can be drawn by the absence of interaction analyzer. The conclusion can be that the recipient is simply unavailable to respond. Alternatively, the conclusion can be that there is a flaw in the relationship between the sender node and the recipient node.

The actionable analytics section 150 can produce the historical analytics 155, the real-time analytics 160, and the predictive analytics 165 using the corrected inaccuracies of the corrections implementer 135, the absence of interaction detection of the absence of interaction analyzer, and the determination of the relationship analyzer.

An input application programming interface (API) 180 provides an input interface to the relationship analysis engine 100 from one or more third party applications or software. For example, the input API 180 can allow an interface to multiple modes of data feed including video, voice, and/or text information. In addition, an output API 185 provides an output interface from the relationship analysis engine 100 to one or more third party applications or software. For example, the output API 185 can allow third party applications or software to utilize the analysis engine 100 and display information received from the analysis engine 100 in their own user interface. The analysis engine 100 can provide real-time feedback on the quality of relationships between and among the nodes through the user interface 140, the input API 180, and/or the output API 185.

The relationship analysis engine 100 can also include a database 190, which can be coupled to or otherwise associated with the controller 105. The database 190 can store any information related to any of the components of the relationship analysis engine 100, including, for example, relationship information mined by the data miner 125, historical analytics 155, real-time analytics 160, predictive analytics 165, scores generated by the score builder 170, suggestions and tracers to display specific exhibits for the scores, and the like.

The relationship analysis engine 100 can be embodied in various forms. For example, the relationship analysis engine 100 can be operated using a dedicated rack-mount hardware system associated with a datacenter. In some embodiments, the relationship analysis engine 100 operates in association with a computing device or computer. In some embodiments, the relationship analysis engine 100 is a widget that can be installed or otherwise associated with a web page. In some embodiments, the relationship analysis engine 100 is embodied as a smart-phone application. In some embodiments, the relationship analysis engine 100 is an application associated with a social network. In some embodiments, the relationship analysis engine 100 is an add-on for relationship management software such as customer relationship management (CRM) software, vendor resource management (VRM) software, and/or environmental resource management (ERM) software, or the like.

Figure 5:
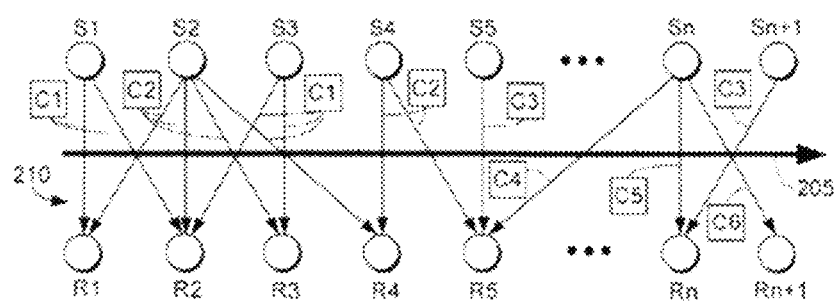
FIG. 5 illustrates a flow diagram of messages transmitted between sender and recipient nodes, in association with different contexts in one embodiment of the present disclosure.

In an example, FIG. 5 illustrates a flow diagram of messages 210 transmitted between sender nodes (e.g., S1, S2, S3, S4, S5, . . . , Sn, Sn+1) and recipient nodes (e.g., R1, R2, R3, R4, R5, . . . , Rn, Rn+1), in association with different contexts (e.g., C1, C2, C3, C4, C5, and C6).

The messages 210 are transmitted between the sender nodes and the recipient nodes in accordance with a timing sequence 205. Each of the messages 210 can have associated therewith a context, which can be different from one message to the next. For example, as shown in FIG. 5, the messages sent between S1 and received by R1 and R2 can have a context C1 associated therewith. By way of another example, the messages sent between Sn and recipients R5, Rn, and Rn+1 can have associated therewith contexts C4, C5, and C6, respectively. It will be understood that messages sent from a given sender node can have the same or different contexts.

The sender nodes are representative of senders of messages, which can be persons, entities, computers, or the like. The recipient nodes are representative of receivers of messages, which can be persons, entities, computers, or the like. Each node can represent a single person or entity, or alternatively, a group of people or entities. For instance, a node can represent a subscriber list to a worldwide audience. The messages 210 can include e-mails, blogs, short message service (SMS) text messages, posts, or the like, and can be organized as threads.

The actionable analytics section 150, FIG. 4, can produce the historical analytics 155, the real-time analytics 160, and the predictive analytics 165 pertaining to one or more relationships based on one or more contexts and the timing sequence.

Figure 6A:
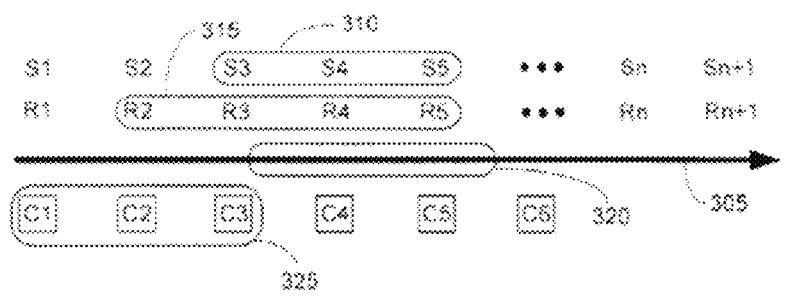
FIG. 6A illustrates selections of parameters for determining one or more relationships according to one embodiment of the present disclosure.

FIG. 6A illustrates selections of parameters for determining one or more relationships according to an example embodiment of the invention. One or more sender nodes can be selected, such as sender nodes 310. One or more receiver nodes can be selected, such as receiver nodes 315. A time interval of interest 320 can be selected on the time sequence 305. One or more contexts can be selected, such as contexts 325. It will be understood that these are exemplary selections, and any combination of parameters can be selected. The selection can be made, for example, through the user interface 140, the input API 180, and/or the output API 185. In some embodiments, the selection is made algorithmically and/or automatically.

Figure 6B:
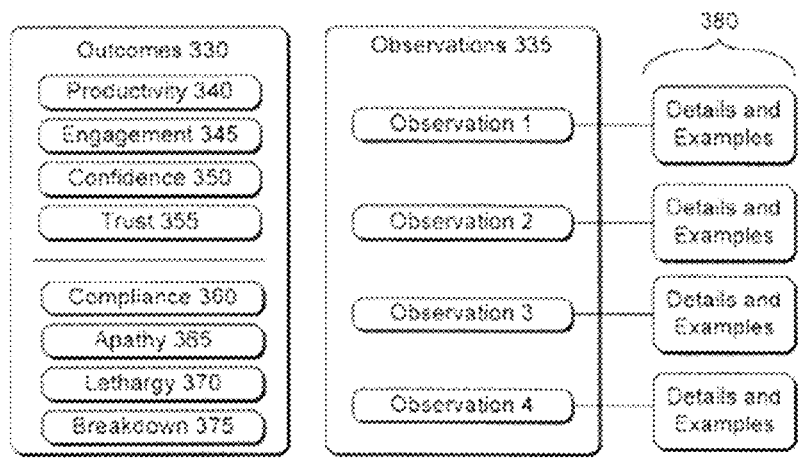
FIG. 6B illustrates an analysis and display of outcomes and observations associated with the selections of FIG. 6A according to one embodiment of the present disclosure.

FIG. 6B illustrates an analysis and display of outcomes and observations associated with the selections of FIG. 6A. After the selection of parameters, outcomes 330 and/or observations 335 can be generated and/or displayed. The outcomes 330 and/or observations 335 are based on the selection of parameters, the mined relationship information, and other determinations as set forth in detail. It will be understood that the relationship analysis engine 100, or components thereof, can produce the outcomes 330 and/or the observations 335.

The outcomes can include one or more quality of relationship values, such as productivity 340, engagement 345, confidence 350, trust 355, compliance 360, apathy 365, lethargy 370, and/or breakdown 375. The observations 335 can include one or more observations. For example, observation 1 can be "Lack of communication of outcome." Observation 2 can be "Emphasis on action items." Observation 3 can be "Partial acknowledgement of purpose." Observation 4 can be "Disconnected action items." It will be understood that these are exemplary observations, and other similar or different kinds of observations can be made.

In addition, details and examples (e.g., 380) can provide further detail and/or examples of the observations 335. The details and examples can include buttons 380, which can be selected so that the further detail and/or examples of the observations 335 and/or outcomes 330 can be displayed.

Figure 7A:
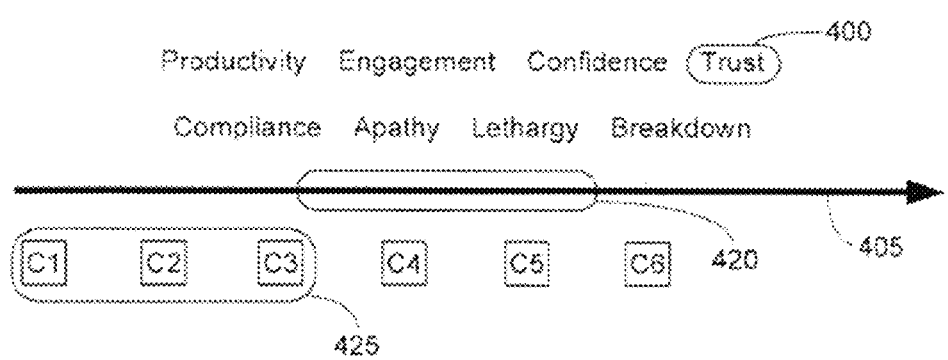
FIG. 7A illustrates selections of parameters for determining one or more relationships according to according to one embodiment of the present disclosure.

FIG. 7A illustrates selections of parameters for determining one or more relationships according to another example embodiment of the invention. One or more quality of relationship values, such as trust 400, can be selected. A time interval of interest 420 can be selected on the time sequence 405. One or more contexts can be selected, such as contexts 425. It will be understood that these are exemplary selections, and any combination of parameters can be selected. The selection can be made, for example, through the user interface 140, the input API 180, and/or the output API 185. In some embodiments, the selection is made algorithmically and/or automatically.

Figure 7B:
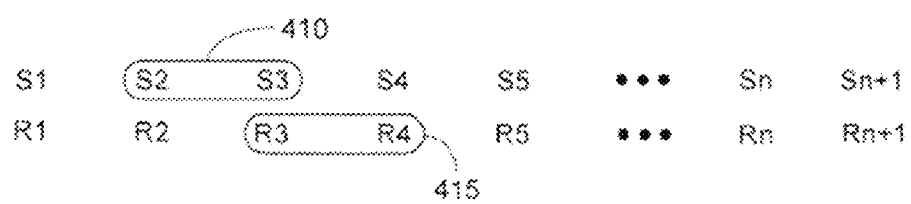
FIG. 7B illustrates an analysis and display of one or more relationship associated with the selections of FIG. 7A according to one embodiment of the present disclosure.

FIG. 7B illustrates an analysis and display of one or more relationship associated with the selections of FIG. 7A. After the selection of parameters, one or more sender nodes, such as sender nodes 410, can be highlighted or otherwise displayed, which correspond to the prior selections. Moreover, one or more recipient nodes, such as recipient nodes 415, can be highlighted or otherwise displayed, which correspond to the prior selections. It will be understood that the highlighted sender nodes 410 and the highlighted recipient nodes 415 are exemplary, and other similar or different kinds of selections and highlights can be made.

The determination for which of the sender nodes and recipient nodes are to be highlighted or otherwise displayed is made based on the selection of parameters, the mined relationship information, and other determinations as set forth in detail above. It will be understood that the relationship analysis engine 100, or components thereof, can produce the highlights or otherwise display the sender nodes 410 and/or the recipient nodes 415. Moreover, the sender nodes 410 and/or the recipient nodes 415 can be highlighted or otherwise displayed in accordance with the determinations of quality of relationships, which conform to the selections described above.

Figure 8:
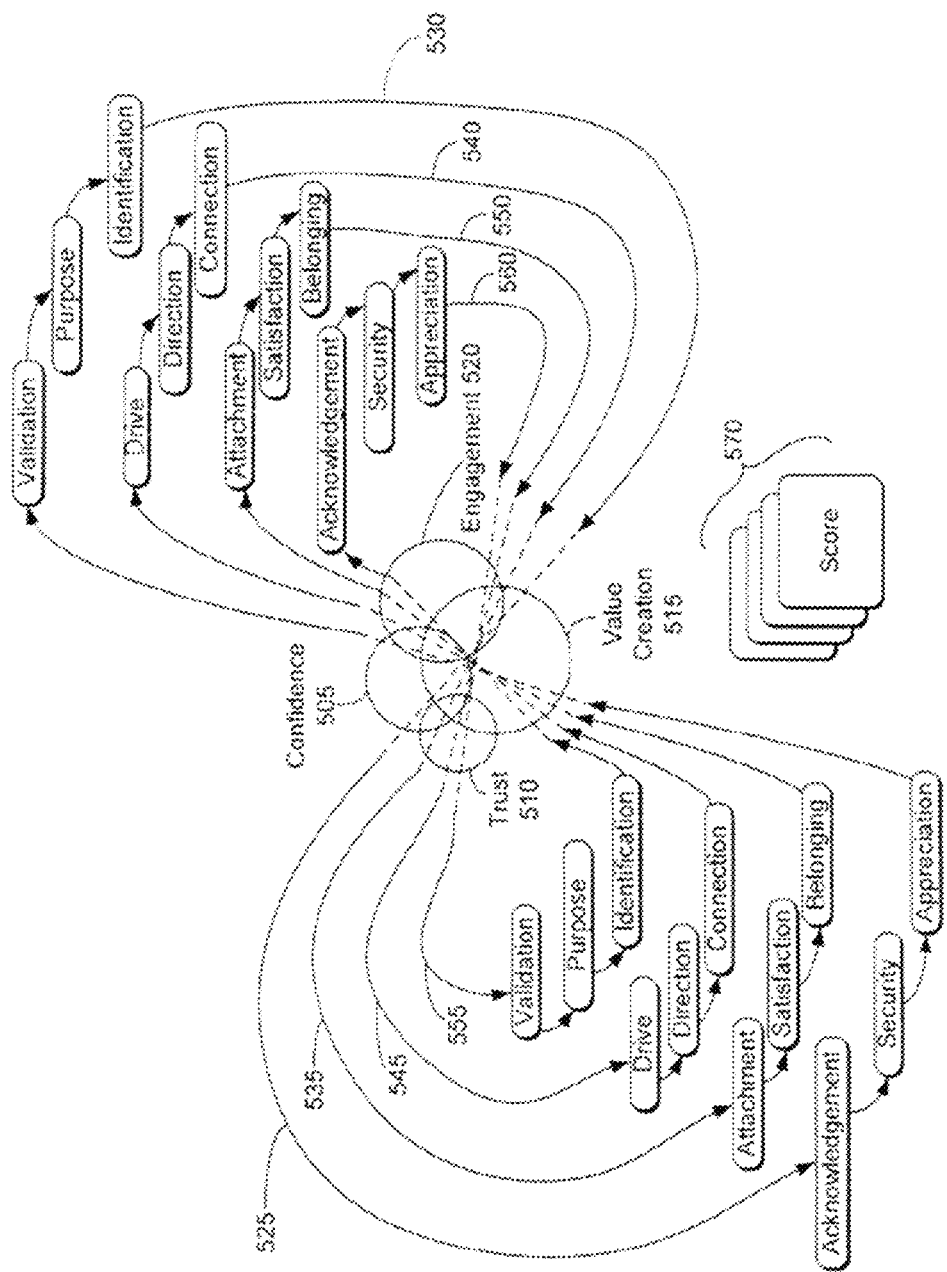
FIG. 8 illustrates a diagram of waypoints between transitions from one quality of relationship value to another quality of relationship value according to one embodiment of the present disclosure.

FIG. 8 illustrates a diagram of waypoints between transitions from one quality of relationship value to another quality of relationship value according to some example embodiments. The quality of relationship values can include, for example, trust 510, confidence 505, engagement 520, and/or value creation 515. These quality of relationship values represent values that are similar to or the same as the outcomes of trust 355, confidence 350, engagement 345, and productivity 340, respectively, discussed above with reference to FIG. 6B.

A relationship can transition from one quality value to any other quality value. For example, the relationship can transition from trust 510 to confidence 505, from confidence 505 to value creation 515, from engagement 520 to trust 510, from confidence 505 to engagement 520, and so forth. In the course of such transitions, the relationship can pass through various waypoints. In other words, the relationship analyzer, FIG. 4, can determine one or more waypoints between transitions from one quality of relationship value to another quality of relationship value.

The waypoints can be arranged along different paths. For instance, path 525 can be associated with value creation 515, and along path 525, the relationship can pass through waypoints of acknowledgement, security, and appreciation. The path 525 can continue to path 530, which can also be associated with value creation 515. Along path 530, the relationship can pass through waypoints of validation, purpose, and identification.

By way of another example, path 535 can be associated with engagement 520, and along path 535, the relationship can pass through waypoints of attachment, satisfaction, and belonging. The path 535 can continue to path 540, which can also be associated with engagement 520. Along path 540, the relationship can pass through waypoints of drive, direction, and connection.

By way of yet another example, path 545 can be associated with confidence 505, and along path 545, the relationship can pass through waypoints of drive, direction, and connection. The path 545 can continue to path 550, which can also be associated with confidence 505. Along path 550, the relationship can pass through waypoints of attachment, satisfaction, and belonging.

By way of still another example, path 555 can be associated with trust 510, and along path 555, the relationship can pass through waypoints of validation, purpose, and identification. The path 555 can continue to path 560, which can also be associated with trust 510. Along path 560, the relationship can pass through waypoints of acknowledgement, security, and appreciation.

It will be understood that the paths and waypoints disclosed herein are exemplary, and other similar paths and waypoints can be associated with the quality of relationship values of trust 510, confidence 505, engagement 520, and/or value creation 515.

The score builder 170, FIG. 4, can assign a score (e.g., 570) to one or more of the waypoints. The scores among the waypoints can be different in comparison one with another. For example, the score for the waypoint of appreciation along path 525 can be higher than the score for the waypoint of attachment along path 550. When a relationship passes through one of the waypoints, the score builder 170 can assign or otherwise add to the relationship the score associated with the given waypoint. The overall score assigned by the score builder 170 to a given relationship can be used in the determinations made by the relationship analyzer, of FIG. 4, and/or other components of the relationship analysis engine 100.

Furthermore, the score builder 170 can assign or otherwise add to the relationship a score (e.g., 570) for each quality of relationship value attained by the relationship. For example, a different score can be associated with each of the quality of relationship values of trust 510, confidence 505, engagement 520, and value creation 515, and the associated score can be assigned to the relationship having the particular quality of relationship value. The overall score assigned by the score builder 170 to a given relationship can include this aspect and be used in the determinations made by the relationship analyzer, of FIG. 4, and/or other components of the relationship analysis engine 100.

For example, the actionable analytics section 150, FIG. 4, can produce the historical analytics 155, the real-time analytics 160, and the predictive analytics 165 pertaining to one or more relationships based on the score of the one or more waypoints, the score for the quality of relationship, and/or the overall score assigned to the relationship. The messages from which relationship information is extracted can be used to determine the different paths and/or waypoints. The messages can be analyzed, categorized, sorted, grouped, and/or tagged in terms of nodes (e.g., sender or receiver), contexts, and/or waypoints.

Figure 9:
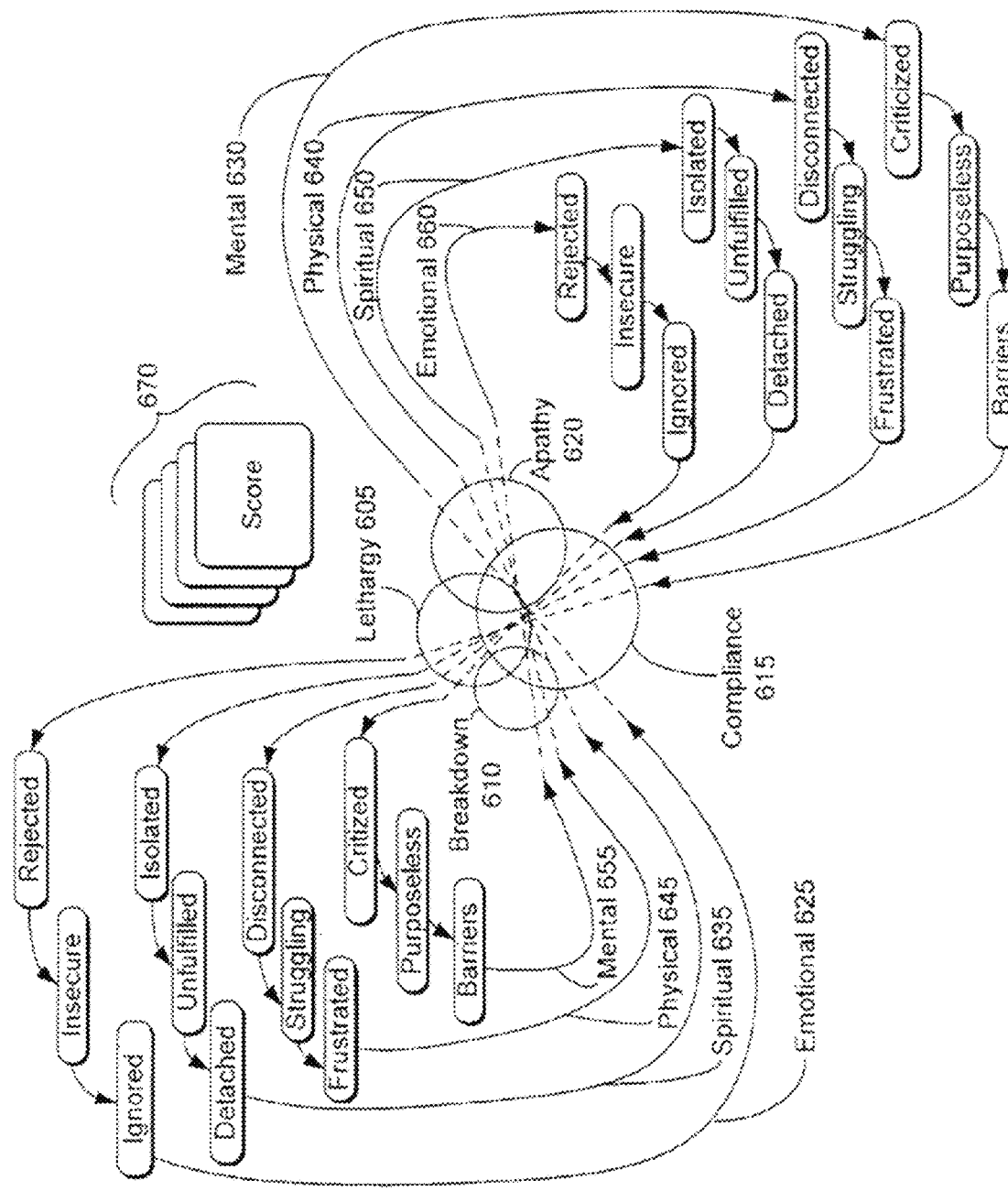
FIG. 9 illustrates another diagram of waypoints between transitions from one quality of relationship value to another quality of relationship value according to one embodiment of the present disclosure.

FIG. 9 illustrates another diagram of waypoints between transitions from one quality of relationship value to another quality of relationship value according to some example embodiments. The quality of relationship values can include, for example, breakdown 610, lethargy 605, apathy 620, and/or compliance 615. These quality of relationship values can represent values that are similar to or the same as the outcomes of breakdown 375, lethargy 370, apathy 365, and compliance 360, respectively, discussed above with reference to FIG. 6B.

A relationship can transition from one quality value to any other quality value. For example, the relationship can transition from breakdown 610 to lethargy 605, from lethargy 605 to compliance 615, from apathy 620 to breakdown 610, from lethargy 605 to apathy 620, and so forth. It will also be understood that the relationship can transition from one quality of relationship value illustrated in FIG. 9 to another quality of relationship value illustrated in FIG. 8. It will also be understood that the relationship can transition from one quality of relationship value illustrated in FIG. 8 to another quality of relationship value illustrated in FIG. 9.

In the course of such transitions, the relationship can pass through various waypoints. In other words, the relationship analyzer, FIG. 4, can determine one or more waypoints between transitions from one quality of relationship value to another quality of relationship value.

The waypoints can be arranged along different paths. For instance, emotional path 625 can be associated with breakdown 610, and along path 625, the relationship can pass through waypoints of rejected, insecure, and ignored. The path 625 can continue to mental path 630, which can also be associated with breakdown 610. Along path 630, the relationship can pass through waypoints of criticized, purposeless, and barriers.

By way of another example, spiritual path 635 can be associated with lethargy 605, and along path 635, the relationship can pass through waypoints of isolated, unfulfilled, and detached. The path 635 can continue to physical path 640, which can also be associated with lethargy 605.

Along path 640, the relationship can pass through waypoints of disconnected, struggling, and frustrated.

By way of yet another example, physical path 645 can be associated with apathy 620, and along path 645, the relationship can pass through waypoints of disconnected, struggling, and frustrated. The path 645 can continue to spiritual path 650, which can also be associated with apathy 620. Along path 650, the relationship can pass through waypoints of isolated, unfulfilled, and detached.

By way of still another example, mental path 655 can be associated with compliance 615, and along path 655, the relationship can pass through waypoints of criticized, purposeless, and barriers. The path 655 can continue to emotional path 660, which can also be associated with compliance 615. Along path 660, the relationship can pass through waypoints of rejected, insecure, and ignored.

It will be understood that the paths and waypoints disclosed herein are exemplary, and other similar paths and waypoints can be associated with the quality of relationship values of breakdown 610, lethargy 605, apathy 620, and compliance 615.

The score builder 170, FIG. 4, can assign a score (e.g., 670) to one or more of the waypoints. The scores among the waypoints can be different in comparison one with another. For example, the score for the waypoint of ignored along path 625 can be higher than the score for the waypoint of rejected along path 660. When a relationship passes through one of the waypoints, the score builder 170 can assign or otherwise add to the relationship the score associated with the given waypoint. The overall score assigned by the score builder 170 to a given relationship can be used in the determinations made by the relationship analyzer, FIG. 4, and/or other components of the relationship analysis engine 100.

Furthermore, the score builder 170 can assign or otherwise add to the relationship a score for each quality of relationship value attained by the relationship. For example, a different score can be associated with each of the quality of relationship values of breakdown 610, lethargy 605, apathy 620, and/or compliance 615, and the associated score can be assigned to the relationship having the particular quality of relationship value. The overall score assigned by the score builder 170 to a given relationship can include this aspect and be used in the determinations made by the relationship analyzer, of FIG. 4, and/or other components of the relationship analysis engine 100. It will be understood that the score that is added can be a negative score, thereby negatively affecting the overall score assigned to the relationship.

The actionable analytics section 150, FIG. 4, can produce the historical analytics 155, the real-time analytics 160, and the predictive analytics 165 pertaining to one or more relationships based on the score of the one or more waypoints, the score for the quality of relationship, and/or the overall score assigned to the relationship. The messages from which relationship information is extracted can be used to determine the different paths and/or waypoints. The messages can be analyzed, categorized, sorted, grouped, and/or tagged in terms of nodes (e.g., sender or receiver), contexts, and/or waypoints.

Figure 10:
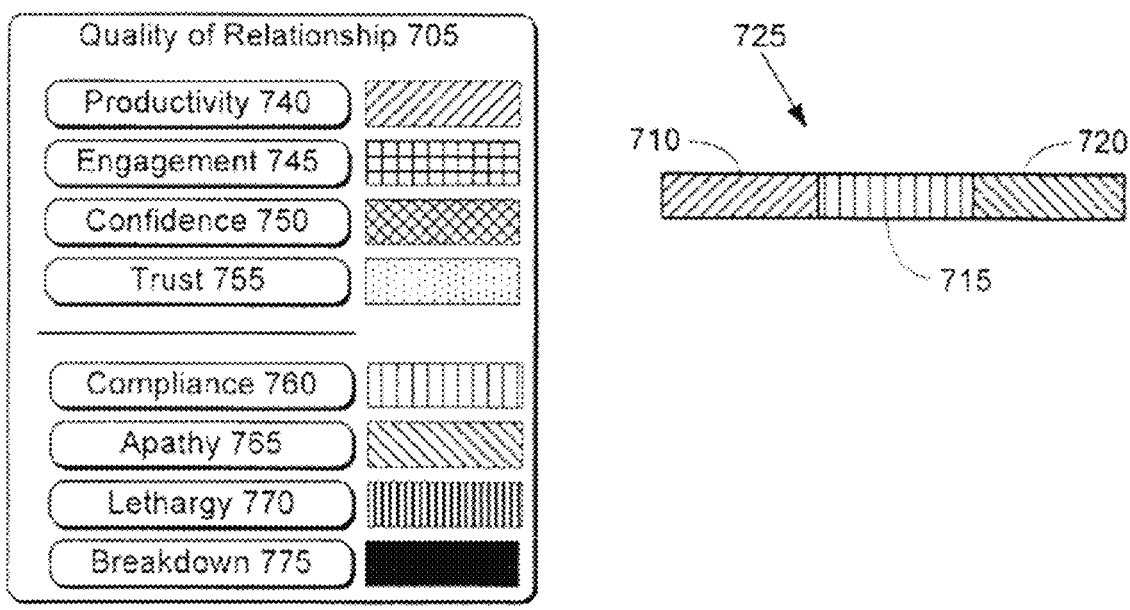
FIG. 10 illustrates quality of relationship values and associated relationship indicator having icons that represent past, present, and predictive values according to one embodiment of the present disclosure.

FIG. 10 illustrates quality of relationship values 705 and an associated relationship indicator 725 having icons (e.g., 710, 715, and 720) that represent past, present, and predictive values, respectively, according to some example embodiments.

The actionable analytics section 150 can generate the relationship indicator (e.g., 725) for one or more relationships. The relationship indicator 725 includes an indicator for a past quality of relationship value 710 associated with the historical analytics 155, a present quality of relationship value 715 associated with the real-time analytics 160, and a predictive quality of relationship value 720 associated with the predictive analytics 165.

The relationship indicator can include three adjacent or proximately located icons. For example, a first icon 710 can indicate the past quality of relationship value, a second icon 715 can indicate the present or real-time quality of relationship value, and a third icon 720 can indicate the predictive quality of relationship value. It will be understood that while the icons show a different pattern for each quality of relationship value, alternatively, each icon can show a different color or shape to distinguish one quality of relationship value from another. In some embodiments, a gradient of colors is used such that an individual color within the gradient of colors represents an individual quality of relationship value. Indeed, any differentiating aspect of the icons can be used to allow an observer to quickly distinguish and identify the quality of relationship value associated with the past, present, and predicted future quality of relationship.

More specifically, the past quality of relationship value indicated by the first icon 710 includes a representation for productivity 740, engagement 745, confidence 750, trust 755, compliance 760, apathy 765, lethargy 770, and/or breakdown 775. Similarly, the present quality of relationship value indicated by the second icon 715 includes a representation for productivity 740, engagement 745, confidence 750, trust 755, compliance 760, apathy 765, lethargy 770, and/or breakdown 775. The predictive quality of relationship value indicated by the third icon 720 includes a representation for productivity 740, engagement 745, confidence 750, trust 755, compliance 760, apathy 765, lethargy 770, and/or breakdown 775.

Back-End

The present disclosure provides a telemetry system that can include a microprocessor with at least one central processing unit (CPU) or multiple CPUs, computer memory, interface electronics and conditioning electronics configured to receive a signal from the display device and/or the sensor. In one embodiment, all or a portion of the conditioning electronics are at the display device.

In one embodiment, the CPU includes a processor, which can be a microprocessor, read only memory used to store instructions that the processor may fetch in executing its program, a random access memory (RAM) used by the processor to store information and a master dock. The microprocessor is controlled by the master clock that provides a master timing signal used to sequence the microprocessor through its internal states in its execution of each processed instruction. In one embodiment, the microprocessor, and especially the CPU, is a low power device, such as CMOS, as is the necessary logic used to implement the processor design. The telemetry system can store information about the user's messages, display and activities in memory.

This memory may be external to the CPU but can reside in the RAM. The memory may be nonvolatile such as battery backed RAM or electrically erasable programmable read only memory (EEPROM). Signals from the messages, display and/or sensors can be in communication with conditioning electronics that with a filter, with scale and can determine the presence of certain conditions. This conditioning essentially cleans the signal up for processing by CPU and in some cases preprocesses the information. These signals are then passed to interface electronics, which converts the analog voltage or currents to binary ones and zeroes understood by the CPU. The telemetry system can also provide for intelligence in the signal processing, such as achieved by the CPU in evaluating historical data.

In one embodiment, the actions, expressions and the like of the user wearing the display device can be used for different activities and can have different classifications at the telemetry system.

The classification can be in response to the user's location, where the user spends it time, messages, and communications, determination of working relationships, family relationships, social relationships, and the like. These last few determinations can be based on the time of day, the types of interactions, comparisons of the amount of time with others, the time of day, a frequency of contact with others, the type of contact with others, the location and type of place where the user is at, and the like. These results are stored in the database.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

Cloud Infrastructure

Figure 11A:
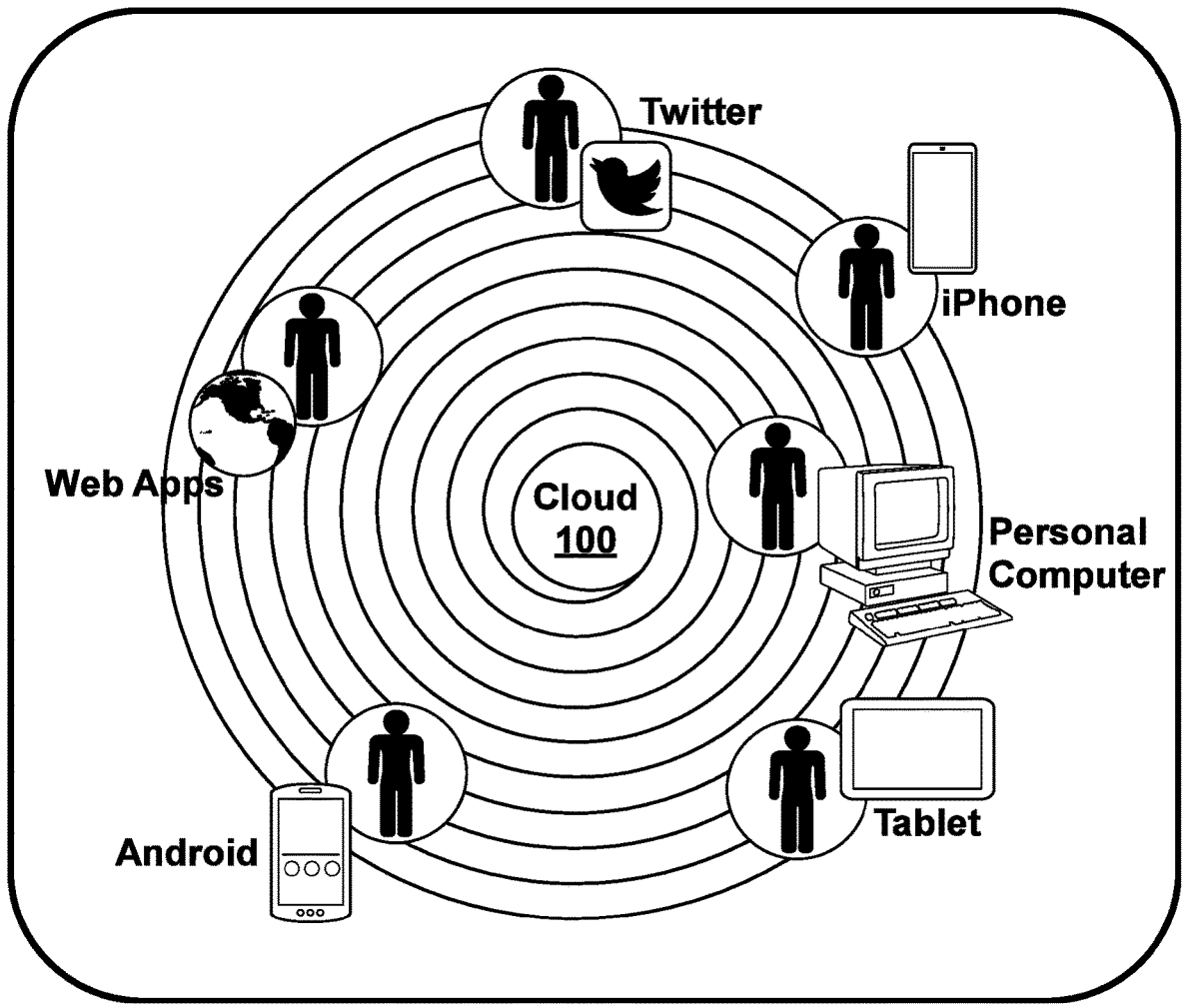
FIGS. 11A-11E illustrate embodiments of a cloud infrastructure that can be used with the display device of the present disclosure.

The present disclosure provides a cloud infrastructure. FIG. 11A represents a logical diagram of the cloud infrastructure. As shown, the Cloud encompasses web applications, mobile devices, personal computer and/or laptops and social networks, such as, Twitter®. ("Twitter®" is a trademark of Twitter Inc.). It will be appreciated that other social networks can be included in the cloud and Twitter® has been given as a specific example. Therefore, every component forms part of the cloud which comprises servers, applications and clients as defined above.

With reference to FIGS. 11B through 11E, the cloud based system can facilitate adjusting utilization and/or allocation of hardware resource(s) to remote clients. The system can include a third party service provider that can concurrently service requests from several clients without user perception of degraded computing performance as compared to conventional techniques where computational tasks can be performed upon a client or a server within a proprietary intranet. The third party service provider (e.g., "cloud") supports a collection of hardware and/or software resources. The hardware and/or software resources can be maintained by an off-premises party, and the resources can be accessed and utilized by identified users over Network System. Resources provided by the third party service provider can be centrally located and/or distributed at various geographic locations. For example, the third party service provider can include any number of data center machines that provide resources. The data center machines can be utilized for storing/retrieving data, effectuating computational tasks, rendering graphical outputs, routing data, and so forth.

According to an illustration, the third party service provider can provide any number of resources such as data storage services, computational services, word processing services, electronic mail services, presentation services, spreadsheet services, gaming services, web syndication services (e.g., subscribing to a RSS feed), and any other services or applications that are conventionally associated with personal computers and/or local servers. Further, utilization of any number of third party service providers similar to the third party service provider is contemplated. According to an illustration, disparate third party service providers can be maintained by differing off-premise parties and a user can employ, concurrently, at different times, and the like, all or a subset of the third party service providers.

By leveraging resources supported by the third party service provider, limitations commonly encountered with respect to hardware associated with clients and servers within proprietary intranets can be mitigated. Off-premises parties, instead of users of clients or Network System administrators of servers within proprietary intranets, can maintain, troubleshoot, replace and update the hardware resources. Further, for example, lengthy downtimes can be mitigated by the third party service provider utilizing redundant resources; thus, if a subset of the resources are being updated or replaced, the remainder of the resources can be utilized to service requests from users. According to this example, the resources can be modular in nature, and thus, resources can be added, removed, tested, modified, etc. while the remainder of the resources can support servicing user requests. Moreover, hardware resources supported by the third party service provider can encounter fewer constraints with respect to storage, processing power, security, bandwidth, redundancy, graphical display rendering capabilities, etc. as compared to conventional hardware associated with clients and servers within proprietary intranets.

The system can include a client device, which can be the display device and/or the display device user's mobile device that employs resources of the third party service provider. Although one client device is depicted, it is to be appreciated that the system can include any number of client devices similar to the client device, and the plurality of client devices can concurrently utilize supported resources. By way of illustration, the client device can be a desktop device (e.g., personal computer), mobile device, and the like. Further, the client device can be an embedded system that can be physically limited, and hence, it can be beneficial to leverage resources of the third party service provider.

Resources can be shared amongst a plurality of client devices subscribing to the third party service provider. According to an illustration, one of the resources can be at least one central processing unit (CPU), where CPU cycles can be employed to effectuate computational tasks requested by the client device. Pursuant to this illustration, the client device can be allocated a subset of an overall total number of CPU cycles, while the remainder of the CPU cycles can be allocated to disparate client device(s). Additionally or alternatively, the subset of the overall total number of CPU cycles allocated to the client device can vary over time. Further, a number of CPU cycles can be purchased by the user of the client device. In accordance with another example, the resources can include data store(s) that can be employed by the client device to retain data. The user employing the client device can have access to a portion of the data store(s) supported by the third party service provider, while access can be denied to remaining portions of the data store(s) (e.g., the data store(s) can selectively mask memory based upon user/device identity, permissions, and the like). It is contemplated that any additional types of resources can likewise be shared.

The third party service provider can further include an interface component that can receive input(s) from the client device and/or enable transferring a response to such input(s) to the client device (as well as perform similar communications with any disparate client devices). According to an example, the input(s) can be request(s), data, executable program(s), etc. For instance, request(s) from the client device can relate to effectuating a computational task, storing/retrieving data, rendering a user interface, and the like via employing one or more resources. Further, the interface component can obtain and/or transmit data over a Network System connection. According to an illustration, executable code can be received and/or sent by the interface component over the Network System connection. Pursuant to another example, a user (e.g., employing the client device) can issue commands via the interface component.

In one embodiment, the third party service provider includes a dynamic allocation component that apportions resources, which as a non-limiting example can be hardware resources supported by the third party service provider to process and respond to the input(s) (e.g., request(s), data, executable program(s), and the like, obtained from the client device.

Although the interface component is depicted as being separate from the dynamic allocation component, it is contemplated that the dynamic allocation component can include the interface component or a portion thereof. The interface component can provide various adaptors, connectors, channels, communication paths, etc. to enable interaction with the dynamic allocation component.

Figure 11B:
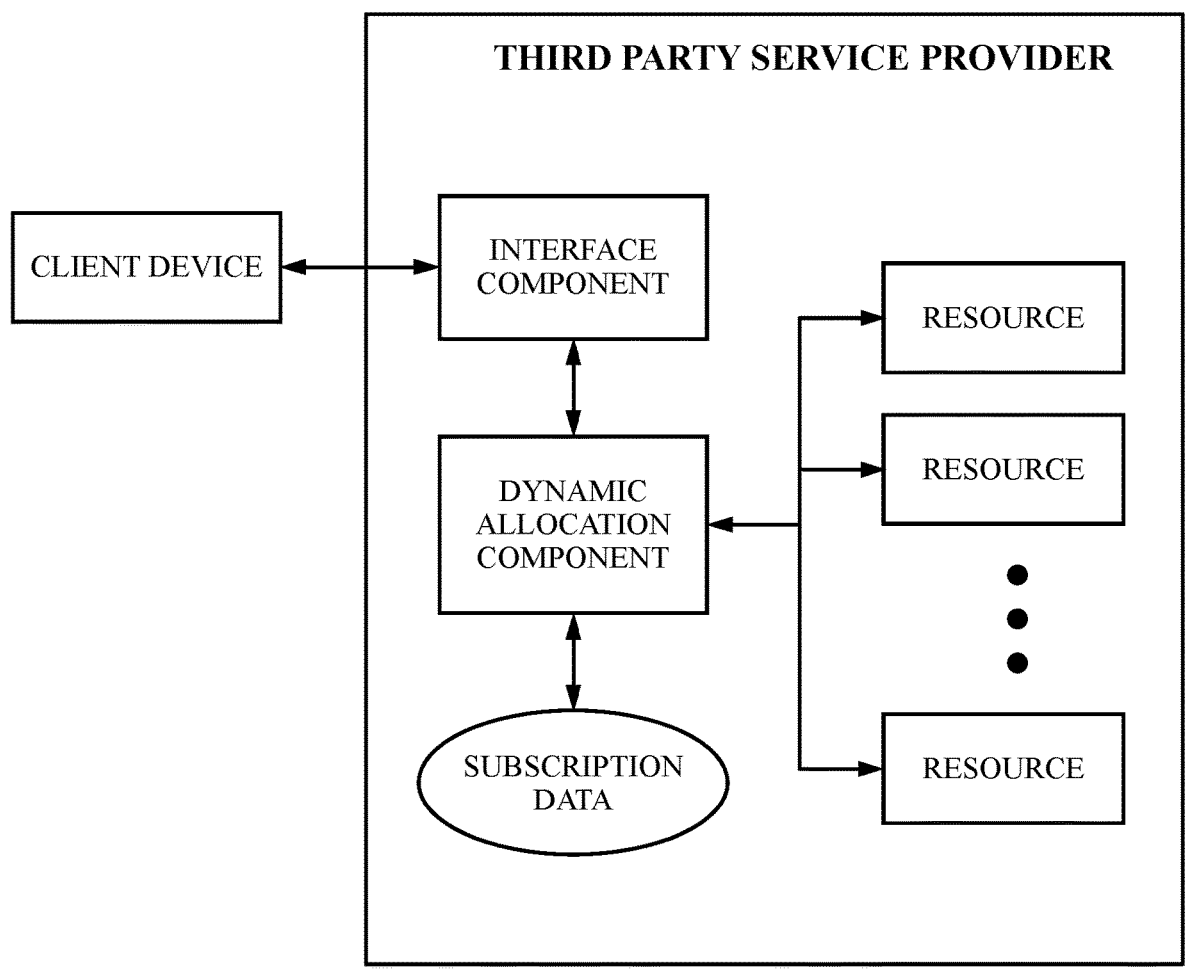
Figure 11C:
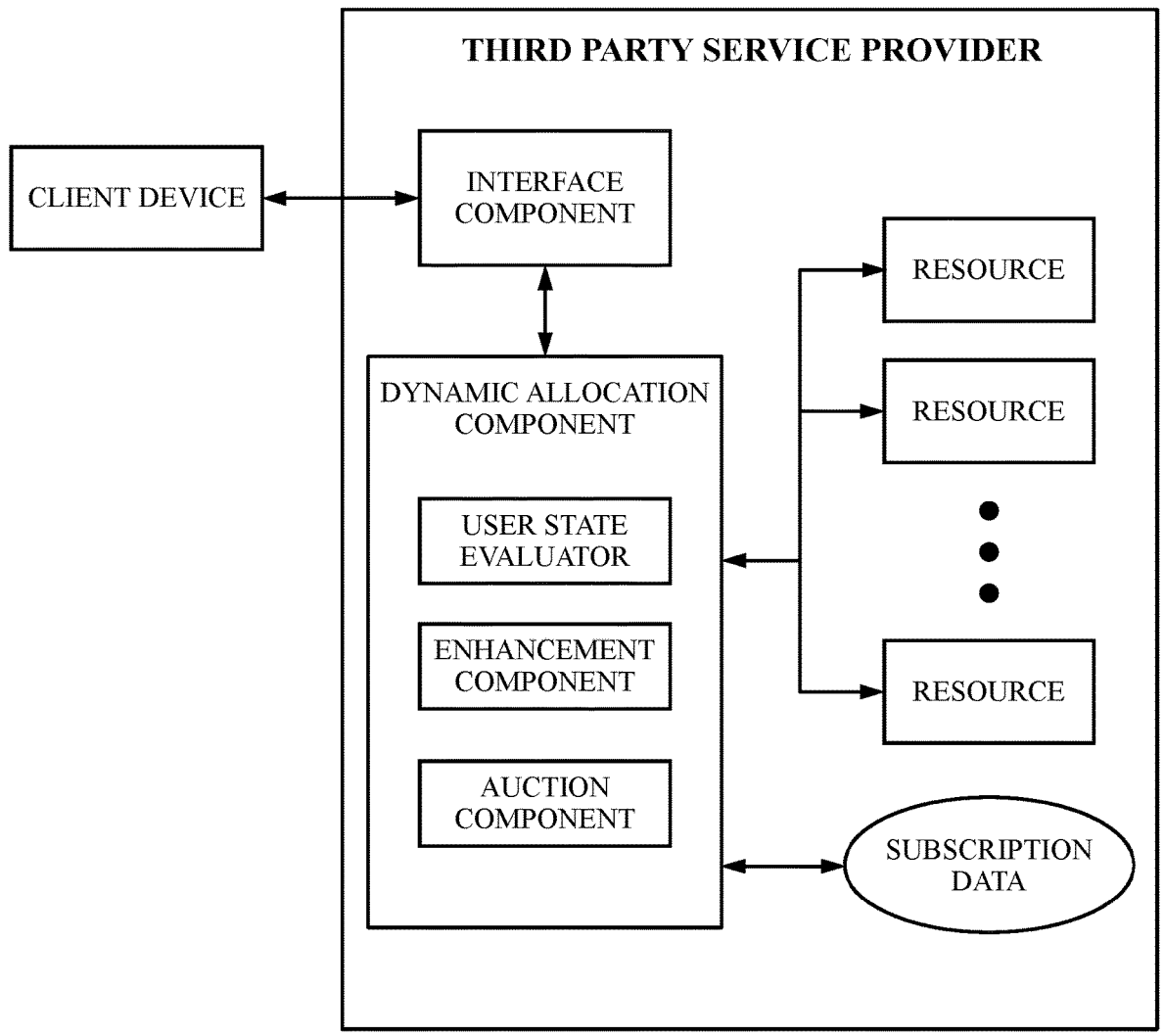

With reference to FIG. 11B, a system includes the third party service provider that supports any number of resources (e.g., hardware, software, and firmware) that can be employed by the client device and/or disparate client device(s) not shown. The third party service provider further comprises the interface component that receives resource utilization requests, including but not limited to requests to effectuate operations utilizing resources supported by the third party service provider from the client device and the dynamic allocation component that partitions resources, including but not limited to, between users, devices, computational tasks, and the like. Moreover, the dynamic allocation component can further include a user state evaluator, an enhancement component and an auction component.

The user state evaluator can determine a state associated with a user and/or the client device employed by the user, where the state can relate to a set of properties. For instance, the user state evaluator can analyze explicit and/or implicit information obtained from the client device (e.g., via the interface component) and/or retrieved from memory associated with the third party service provider (e.g., preferences indicated in subscription data). State related data yielded by the user state evaluator can be utilized by the dynamic allocation component to tailor the apportionment of resources.

In one embodiment, the user state evaluator can consider characteristics of the client device, which can be used to apportion resources by the dynamic allocation component. For instance, the user state evaluator can identify that the client device is a mobile device with limited display area. Thus, the dynamic allocation component can employ this information to reduce resources utilized to render an image upon the client device since the cellular telephone may be unable to display a rich graphical user interface.

Moreover, the enhancement component can facilitate increasing an allocation of resources for a particular user and/or client device.

Figure 11D:
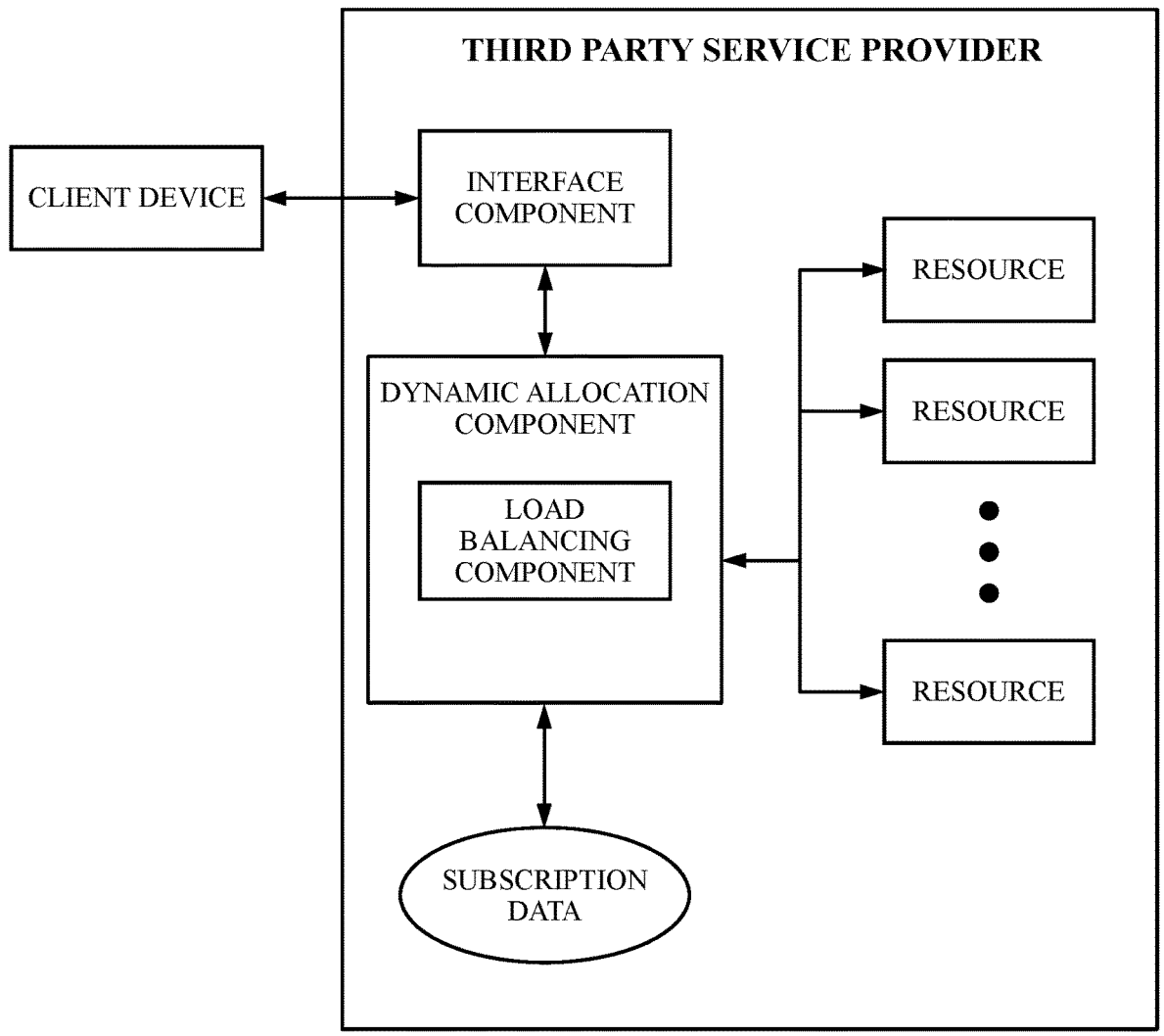

Referring to FIG. 11D, illustrated is a system that employs load balancing to optimize utilization of resources. The system includes the third party service provider that communicates with the client device (and/or any disparate client device(s) and/or disparate third party service provider(s)). The third party service provider can include the interface component that transmits and/or receives data from the client device and the dynamic allocation component that allots resources. The dynamic allocation component can further comprise a load balancing component that optimizes utilization of resources.

In one embodiment, the load balancing component can monitor resources of the third party service provider to detect failures. If a subset of the resources fails, the load balancing component can continue to optimize the remaining resources. Thus, if a portion of the total number of processors fails, the load balancing component can enable redistributing cycles associated with the non-failing processors.

Figure 11E:
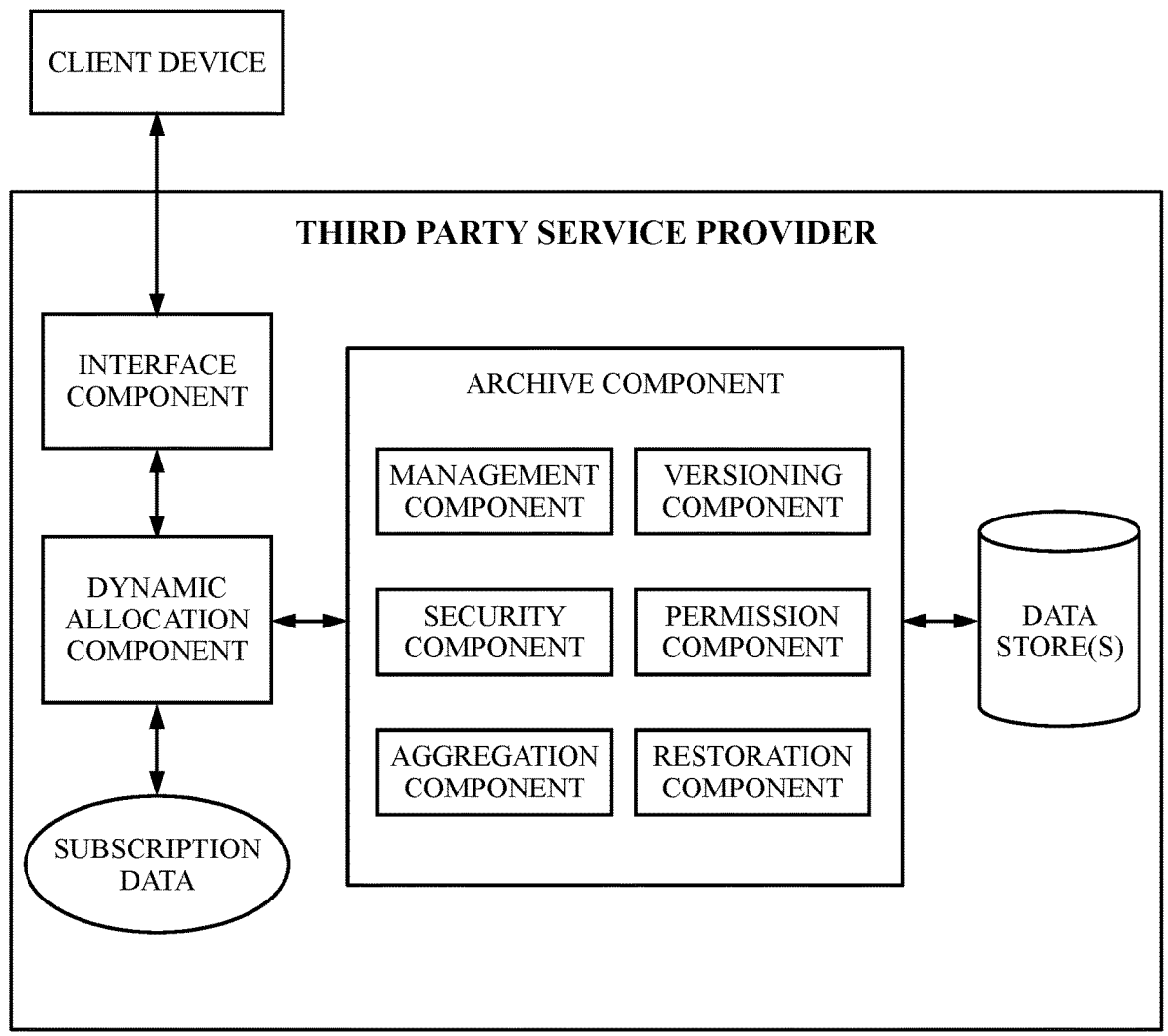

Referring to FIG. 11E, a system is illustrated that archives and/or analyzes data utilizing the third party service provider. The third party service provider can include the interface component that enables communicating with the client device. Further, the third party service provider comprises the dynamic allocation component that can apportion data retention resources, for example. Moreover, the third party service provider can include an archive component and any number of data store(s). Access to and/or utilization of the archive component and/or the data store(s) by the client device (and/or any disparate client device(s)) can be controlled by the dynamic allocation component. The data store(s) can be centrally located and/or positioned at differing geographic locations. Further, the archive component can include a management component, a versioning component, a security component, a permission component, an aggregation component, and/or a restoration component.

The data store(s) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store(s) of the subject systems and methods is intended to comprise, without being limited to, these and any other suitable types of memory. In addition, it is to be appreciated that the data store(s) can be a server, a database, a hard drive, and the like.

The management component facilitates administering data retained in the data store(s). The management component can enable providing multi-tiered storage within the data store(s), for example. According to this example, unused data can be aged-out to slower disks and important data used more frequently can be moved to faster disks; however, the claimed subject matter is not so limited. Further, the management component can be utilized (e.g., by the client device) to organize, annotate, and otherwise reference content without making it local to the client device. Pursuant to an illustration, enormous video files can be tagged via utilizing a cell phone. Moreover, the management component enables the client device to bind metadata, which can be local to the client device, to file streams (e.g., retained in the data store(s)); the management component can enforce and maintain these bindings.

Additionally or alternatively, the management component can allow for sharing data retained in the data store(s) with disparate users and/or client devices. For example, fine-grained sharing can be supported by the management component.

The versioning component can enable retaining and/or tracking versions of data. For instance, the versioning component can identify a latest version of a document (regardless of a saved location within data store(s)).

The security component limits availability of resources based on user identity and/or authorization level. For instance, the security component can encrypt data transferred to the client device and/or decrypt data obtained from the client device. Moreover, the security component can certify and/or authenticate data retained by the archive component.

The permission component can enable a user to assign arbitrary access permissions to various users, groups of users and/or all users.

Further, the aggregation component assembles and/or analyzes collections of data. The aggregation component can seamlessly incorporate third party data into a particular user's data.

The restoration component rolls back data retained by the archive component. For example, the restoration component can continuously record an environment associated with the third party service provider. Further, the restoration component can playback the recording.

Mobile Devices

Figure 12:
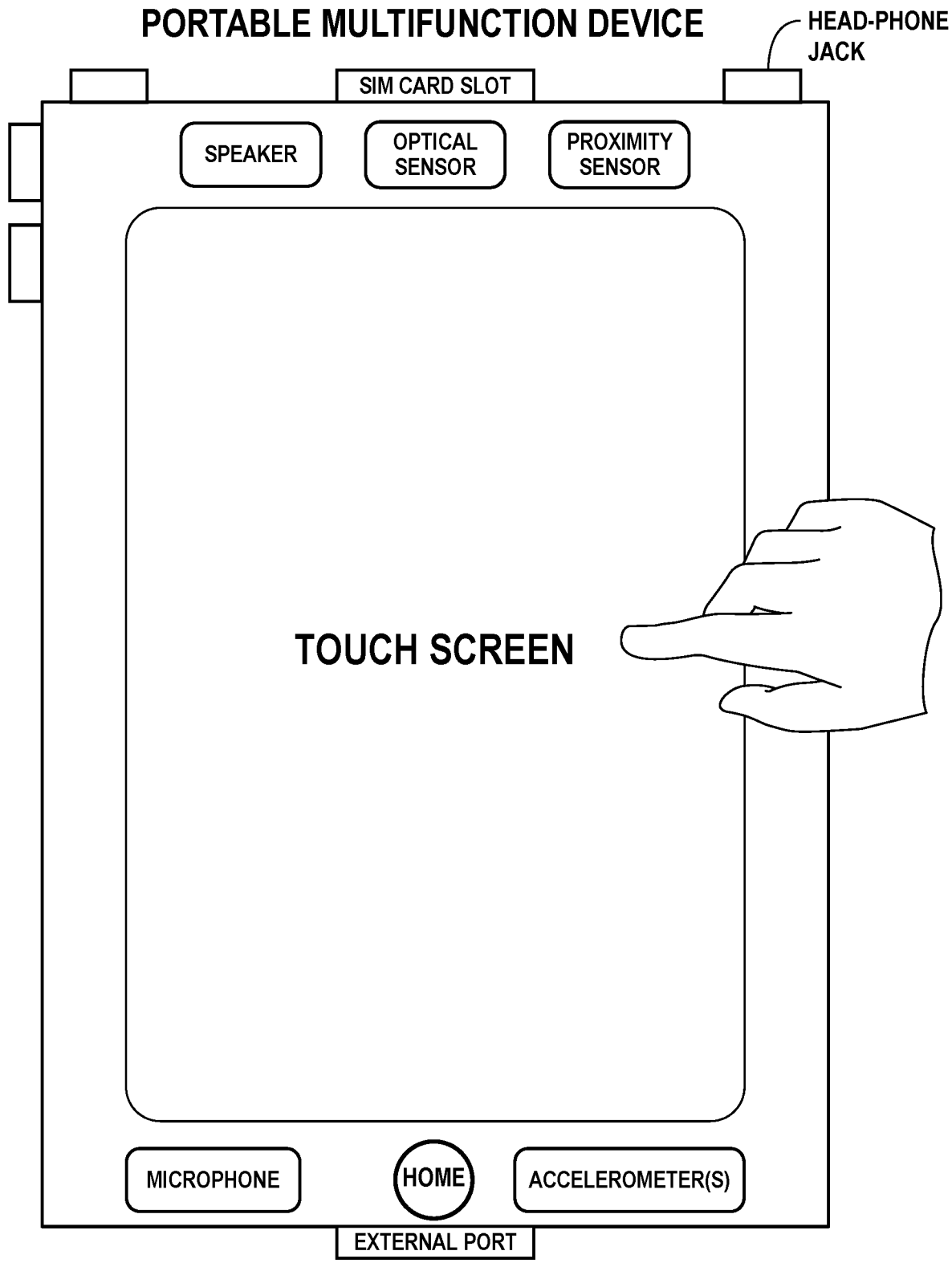
FIGS. 12, 13 and 14 are diagrams illustrating embodiments of a mobile or computing device that can be used with the display device of the present disclosure.
Figure 13:
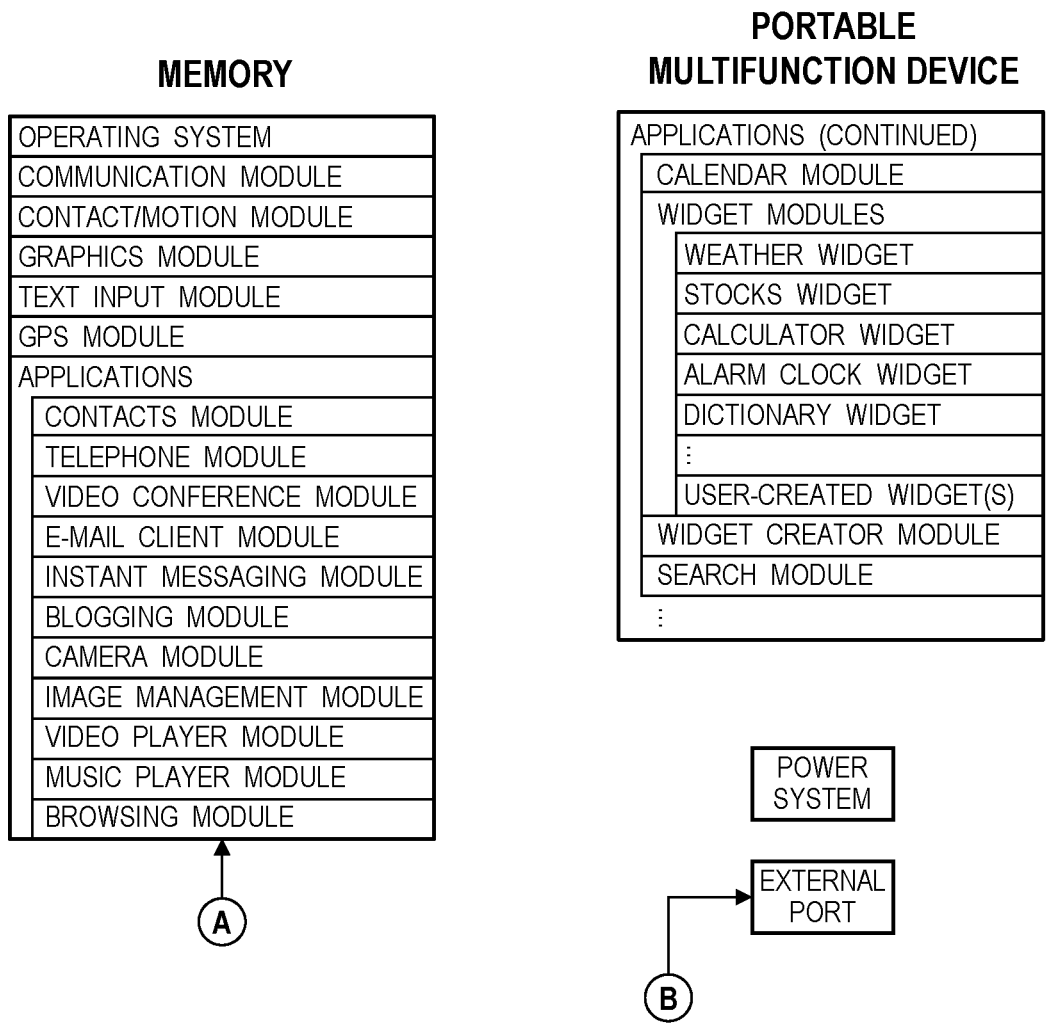
Figure 14:
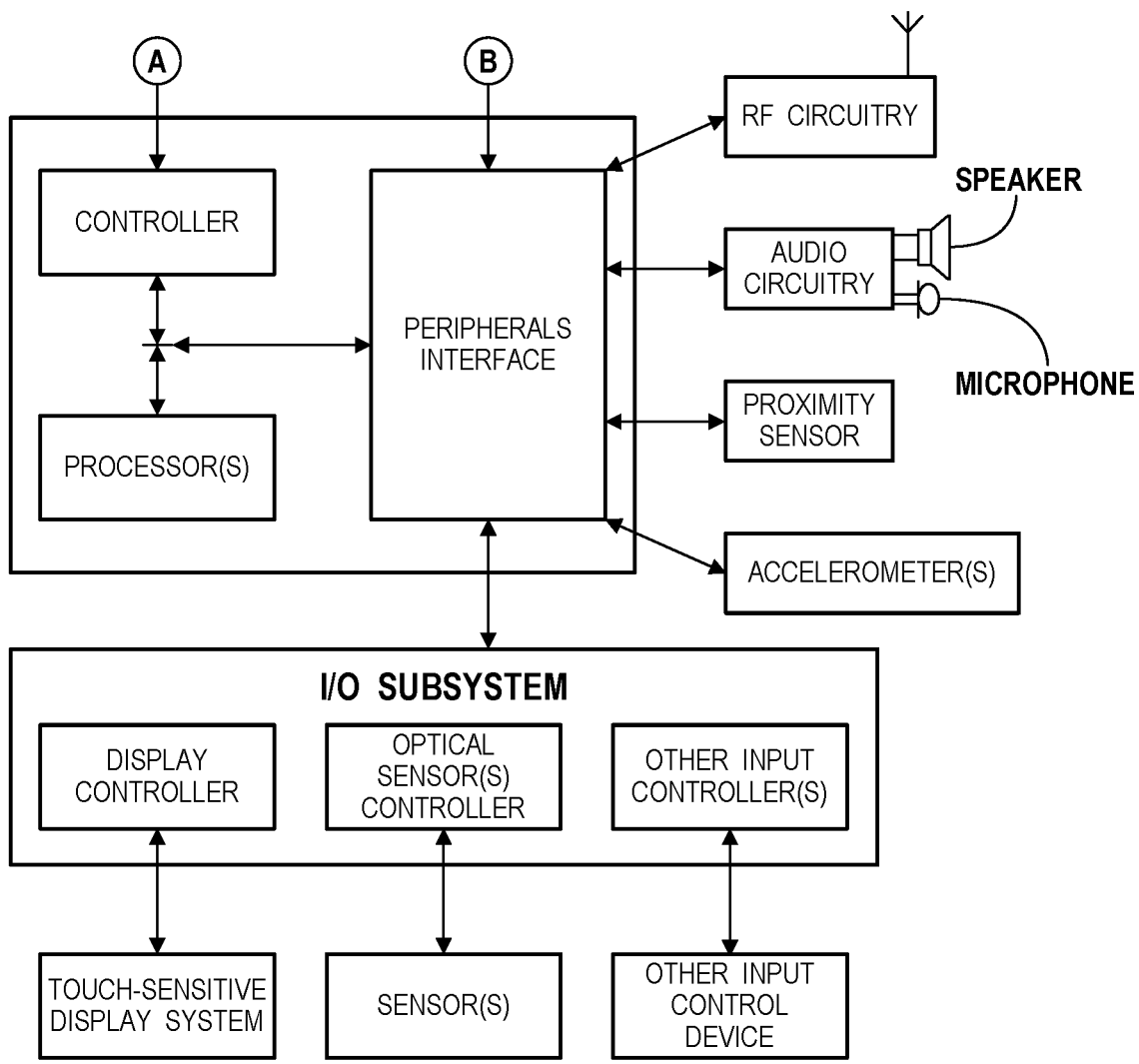

Referring to FIGS. 12, 13 and 14, diagrams are provided illustrating a mobile or computing device that can be used with display devices, systems and methods of the present disclosure.

Referring to FIG. 12, the mobile or computing device can include a display that can be a touch sensitive display. The touch-sensitive display may be referred to as a "touch screen" or a touch-sensitive display system. The mobile or computing device may include a memory (which may include one or more computer readable storage mediums), a memory controller, one or more processing units (CPU's), a peripherals interface, Network Systems circuitry, including but not limited to RF circuitry, audio circuitry, a speaker, a microphone, an input/output (I/O) subsystem, other input or control devices, and an external port. In some examples, the touch-sensitive display is a capacitive or resistive display. The mobile or computing device may include one or more optical sensors. These components may communicate over one or more communication buses or signal lines.

It will be appreciated that the mobile or computing device is only one example of a portable multifunction mobile or computing device, and that the mobile or computing device may have more or fewer components than shown, may combine two or more components, or a may have a different configuration or arrangement of the components. The various components shown in FIG. 14 may be implemented in hardware, software or a combination of hardware and software, including one or more signal processing and/or application specific integrated circuits.

Memory may include high-speed random access memory and may also include non-volatile memory, such as one or more magnetic disk storage devices, flash memory devices, or other non-volatile solid-state memory devices. Access to memory by other components of the mobile or computing device, such as the CPU and the peripherals interface, may be controlled by the memory controller.

The peripherals interface couples the input and output peripherals of the device to the CPU and memory. The one or more processors run or execute various software programs and/or sets of instructions stored in memory to perform various functions for the mobile or computing device and to process data.

In some embodiments, the peripherals interface, the CPU, and the memory controller may be implemented on a single chip, such as a chip. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications Network Systems and other communications devices via the electromagnetic signals. The Network Systems circuitry may include circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with Network Systems and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoW), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry, the speaker, and the microphone provide an audio interface between a user and the mobile or computing device. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be retrieved from and/or transmitted to memory and/or the Network Systems circuitry by the peripherals interface. In some embodiments, the audio circuitry can also include a headset jack (FIG. 12). The headset jack provides an interface between the audio circuitry and removable audio input/output peripherals, such as output-only headphones or a headset with both output (e.g., a headphone for one or both ears) and input (e.g., a microphone).

The I/O subsystem couples input/output peripherals on the mobile or computing device, such as the touch screen and other input/control devices, to the peripherals interface. The I/O subsystem may include a display controller and one or more input controllers for other input or control devices. The one or more input controllers receive/send electrical signals from/to other input or control devices. The other input/control devices may include physical buttons (e.g., push buttons, rocker buttons, etc.), dials, slider switches, and joysticks, click wheels, and so forth. In some alternate embodiments, input controller(s) may be coupled to any (or none) of the following: a keyboard, infrared port, USB port, and a pointer device such as a mouse. The one or more buttons may include an up/down button for volume control of the speaker and/or the microphone. The one or more buttons may include a push button. A quick press of the push button may disengage a lock of the touch screen or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device on or off. The user may be able to customize a functionality of one or more of the buttons. The touch screen is used to implement virtual or soft buttons and one or more soft keyboards.

The touch-sensitive touch screen provides an input interface and an output interface between the device and a user. The display controller receives and/or sends electrical signals from/to the touch screen. The touch screen displays visual output to the user. The visual output may include graphics, text, icons, video, and any combination thereof (collectively termed "graphics"). In some embodiments, some or all of the visual output may correspond to user-interface objects, further details of which are described below.

A touch screen has a touch-sensitive surface, sensor or set of sensors that accepts input from the user based on haptic and/or tactile contact. The touch screen and the display controller (along with any associated modules and/or sets of instructions in memory) detect contact (and any movement or breaking of the contact) on the touch screen and converts the detected contact into interaction with user-interface objects (e.g., one or more soft keys, icons, web pages or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies, including but not limited to capacitive, resistive, infrared, and surface acoustic wave technologies, as well as other proximity sensor arrays or other elements for determining one or more points of contact with a touch screen.

A touch-sensitive display in some embodiments of the touch screen may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable mobile or computing device, whereas touch sensitive tablets do not provide visual output.

A touch-sensitive display in some embodiments of the touch screen may be as described in the following applications: (1) U.S. patent application Ser. No. 11/381,313, "Multipoint Touch Surface Controller," filed May 12, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen may have a resolution in excess of 1000 dpi. In an exemplary embodiment, the touch screen has a resolution of approximately 1060 dpi. The user may make contact with the touch screen using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen or an extension of the touch-sensitive surface formed by the touch screen.

In some embodiments, the mobile or computing device may include a physical or virtual click wheel as an input control device. A user may navigate among and interact with one or more graphical objects (henceforth referred to as icons) displayed in the touch screen by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory. For a virtual click wheel, the click wheel and click wheel controller may be part of the touch screen and the display controller, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile or computing device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The mobile or computing device may also include one or more sensors, including, but not limited to, optical sensors. FIG. 14 illustrates how an optical sensor coupled to an optical sensor controller in I/O subsystem. The optical sensor may include charge-coupled device (CCD) or complementary metal-oxide semiconductor (CMOS) phototransistors. The optical sensor receives light from the environment, projected through one or more lens, and converts the light to data representing an image. In conjunction with an imaging module 58 (also called a camera module); the optical sensor may capture still images or video. In some embodiments, an optical sensor is located on the back of the mobile or computing device, opposite the touch screen display on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor can be changed by the user (e.g., by rotating the lens and the sensor in the device housing) so that a single optical sensor may be used along with the touch screen display for both video conferencing and still and/or video image acquisition.

The mobile or computing device may also include one or more proximity sensors. In one embodiment, the proximity sensor is coupled to the peripherals interface. Alternately, the proximity sensor may be coupled to an input controller in the I/O subsystem. The proximity sensor may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 13/096,386, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory may include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the Network Systems circuitry and/or the external port. The external port (e.g., Universal Serial Bus (USB), FIREWIRE, etc.) is adapted for coupling directly to other devices or indirectly over Network System. In some embodiments, the external port is a multi-pin (e.g., 30-pin) connector that is the same as, or similar to and/or compatible with the 30-pin connector used on iPod (trademark of Apple Computer, Inc.) devices.

The contact/motion module may detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detects contact on a click wheel.

Examples of other applications that may be stored in memory include other word processing applications, JAVA-enabled applications, encryption, digital rights management, voice recognition, and voice replication.

In conjunction with touch screen, display controller, contact module, graphics module, and text input module, a contacts module may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

Display Device Positioned at a Mobile Device

Figure 18:
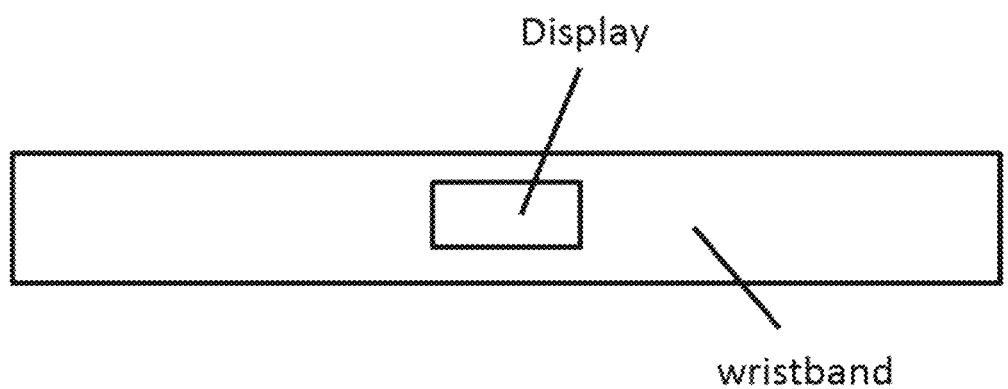
FIG. 18 shows a display mounted on a wristband.

Displays of the present disclosure can be used in various settings. For example, a display can be mounted on a wrist band, as shown in FIG. 18. As another example, a display can be mounted on a mobile device, an article of clothing or other object. FIGS. 19A-19K show a display device that can be mounted on various objects, such as a mobile device. In FIGS. 19A-19E, the display device can be mountable on a mobile device as a case. As a non-limiting example the display device fits like a case that wraps around and is then coupled to the mobile device, similar to that of a regular mobile device protective case. The case has an OLED and/or flexible OLED. The display device communicates with the mobile device. In one embodiment the display devices are simple screens expressing photos, images, words just like those displayed on a display device.

Figure 19A:
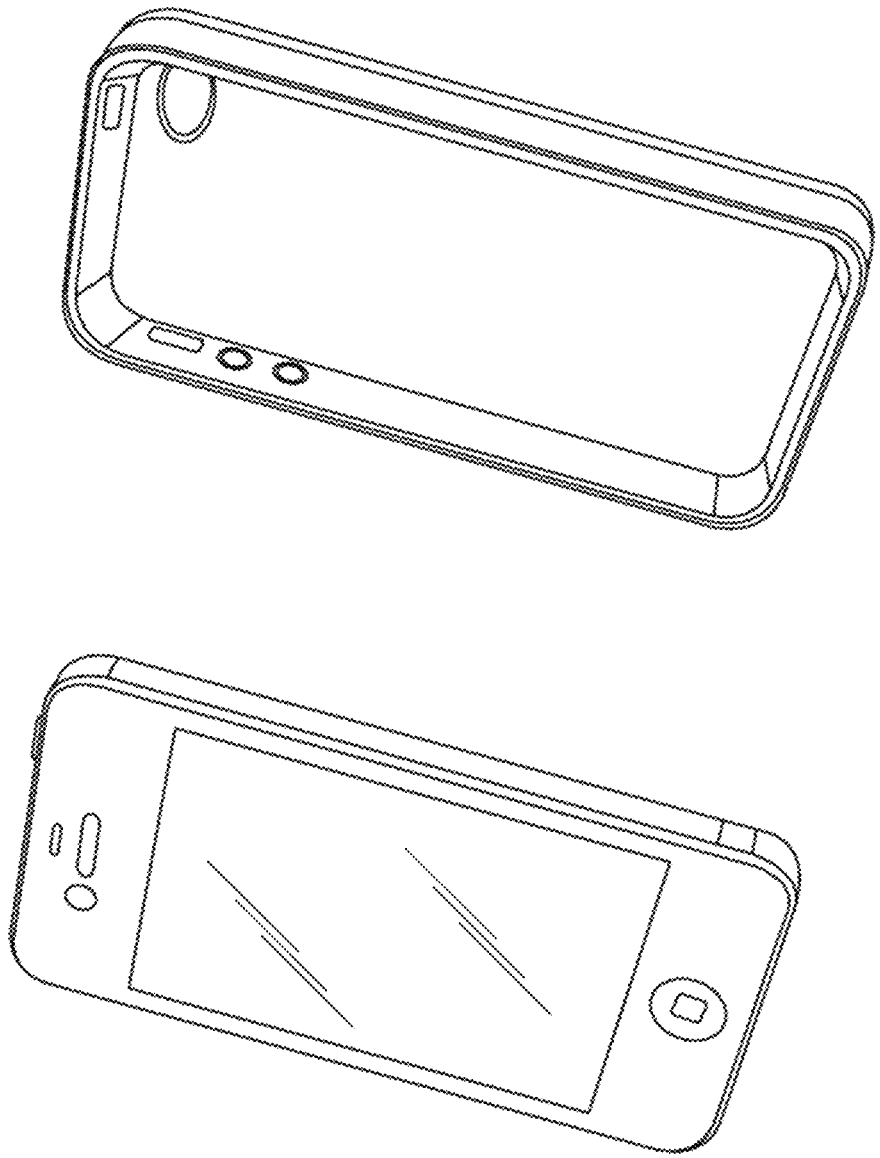
FIGS. 19A-19K show a display device that can be mounted on various objects, such as a mobile device.
Figure 19C:
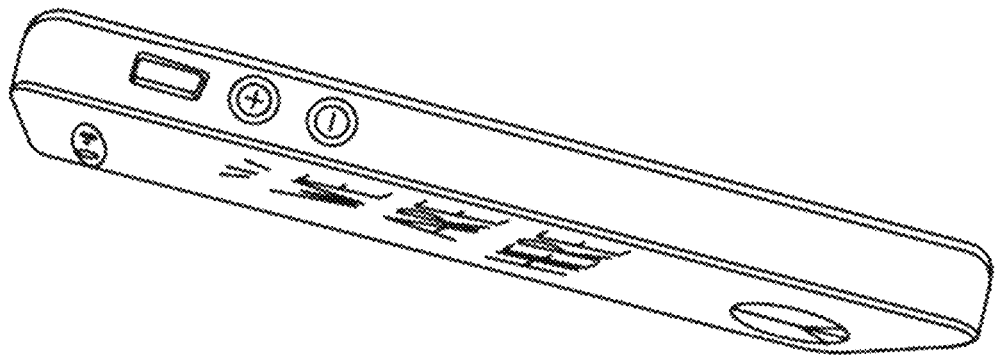
Figure 19B:
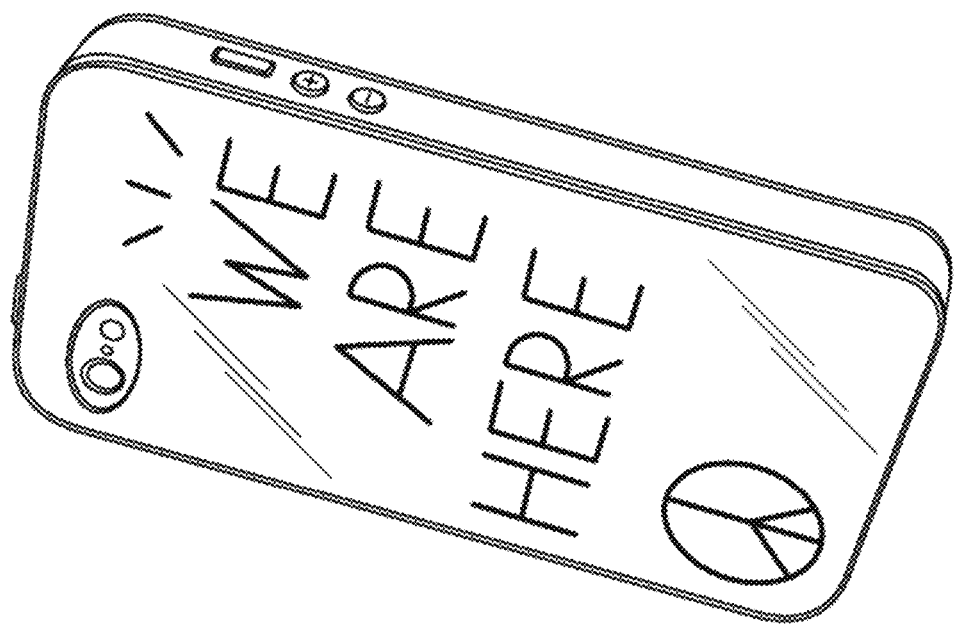
Figure 19E:
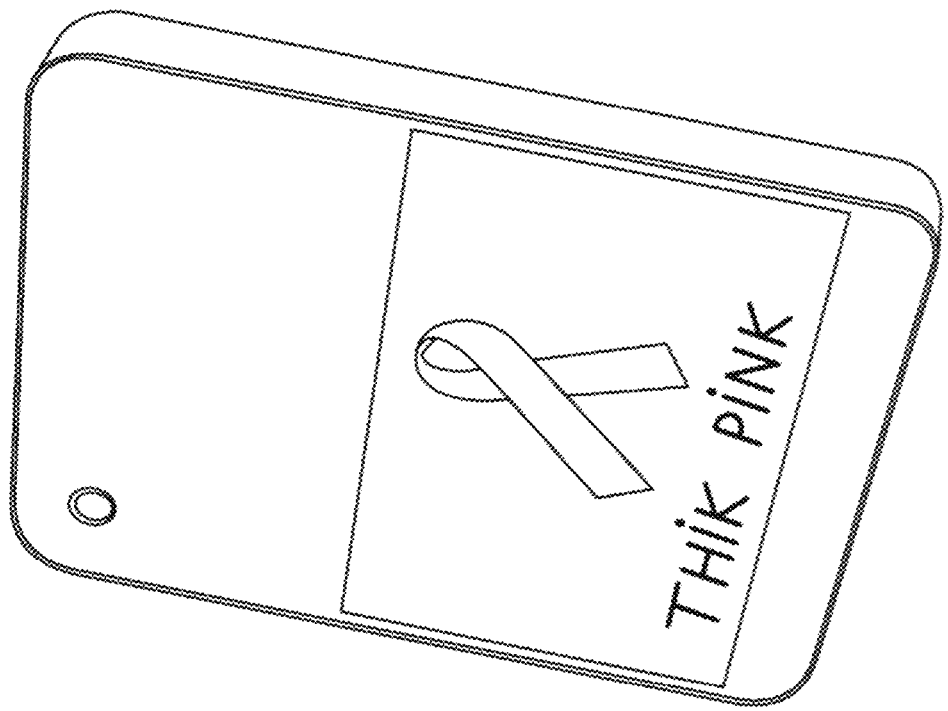
Figure 19D:
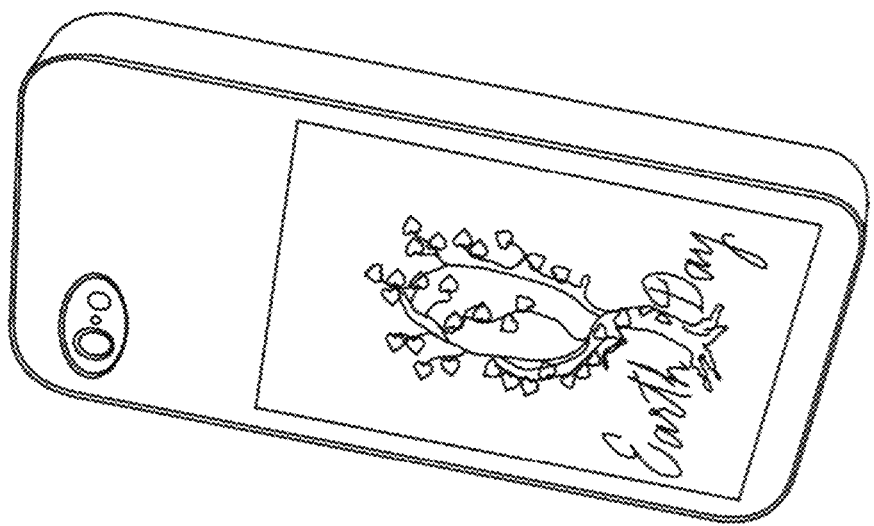
Figure 19G:
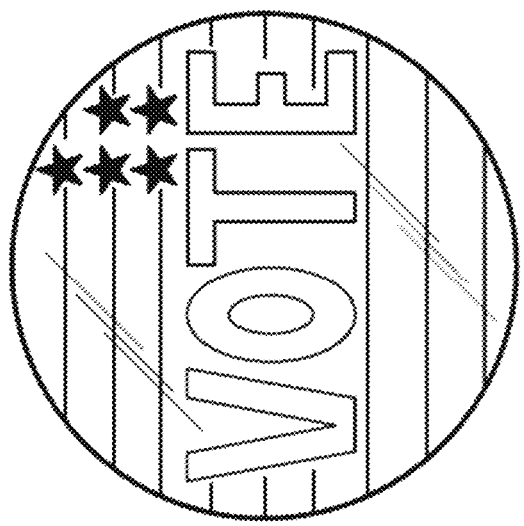
Figure 19F:
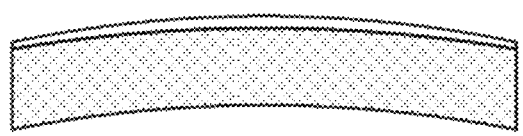

The display device can have a curved or non-linear profile. The display device can be flexible. FIGS. 19F and 19G show a display device that is curvilinear. From a side, the display device has a non-linear profile.

Figure 19H:
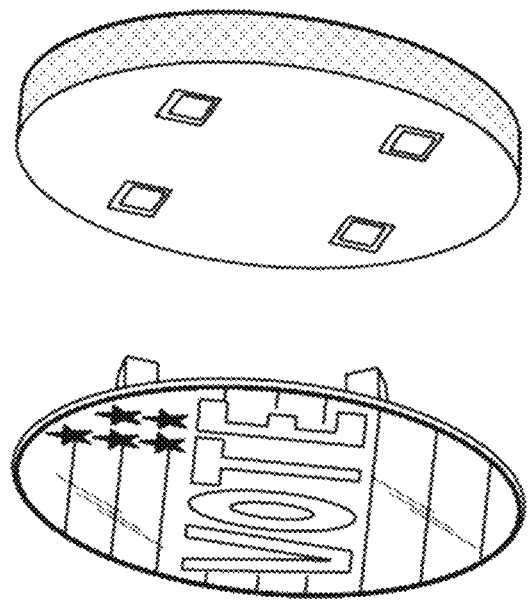
Figure 19J:
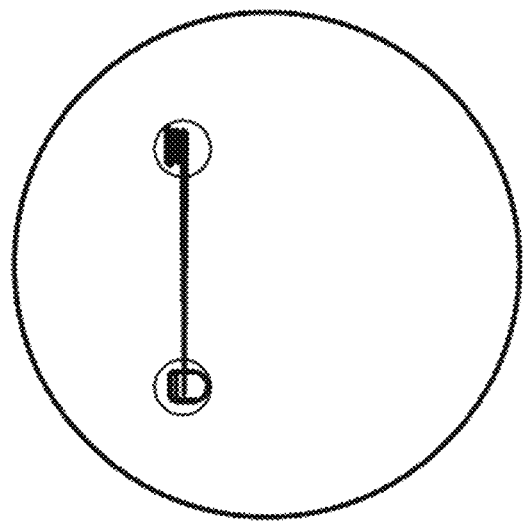
Figure 19I:
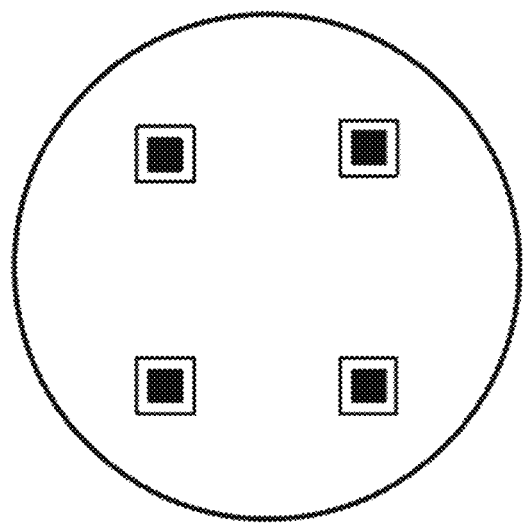
Figure 19K:
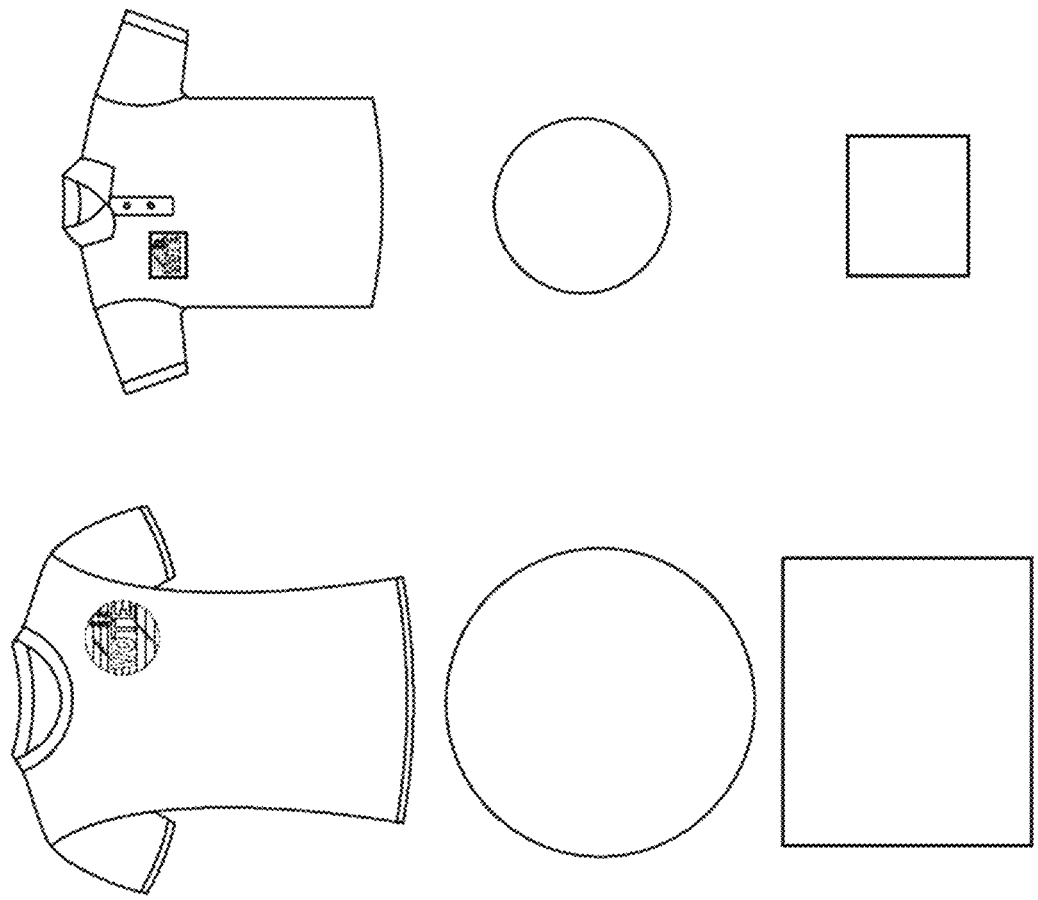

FIGS. 19H-19J shows a display device with a display that is removable from a support member. The display can have mating pins that enable the display to securely mate with the support member. The support member can have a pin that allows the support member to be mounted on an article of clothing, as shown in FIG. 19K.

In one embodiment the mobile device uses Bluetooth® and/or WiFi to interact and communication with the display device screen. Bluetooth may be Bluetooth low energy.

In one embodiment the display device is configured to interpret certain Bluetooth profiles, which are definitions of possible applications and specify general behaviors that Bluetooth enabled devices use to communicate with other Bluetooth devices. These profiles include settings to parametrize and to control the communication from start. Adherence to profiles saves the time for transmitting the parameters anew before the bi-directional link becomes effective. There are a wide range of Bluetooth profiles that describe many different types of applications or use cases for devices In various embodiments the mobile device and the display device are able to have the following: wireless control of and communication between a mobile phone and a display device; wireless networking between display devices in a confined space and where little bandwidth is required; transfer of files, contact details, calendar appointments, and reminders between devices with OBEX; replacement of previous wired RS-232 serial communications; for low bandwidth applications where higher USB bandwidth is not required and cable-free connection desired; sending small advertisements from Bluetooth-enabled display device advertising hoardings to other, discoverable, Bluetooth devices; dial-up internet access on display devices using the mobile device; short range transmission of health sensor data from display devices; real-time location systems (RTLS) for display devices; and personal security applications. Wi-Fi can also be utilized with similar applications for the display device.

In one embodiment the display device can be coupled to a Bluetooth adapter that enables the display device to communicate with the mobile device.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

Computer Control Systems

Figure 20:
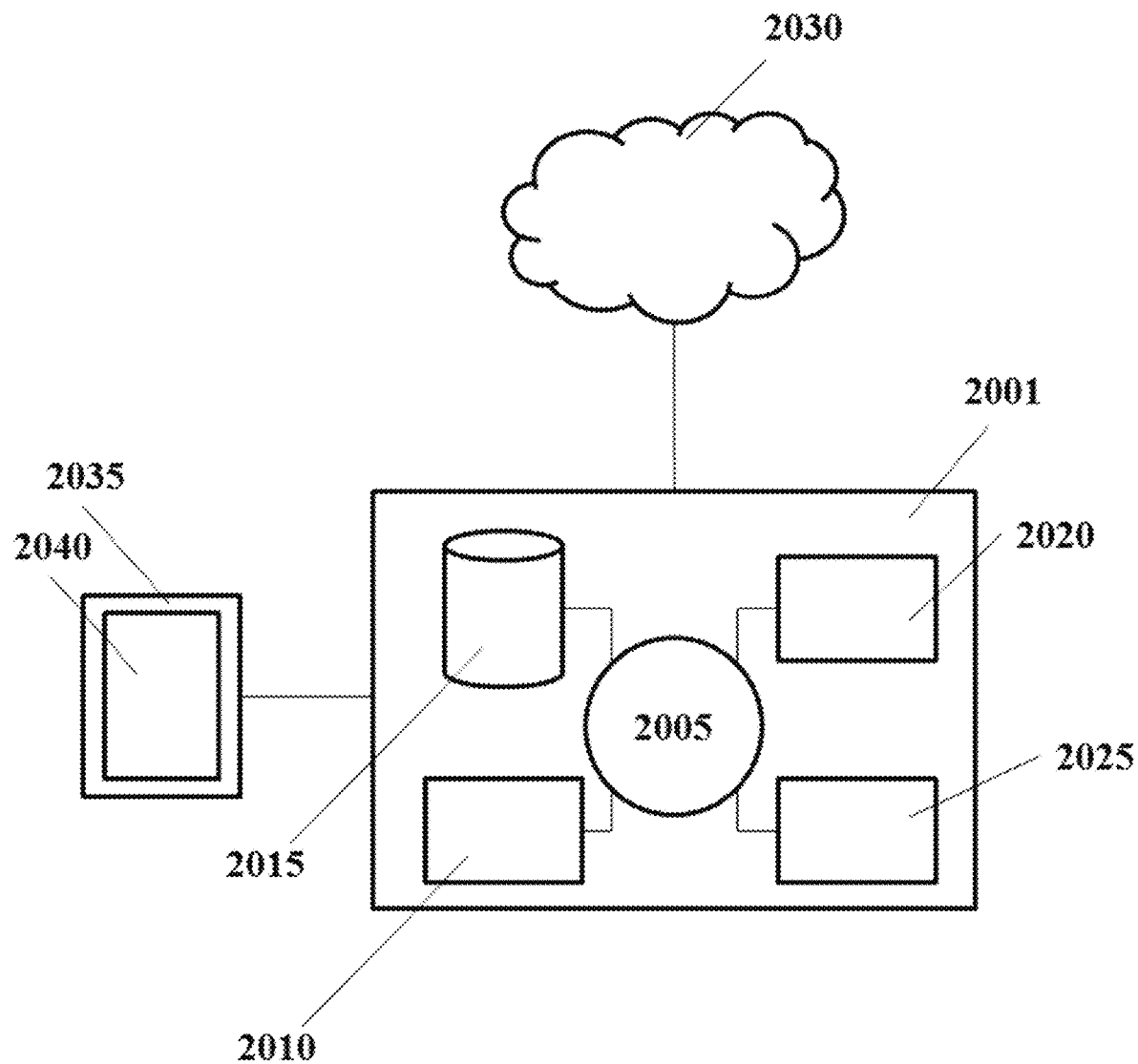
FIG. 20 shows a computer control system that is programmed or otherwise configured to implement methods provided herein.

The present disclosure provides computer control systems that are programmed to implement methods of the disclosure. FIG. 20 shows a computer system 2001 that is programmed or otherwise configured to implement methods of the present disclosure. The computer system 2001 includes a central processing unit (CPU, also "processor" and "computer processor" herein) 2005, which can be a single core or multi core processor, or a plurality of processors for parallel processing. The computer system 2001 also includes memory or memory location 2010 (e.g., random-access memory, read-only memory, flash memory), electronic storage unit 2015 (e.g., hard disk), communication interface 2020 (e.g., network adapter) for communicating with one or more other systems, and peripheral devices 2025, such as cache, other memory, data storage and/or electronic display adapters. The memory 2010, storage unit 2015, interface 2020 and peripheral devices 2025 are in communication with the CPU 2005 through a communication bus (solid lines), such as a motherboard. The storage unit 2015 can be a data storage unit (or data repository) for storing data. The computer system 2001 can be operatively coupled to a computer network ("network") 2030 with the aid of the communication interface 2020. The network 2030 can be the Internet, an internet and/or extranet, or an intranet and/or extranet that is in communication with the Internet. The network 2030 in some cases is a telecommunication and/or data network. The network 2030 can include one or more computer servers, which can enable distributed computing, such as cloud computing. The network 2030, in some cases with the aid of the computer system 2001, can implement a peer-to-peer network, which may enable devices coupled to the computer system 2001 to behave as a client or a server.

The CPU 2005 can execute a sequence of machine-readable instructions, which can be embodied in a program or software. The instructions may be stored in a memory location, such as the memory 2010. The instructions can be directed to the CPU 2005, which can subsequently program or otherwise configure the CPU 2005 to implement methods of the present disclosure. Examples of operations performed by the CPU 2005 can include fetch, decode, execute, and writeback.

The CPU 2005 can be part of a circuit, such as an integrated circuit. One or more other components of the system 2001 can be included in the circuit. In some cases, the circuit is an application specific integrated circuit (ASIC).

The storage unit 2015 can store files, such as drivers, libraries and saved programs. The storage unit 2015 can store user data, e.g., user preferences and user programs. The computer system 2001 in some cases can include one or more additional data storage units that are external to the computer system 2001, such as located on a remote server that is in communication with the computer system 2001 through an intranet or the Internet.

The computer system 2001 can communicate with one or more remote computer systems through the network 2030. For instance, the computer system 2001 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 2001 via the network 2030.

Methods as described herein can be implemented by way of machine (e.g., computer processor) executable code stored on an electronic storage location of the computer system 2001, such as, for example, on the memory 2010 or electronic storage unit 2015. The machine executable or machine readable code can be provided in the form of software. During use, the code can be executed by the processor 2005. In some cases, the code can be retrieved from the storage unit 2015 and stored on the memory 2010 for ready access by the processor 2005. In some situations, the electronic storage unit 2015 can be precluded, and machine-executable instructions are stored on memory 2010.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 2001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 2001 can include or be in communication with an electronic display 2035 that comprises a user interface (UI) 2040 for providing, for example, an application (app) to permit a user to select media for display. Examples of UI's include, without limitation, a graphical user interface (GUI) and web-based user interface. The apps may have features and functionality as described in, for example, PCT/US2015/041391, which is entirely incorporated herein by reference.

Methods and systems of the present disclosure can be implemented by way of one or more algorithms. An algorithm can be implemented by way of software upon execution by the central processing unit 2005.

The computer system may further include a video display unit (e.g., a liquid crystal displays (LCD) or a cathode ray tube (CRT)). The computer system also includes an alphanumeric input device (e.g., a keyboard), a user interface (UI) navigation device (e.g., a mouse), a disk drive unit, a signal generation device (e.g., a speaker), and a network interface device. The computer system may also include an environmental input device that may provide a number of inputs describing the environment in which the computer system or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Figure 21:
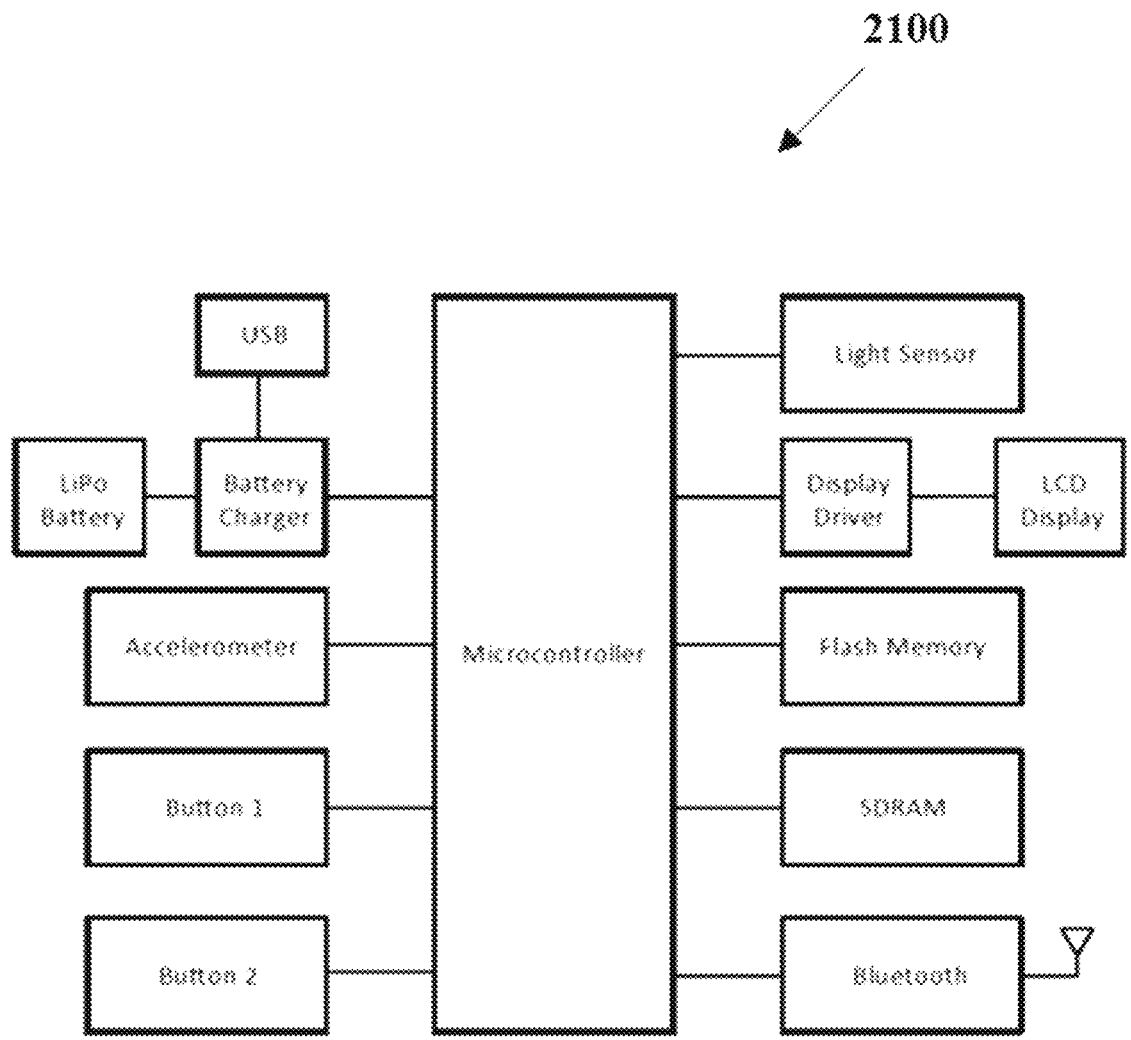
FIG. 21 shows a control unit.

FIG. 21 shows a control unit 2100. The control unit 2100 includes a microcontroller that is in communication with various other units, including a battery (e.g., lithium ion polymer battery), a battery charger that is in communication with a universal serial bus (USB) port, an accelerometer, a first button, a second button, Bluetooth, a first memory (e.g., synchronous dynamic random access memory, or SDRAM), a second memory (e.g., flash memory), a display driver, liquid crystal display (LCD), and a light sensor. The control unit 2100 can be integrated with a display device or system of the present disclosure. For example, the control unit 2100 can be integrated as a circuit board of a display device (e.g., button display).

Social Sharing Expression

Wearable device/screen users of the present invention are able to share their expressions for pay, no pay, "likes" as well as other forms of acknowledgment. As a non-limiting example, a user may create a "peace sign" and display it. Through a hashtag system like Pintrest® and/or Instagram, users of the present invention create expressions and categorize them into files using a hashtag like format. Other people are able to scroll through the inventory of previously created expressions and both "like" or comment on the ones they see. There is an opportunity for other people to upload and use an expression which somebody else created. There are scenarios where the person who wishes to use an expression created by someone else pays the creator of the expression. Revenue then flows to a creator's account. Additionally, there are opportunities to upload and use someone else's expression without payment. In this embodiment there is an acknowledgement such as a "like" which can be the currency for exchange.

The present invention creates an active and dynamic market place for sharing, and using expressions for both a fee based exchange as well as for "likes" or other acknowledgments. In one embodiment all can be kept in a Pintrest®, Instagram and the like hashtag like environment for filing and sharing.

As non-limiting examples, methods and systems for sharing content, such as photographs, audio content, video content, textual content, graphical content, and the like, can be achieved via a social network. In the following description, for purposes of explanation, numerous specific details are set forth in order to provide a thorough understanding of example embodiments. The particular types of systems and methods described herein are not limited to the examples provided and may include other scenarios not specifically discussed.

Figure 23:
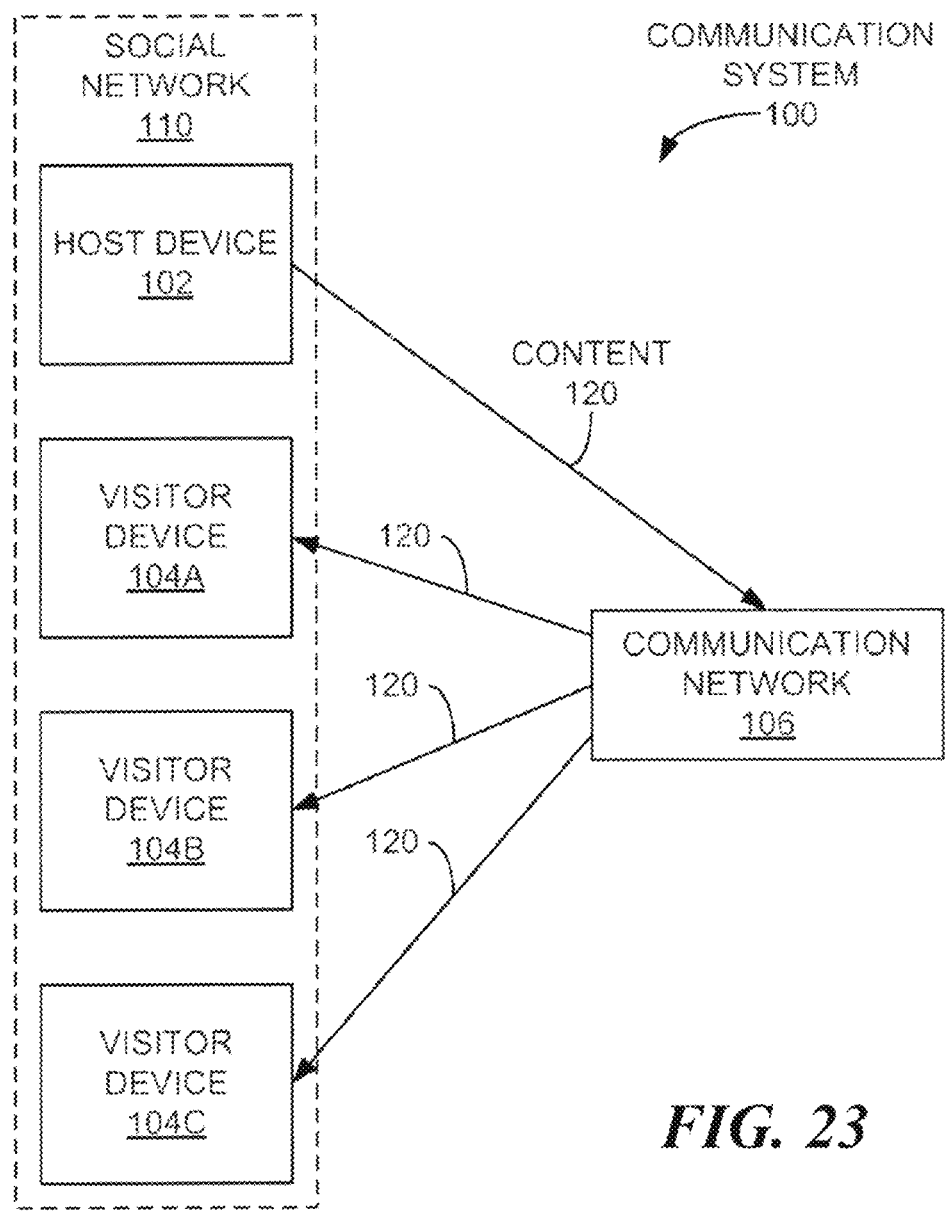
FIG. 23 is a block diagram illustrating an example communication system.

In accordance with an example embodiment, FIG. 23 illustrates an example communication system for the sharing of content among multiple users from wearable device and/or screens to social media. The content may be any content generated or captured by a user that is of interest to another user, including, but not limited to, video content, audio content, audio/video content, textual or graphical content, and photographs or still photo images. Types of textual or graphical content may include, for example, textual or map data indication a location of a user as determined by electronic signals, environmental data, and other inputs that may be captured by a user device. In one implementation, the capture of the content may be ongoing while the content is being shared or distributed within the communication system.

The communication system may include at least one host device and multiple visitor devices associated with users or members of a social network that share content by way of a communication network 106. Examples of the social network 110, or the infrastructure supporting such a network 110, include, but are not limited to, Facebook® and Myspace®. In other examples, other devices not strictly associated with the social network may also send or receive the content via the communication network.

Examples of the communication network may include, but are not limited to, any and/or all of a wide-area network (such as the Internet), a local-area network (LAN) (such as an IEEE 802.11x (Wi-Fi) network), a Bluetooth connection, a Near Field Communication (NFC) connection, an Ethernet connection, a mobile or cellular communications device network (such as a third generation (3G) or fourth generation (4G) connection), and a microcell network, or combinations thereof. The communication network may include one or more servers, such as web or API servers, content distribution servers, and the like, as is described in greater detail below, one or more of which may support the operation of the social network. In some examples, the communication network may include any number of transmitters, receivers, switches, repeaters, and other components to facilitate communication between the host device and the visiting devices.

As shown in FIG. 23, the host device may provide or source the content by way of the communication network to one or more visitor devices for presentation or display to the users of the visitor devices. In some implementations, each of the host device and/or the visitor devices may be any communication device capable of generating, capturing, transmitting, and/or receiving the content. Examples of the host device and the visitor devices include, but are not limited to, wearable devices and/or screen, mobile devices, and the like. While FIG. 23 displays a single host device and three member visitor devices 104, any number of host devices and visitor devices may share multiple items or streams of content via the communication network 106. In many instances, a single user device may operate as both a host device that provides content, and as a visitor device that receives content, at various times, or even concurrently or simultaneous.

In at least some examples, the communication system employs the social network or associated access site to notify users of potential visitor devices of the availability of content being hosted by a host device automatically in a timely manner. A potential reason for employing the social network in this capacity is that users most likely to be interested in receiving the content may be those that are connected to the user of the host device in some way, such as friends, family members, or acquaintances, as may be indicated by way of the social network. Additionally, comments or other indications, such as "likes", regarding the content may be easily provided via the same network 110. Other potential advantages may be discerned from the various embodiments described in greater detail below.

As employed herein, a host may be any user or some other identifiable entity or organization that may source the content to be shared. For example, a news agency capable of streaming video content, and that may also maintain a presence on the social network, may be considered a host. Likewise, a visitor may be any user, entity, or organization that may "visit" a host by receiving the content being generated or transmitted by that host.

Figure 24:
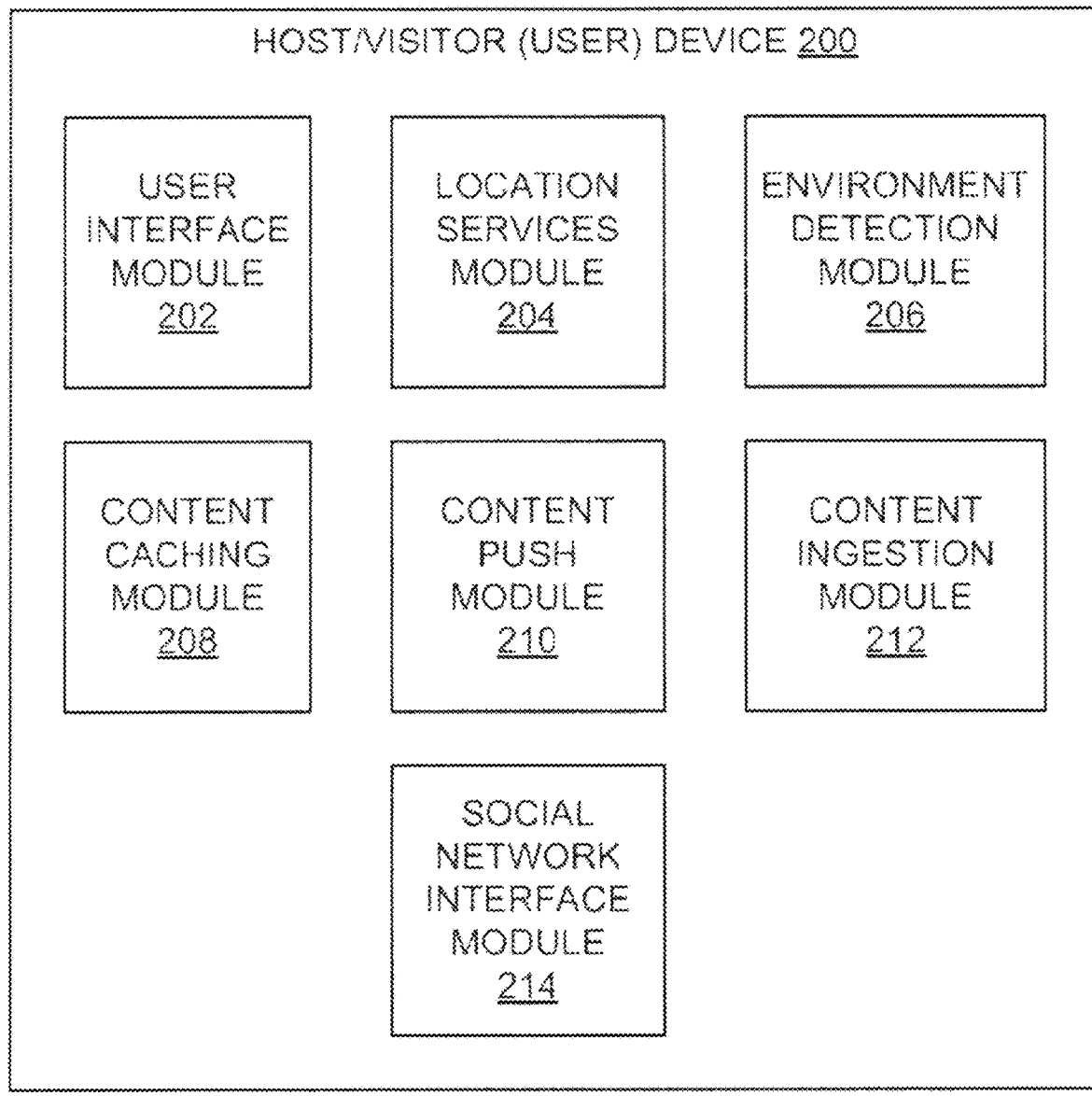
FIG. 24 is a block diagram illustrating modules of an example host and/or visiting device of an example communication system.

FIG. 24 is a block diagram of an example embodiment of a host and/or visitor (or user) device that may serve as one of the host devices and/or visitor devices depicted in FIG. 23. The user device may include a number of software and/or hardware modules, such as a user interface module, a location services module, an environment detection module, a content caching module, a content push mechanism module, a content ingestion module, and a social network interface module. In other user devices, one or more of the modules may be omitted, and one or more modules not depicted in FIG. 24 may be included. In one example, the modules may be software modules that constitute at least part of an application being executed by one or more processors on the user device. More generally, the modules may be hardware, software, firmware, or some combination thereof.

In the user device, the user interface module 202 may facilitate various operations for the sharing and receiving of content by the user of the host/visitor device, as well as access to the social network employed to facilitate the content sharing. As discussed more fully below, these aspects may include, but are not limited to, the request or approval of the sharing of content, the actual capture, generation, and/or viewing of the content, and the specification by a user of the types of content or possible hosts of content of interest to the user, as well as any interfacing with the social network performed in conjunction with the sharing of content.

The location services module 204 may provide or generate information regarding the physical location of the user device. In one example, the location services module may determine location by way of signals received from a Global Positioning System (GPS), an Assisted GPS (A-GPS), a Wi-Fi Positioning System, and/or cell-site triangulation. The location services module may receive such signals by way of circuitry of the user device and process one or more of the signals to determine the location. As described below, this location information may be used to determine if and when content may be offered for reception by other users.

The environment detection module 206 may receive signals from one or more sensors residing on, or in communication with, the user device to indicate various environmental conditions in the vicinity of the user device. Such signals may indicate, for example, atmospheric pressure, temperature, light, velocity, acceleration, orientation, and so on, as generated by sensors such as light meters, accelerometers, gyroscopes, thermometers, and the like. For example, persistent changes in acceleration may indicate the client device is located in a moving car, or the detection of multiple voices may indicate presence within a crowd. The environment detection module may also employ signals from various communication network interfaces, such as Near-Field Communication (NFC) signals, Bluetooth® communication signals, Wi-Fi communication signals, and the like to supplement and enhance the location information of the user device generated by the location services module to more closely define the location of the user device.

The content caching module 208 may store locally on the user device content that has been captured at the user device but has not been transmitted to the communication network for sharing with other user devices, such as during times when the user device has lost contact with the communication network 106. In response to the connection between the communication network and the user device being restored, the cached content, including photos, audio, video, textual data, graphical data, and the like, may then be uploaded to a server or other node of the communication network for subsequent transfer to the other user devices.

The content push mechanism module 210 facilitates the reception of content at the device operating as a visitor device from a distribution server or other device of the communication network under a "push" data transfer model. For example, a Comet web application model may be employed to receive content and other data under a "hanging GET" protocol, in which the server maintains a HyperText Transfer Protocol (HTTP) request from the user device indefinitely to push the content to the user device.

The content ingestion module 212 may be responsible for taking the content captured at the user device and possibly modifying, adjusting, or otherwise processing the content before sharing the data via the communication network 106. For still image content, examples of such processing may include, but are not limited to, scaling the image, and adjusting the resolution, orientation, brightness, sharpness, color, contrast, or focus of the image. These operations may depend on several factors, including, but not limited to, the capture and display capabilities of the user device, and the speed of the communication network coupling the user device with other user devices. The content ingestion module may also package various metadata with the content, such as the location and environmental data discussed above.

The social network interface module 214 may facilitate the transfer of information, as well as the processing of that information, between an application executing on the user device and the social network 110. Such information may include, for example, "friends", family members, and/or acquaintances of users as denoted in the social network 110, as well as their current status, possibly including their current location. This information may be utilized to ascertain potential visitors for a host of content. In some examples, comments, "likes", and similar information regarding a visitor's view of content or a host of that content may also be maintained by the social network to provide information to other potential visitors of content or a host of that content. Other information may also be transmitted between the social network and the application in other embodiments. In addition, the application may allow a user of the device executing the application to log-on to the social network and perform a number of social-network-related functions via the application.

Figure 26:
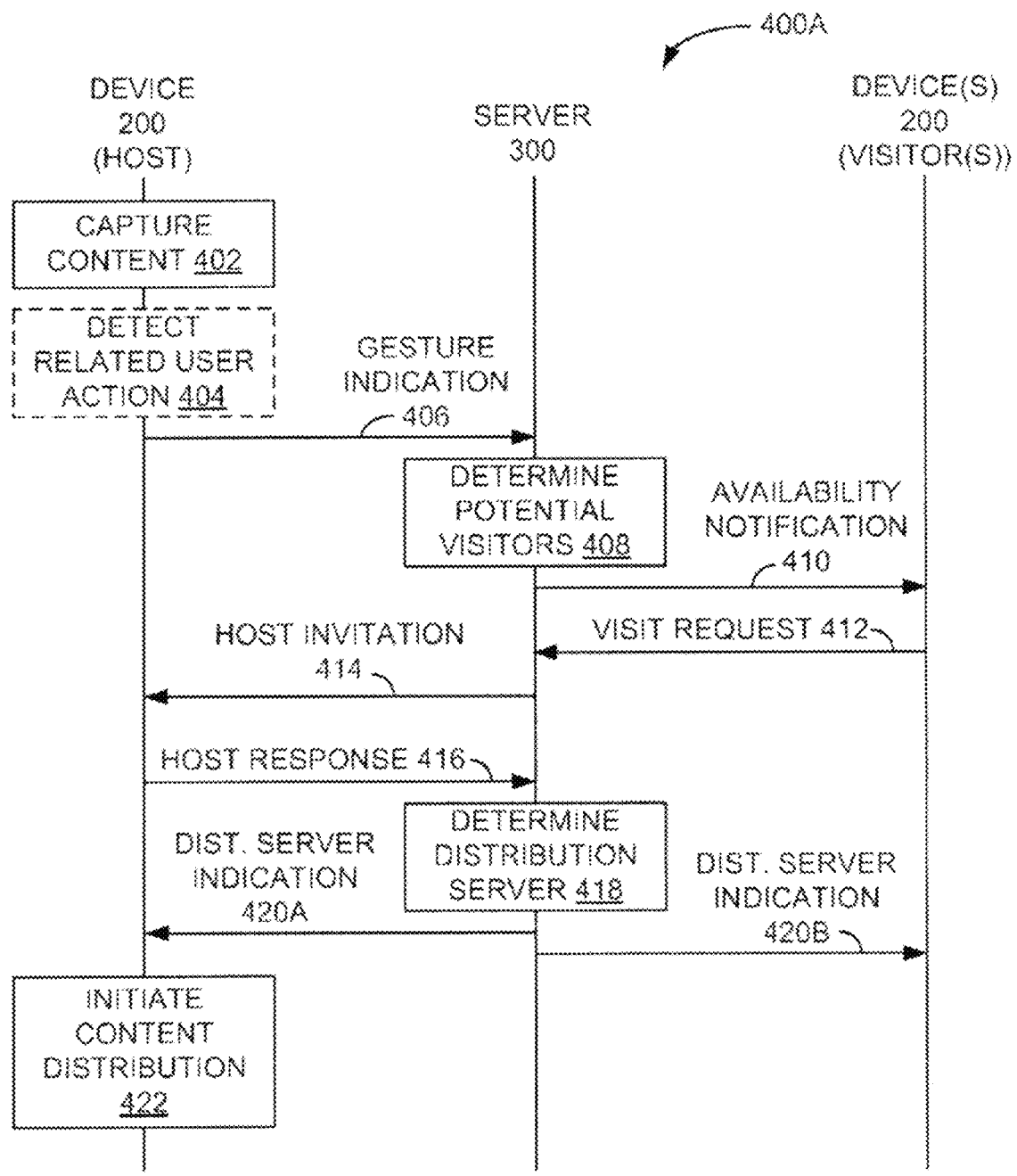
FIGS. 26, 27, and 28 are communication diagrams illustrating example methods for sharing content via social network interaction.

FIG. 26 is a block diagram of an example embodiment of a server device located within, or coupled with, the communication network of FIG. 23. In at least some examples, the server device may facilitate activities regarding the transmission of content between user devices, including, for example, the determination of potential visitors via the social network, as well as the initiation and continued control of the transmission of content between the user devices. In various examples, the service device may be an Applications Programming Interface (API) server, a web server, or another type of server capable of performing the various operations described herein.

The server device may include a number of software and/or hardware modules, such as an API module, a user preferences module, a social network contacts module, a host/visitor status module, a content push mechanism module, a distribution server selection module, a content storage module, and an incentive/award module. In other server devices, one or more of the modules may be omitted, and one or more modules not depicted in FIG. 26 may be included. In one example, the modules may be software modules that constitute at least part of an application being executed by one or more processors on the server device. More generally, the modules may be hardware, software, firmware, or some combination thereof. Further, the server device may be embodied in multiple separate devices that form a system capable of accomplishing the operations of the server device as described herein.

The API module may facilitate communications between the server device and multiple user devices and/or the social network for a variety of purposes. Such purposes may include, but are not limited to, the collection of information from the social network for determining possible hosts of the content and potential visitors for those hosts, information regarding the perception of visitors of a particular host or associated content, and communication between the server device and the user devices regarding the initiation and control of the actual sharing of content among the user devices.

The user preferences module 304 acquires and maintains data associated with the preferences of potential hosts and visitors of content regarding the transmission and reception of the content. For example, the user preferences module may maintain data generated from user responses in association with the first execution of an application employed in the user device to facilitate the sharing of content. Explicit user preferences may also be retrieved at other times by way of the application in other examples. Examples of such user preferences are described more fully below in conjunction with FIG. 28.

One type of user preference data may include the types of content in which each potential visitor may be interested. The types of content may refer to, for example, the format of the content (for example, video, audio, textual, graphical, and so on), the subject matter of the content (for example, sports-related, news-related, family-related, friend-related, and so forth), and other factors associated with the content. In one example, the user may indicate a preference for particular content by way of "liking" the content, or providing positive comments regarding the content, as mentioned above.

Another type of preference data may not be explicitly specified by the user, but is instead derived from previous user actions, such as previous content viewed, previous hosts visited, previous websites viewed, days of the week or times of the day during which such user actions occurred, user activities in connection with the social network (FIG. 23), and so forth.

In some implementations, the user preference information may be employed to automatically present certain types of content, or content from certain hosts, to the user without prompting the user for approval. In other examples, the preference information may be used to inform the user of content in which the user may be interested, and query the user as to whether they desire to visit the host associated with the content. In yet other situations, the preference information may prevent certain content from being offered to the user, such as when the user has explicitly indicated a lack of interest in such content, or in any content from a particular host designated by the user.

The social network contacts module 306 may retrieve data from the social network identifying friends, family, and likes, and so on for each potential visiting user. Further, this data may be updated by way of retrieving the information periodically from the social network. For example, the data may indicate hosts and their associated potential visitors based on friends, family, and other acquaintances as indicated in the social network. The social network contacts module may also identify other potential visitors for any particular hosts based on commonalities or other factors possibly linking a host and a potential visitor, including, but not limited to, related educational backgrounds, business associations, social interests, and the like. In another example, relationships other than those specifically designated by the social network, such as friends of friends, friends of family members, and the like, may be regarded as potential visitors for each possible host of content. Conversely, the social network contacts module may track potential hosts for a user in a possible visitor role in a way similar to that described above.

The host/visitor status module 308 may maintain current information, and possibly historical data, regarding the status of each user device. This information may include, for example, the current geographic location of each user device, as well as previous locations of the device. As indicated above, such data may be provided by the location services module and/or the environment detection module of each user device.

With respect to content sharing, the host/visitor status module 308 may maintain information regarding current and/or former visitations from both a host and a visitor standpoint. Such information may include the format, subject matter, and other aspects of the content transmitted or received the visitors or host associated with the content being shared, any particular distribution servers employed to forward the content from the host to the visitor, and the like.

As will be described in greater detail below, this status information may be utilized to determine whether a host is currently sharing content (and, thus, possibly available to continue to share that content with other visitors), whether the host has performed some kind of action or "gesture" via the user device of the host which would indicate that the host may be in a position to share content with one or more potential visitors, and identify which potential visitors may be interested in receiving the content.

The content push module 310 may provide the functionality for the server device to push content to the visitor devices of a particular group. As mentioned above, the pushing of content may be facilitated by way of a Comet web application model to distribute content and other data to the client devices under a "hanging GET" protocol. In another example, the functionality of the content push module may be provided by way of a separate service device, such as a server device specifically allocated to perform the distribution of the content from a host device to a visitor device.

The distribution server selection module 312 may select a distribution server from a group of such servers to perform the content distribution from a host to one or more visitor devices. In one example, the group of servers may define a distribution server "farm" provided primarily for content distribution. To perform the selection, the distribution server selection module may access information regarding an item or stream of content to be distributed to a new visitor requesting the content. Depending on the current number of visitors being serviced by each of the distribution servers, possibly in addition to other factors, the distribution server selection module may select a distribution server currently servicing other visitors or a new distribution server from the group to provide the content to the new visitor.

The content storage module 314 may store and manage content that is yet to be distributed to one or more visitor user devices. For example, the content push module may allow visitor devices that are in the process of receiving content while employing the server device in a digital video recorder (DVR) mode in which pausing, rewind, fast-forward, and similar playback modes are provided. The content storage module may also provide a complete item or stream of content to a visitor that has started its visitation of the host after the start of the content has been transmitted to other visitors, resulting in the content being delayed to the late-arriving visitor relative to the other visitors. In other implementations, the functionality of the content storage module may be provided in a separate distribution server.

The incentive/award module 316 may provide various incentives, awards, or recognition to users based on various aspects of hosting and/or receiving content. For example, the incentive/award module may provide recognition of a host for the most visits by another user over some timer period, the total distance over which content was transmitted to a visitor, the highest number of "likes" or positive comments from visitors regarding an item or stream of content. From the perspective of the visitor, recognition could be provided in light of the highest number of different hosts or "places" visited, the distances involved in those visits, and so on. In one example, recognition of these milestones may be published via the social network. The incentive/award module may also provide or designate more substantive incentives or awards, such as cash awards or credits for employing the content-sharing service of the communication system.

Figure 25:
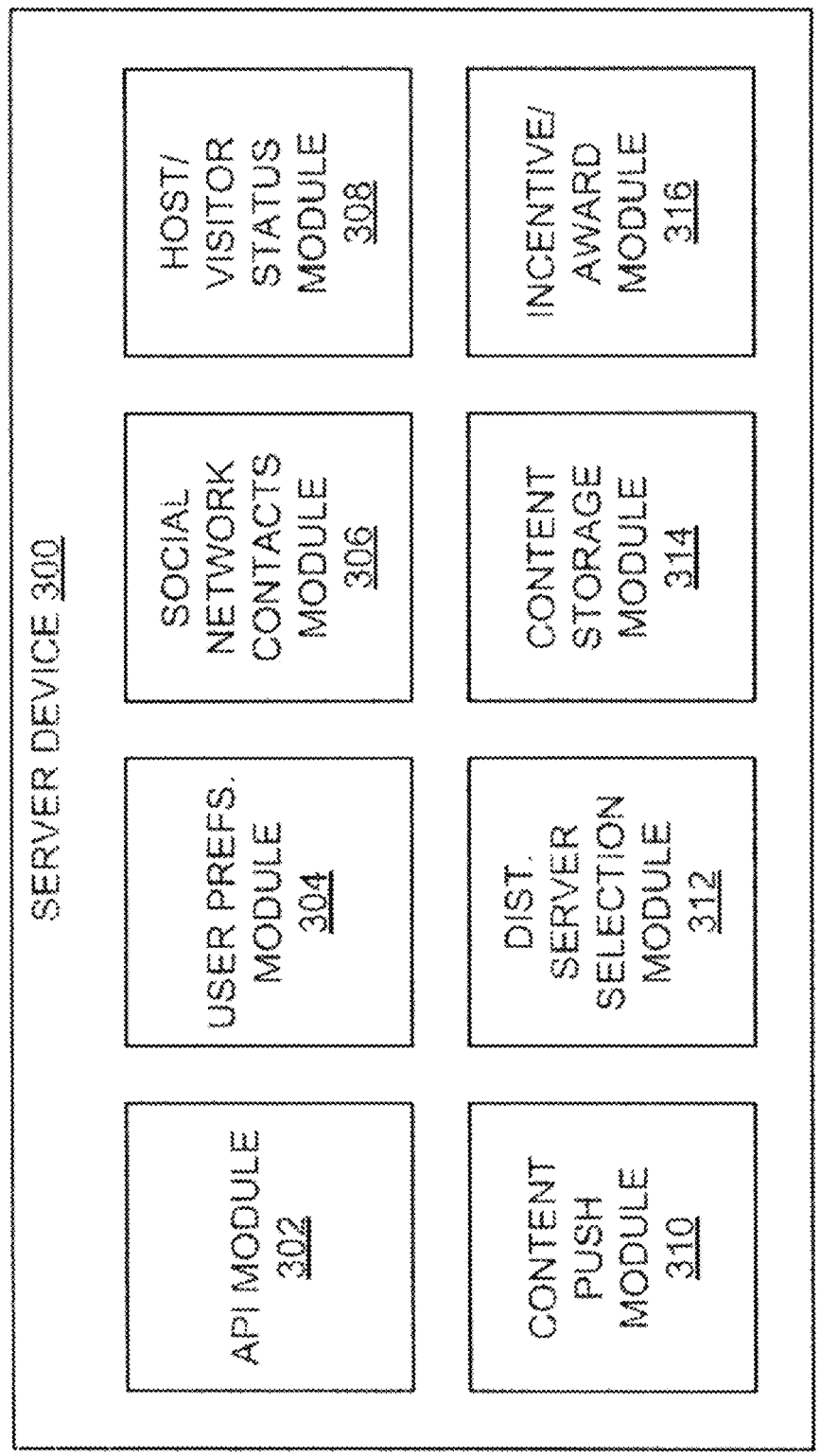
FIG. 25 is a block diagram illustrating modules of an example server of an example communication system.

FIGS. 29A, 29B, and 29C are communication diagrams illustrating example methods for sharing content using notification through a social network, such as the social network of the communication network of FIG. 23. However, other communication systems utilizing different components or systems may employ the methods depicted in FIGS. 29A through 29C in other examples. Further, alternatives of each of the methods may omit one or more operations and communications described in FIGS. 29A through 29C, or may add other operations and communications not shown therein. In addition, each of the methods may be encoded as instructions on a non-transitory computer-readable storage medium, such as, for example, an integrated circuit, magnetic disk, or optical disk, which are readable and executable by one or more computers or other processing systems, such as the user devices of FIG. 17 and the server of FIG. 25.

In one example, prior to execution of the example methods of FIGS. 29A and 29B, a plurality of user devices may register for the ability to share content in conjunction with the use of a social network. In one example, this registration may occur as the result of a software application being installed and executed on each of the user devices. Further, as a part of the installation process, the application may ask the user of the device for information regarding, for example, the user, the user's involvement with the social network, and the interest level of the user in various types of content. Examples of the desired information, include, but are not limited to, the user's name and other identifying information, the user's identifier within the social network, and the formats, subject matter, and other characteristics of the user's favorite or desired content. Such information may be stored in the user device, the server device, or another device or database of the communication system of FIG. 24. In some implementations, this information may also be used to gather further data regarding the historical habits of the user regarding the types of content received, the particular time periods in which the user accessed the content, and the like. This information may be employed as described above to control or direct the sharing of content among the user devices. The method of FIG. 28 denotes such a registration operation, which is described more fully below.

In the example method of FIG. 26, a device, under the direction of a user, captures or generates content (operation 402), such as one or more still images, textual data, graphical data, audio data, and/or video data. In some examples discussed below, particular emphasis is placed on the sharing of a video data stream, but the scope of the embodiments described herein is not limited to video data.

In some examples, the user device may also detect 404 a user action related to the content captured or generated. While the user action is depicted in FIG. 26 as occurring after the capture of the content, such an order is not mandated, as the user actions may occur before and/or after the capture or generation of the content. Such an action may be termed a "gesture", which in one instance may serve as a trigger for the sharing of the content. Possible gestures may encompass any of a number of user actions, such as the changing of a geographic location, as detected by the location service module and/or the environment detection module. In one implementation, a gesture may include the actual capturing or generation of the content, such as the taking of a photo or video, or the posting of the content to the social network. In another instance, the gesture may be the initiation of some other action involving the social network, such as a social network status, comment or "like", friend request or acceptance, the creation of a photo album, or the like, that is not specifically related to the content in the social network, possibly accompanied with a location "tag" or metadata. Furthermore, a gesture may be an action of another person connected to the social network, such as a friend or family member of the user of the device. Such actions may include the viewing of content posted to the social network, the posting of content to a portion of the social network associated with the user (for example, the user's "wall"), comments regarding the user, and so forth. In another example, the gesture may be an explicit indication by the user via the user interface module to share the content as a host. Additionally, a gesture may include the hosting of content to another visitor.

In response to capturing the content, and possibly also in response to some additional user action, the device of the potential host transmits a gesture indication (operation 406) to a server. In one implementation, the gesture indication indicates that the device of the potential host has captured (or is in the process of capturing) content that may be shared with visitors. In response, the server determines potential visitors that may be interested in "visiting" the host (operation 408), thus receiving the captured or generated content. In one example, the server employs information previously received from the social network regarding friends, family members, and possibly others of the potential host, and uses that information to identify the potential visitors. In addition, the server may also employ user preference information of the potential visitors to further determine which of the potential visitors may have an interest in receiving the captured or generated content.

In response to determining the potential visitors, the server may then transmit an availability notification (operation 410) to each of the potential visitors identified. As a result, a gesture by the potential host may be reflected in a notification to a potential visitor, such as a notification provided via the social network, or by way of an application executing on the user device of the potential visitor. The availability notification, in one example, identifies the potential host in at least one of a number of ways, such as an individual host, as a current location of the potential host (for example, a city or neighborhood), an identity of a particular group in which the host is a member, and/or the nature of the content to be shared. In one example, the availability notifications are provided through the application that provides the content-sharing capability on the devices. In a second example, the availability notifications are provided by way of the social network. After receiving the availability notification at their respective devices, those potential visitors interested in receiving the content may initiate a visit request (operation 412) to be transmitted from the device of the visitor to the server.

Responsive to receiving the one or more visitor requests, the server may transmit at least one host invitation to the device of the potential host (operation 414) for presentation to the potential host. In one example, the server may transmit a single host invitation to the device of the potential host when at least one potential visitor has issued a visit request. In another implementation, the server may transmit a host invitation for each visit request received. The server may also indicate the identity of each potential visitor in the host invitation.

In reply to the host invitation presented to the potential host, the device of the potential host may return a host response to the server (operation 416) at the initiation of the potential host. If the potential host decides not to fulfill the role of a host, the server may then inform the devices of the potential visitors that the content will not be shared (not shown in FIG. 26). If, instead, the potential host decides to become a host for the content, the server may then determine or select one or more distribution servers by which to forward the content to the devices of the visitors (operation). Such a selection may be based on a number of factors, including, but not limited to, the number of visitors to receive the content, the communication bandwidth required to transmit the content, and the communication capabilities of the communication network 106, the distribution servers, and the receiving devices.

An example method by which the distribution server is selected is discussed below in conjunction with FIG. 29. In one example, the distribution server determination may be performed within the server, while in other cases, this operation may be provided by way of a separate device within the communication network (FIG. 23). Furthermore, the server may select one or more distribution servers from a dynamically generated list of servers.

Once the server selects the one or more distribution servers, the server may provide a distribution server indication to both the device of the host (operation A) and the devices for each of the visitors (operation B). In one example, the distribution server indications allow each of the devices to engage in communication with the correct server to transmit or receive the content, as appropriate. In response to receiving the distribution server indication, the device of the host initiates distribution of the content via the indicated server.

In some implementations, the content distributed to the visitors may be the content currently being captured and transmitted by the device of the host. In other embodiments, the visitor may being receiving the content at the beginning of the capture or generation of the content after the content has been stored or cached at the device of the host, or on a server of the communication network 106. Further, the distribution of the content may be controlled by each visitor via DVR-like commands, such as rewind, fast-forward, pause, and so on.

In another implementation, multiple different streams or items of content from multiple hosts may be made available to one or more visitors. As such, the visitor may view the multiple streams or items of content concurrently or simultaneously, such as by way of "tiled" or "picture-in-picture" view. In one example, the multiple sources of content may reflect different angles or points of view of the same event or location.

In one example, visitors aware of the content, whether or not actually visiting the host, may inform their friends and other contacts via the social network of the content being hosted by another user. As a result, "friends of friends" not connected directly to the host of the content also may become visitors of the host. Moreover, the "friends of friends" visitors may also notify additional friends of the same content. This notification process may continue indefinitely, possibly resulting in a large number of visitors for the host based on the social network. In other implementations, visits to one or more hosts may be open or available to most or any potential visitors, including, for example, anonymous users and users employing aliases or pseudonyms.

In an embodiment, any and/or all of the communications from the server to the hosts, such as the availability notification (operation), the host invitation, and/or the distribution server indications (operation) may be issued according to a push notification mechanism, such as the Cloud-To-Device Messaging (C2DM) messaging framework provided by Google® Inc., or the device push notification channels supported by Apple® Inc.

Figure 27:
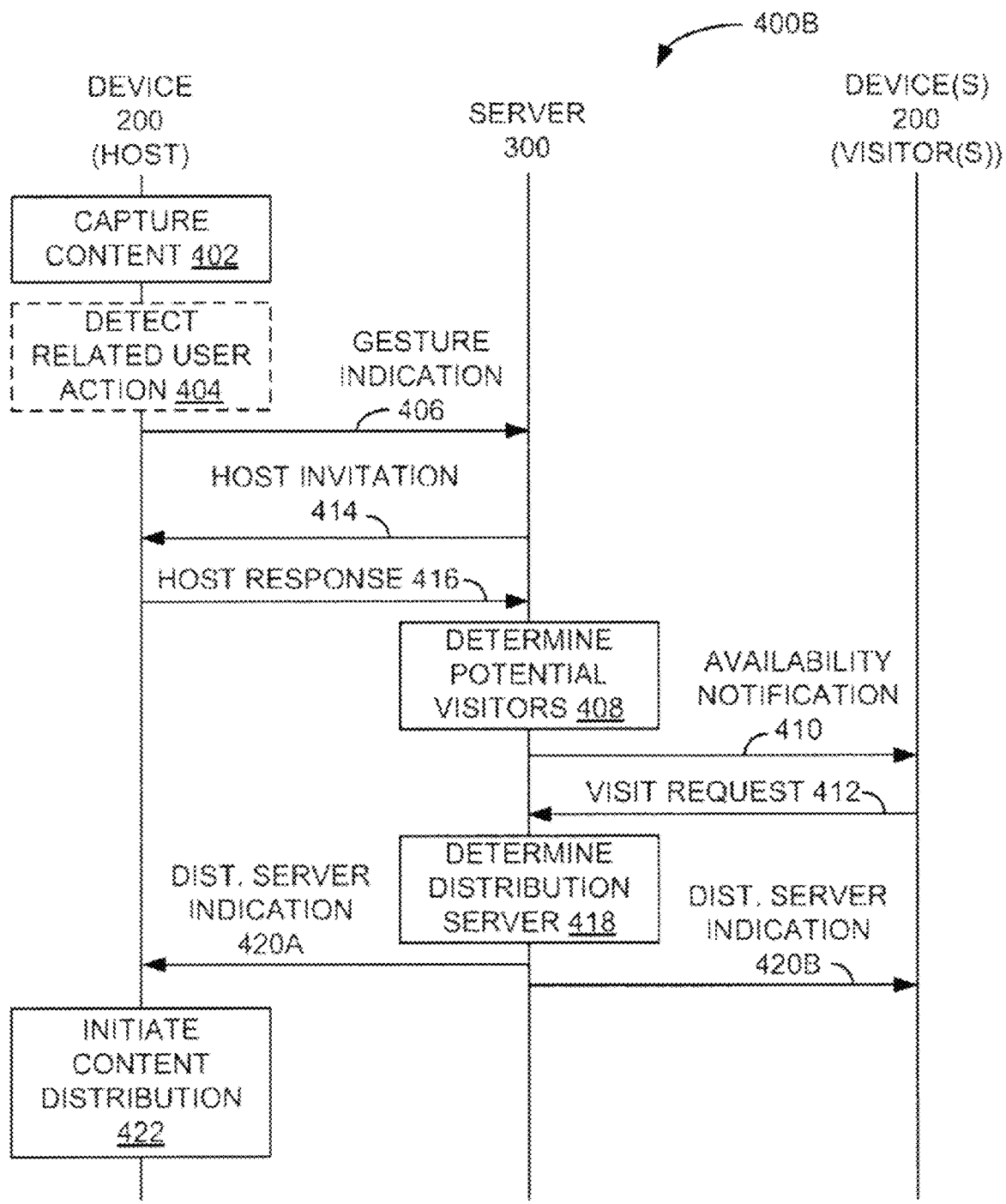

FIG. 27 provides another example method 400B for the sharing of content captured or generated at a potential host device. The method is similar in several respects to the method of FIG. 50, described above. However, instead of waiting to issue the host invitation until at least one visit request has been received from a device of a potential visitor, the server transmits the host invitation in response to receiving the gesture indication from the device of the potential host. Thereafter, when an affirmative host response is received indicating that the potential host agrees to that role, the server then determines the potential visitors and notifies the identified potential visitors accordingly. In another example, if the host response indicates that the potential host does not wish to host visitors, the selection of potential visitors and the transmission of associated availability notifications need not occur.

In a related example, the issuance of the host invitation may occur prior to the capture of any content. For instance, at least some of multiple devices may produce gesture indications indicating their current location. Based on a particular location being of interest (say, the location of a newsworthy event), host invitations may be issued to those devices corresponding to the location of interest. In a further embodiment, the host invitations may be issued to devices that have not issued a gesture indication, wherein the host invitation indicates a particular location of interest, requesting host responses from those devices currently positioned at the requested location. Thereafter, a user willing to serve as a host may begin the capture of content for transmission to one or more visitor devices.

Figure 28:
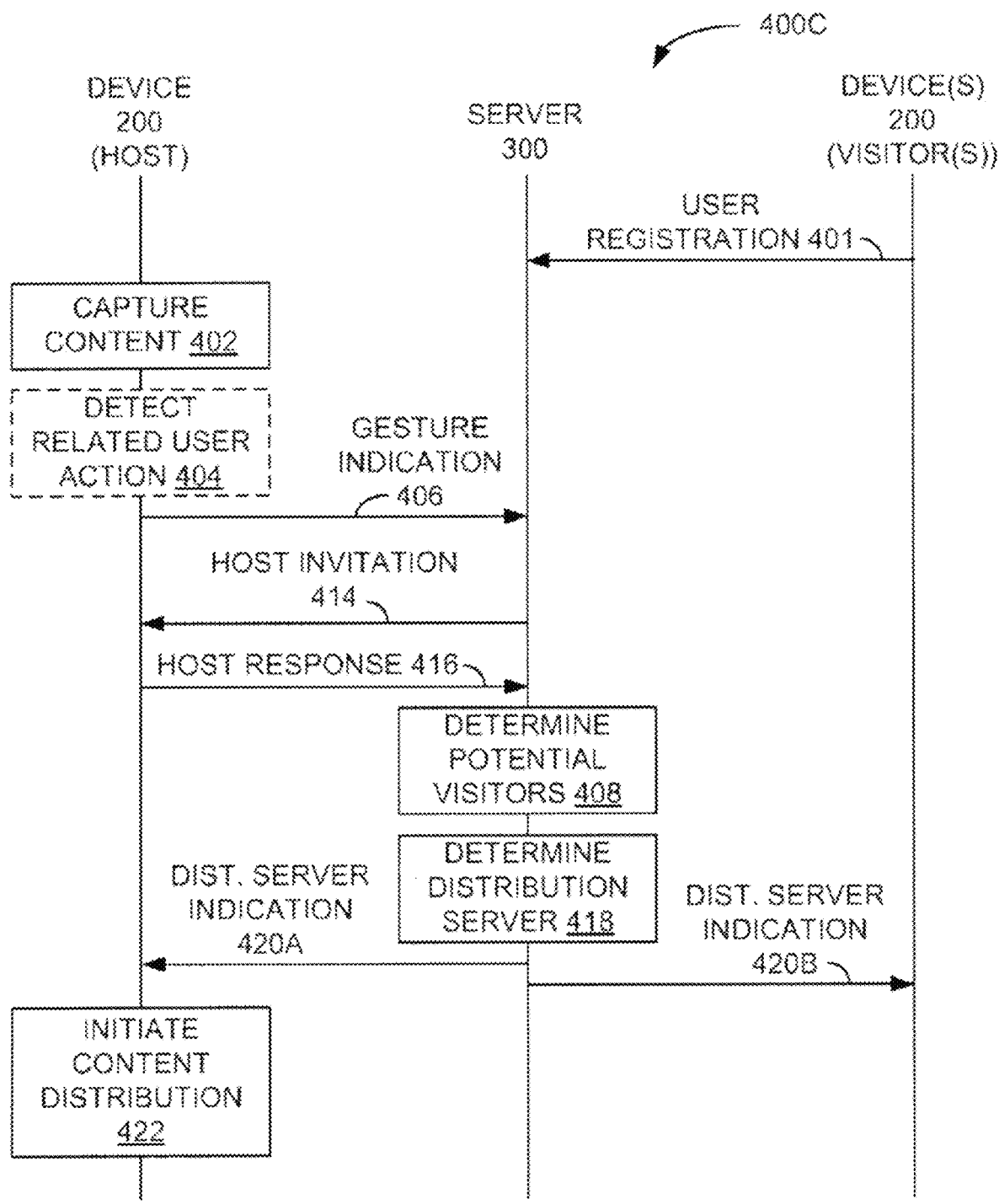

FIG. 28 is a communication diagram of yet another example method 400C for content sharing. The method is similar to the method of FIG. 27, except that no availability notifications and visit requests are transmitted or received. Instead, the user preferences and related information discussed above may specify the format and types of content in which a potential visitor is interested, as well as the potential hosts from which the user may receive the content. The server may retrieve such information from the user by way of a user registration, which may occur when the user first causes the application to be executed. As a result, the server may determine the potential visitors for a particular item or stream of content based on that information and proceed to determine the one or more distribution servers to be used, and then provide distribution server indications to both the device of the host (operation A) and the devices of the visitors (operation B).

As mentioned above, with respect to user registration, the user may indicate the types of content of interest to the user, and other information relating to the content. For example, the user may designate the potential hosts in which he is interested (possibly termed as "following" that host), content associated with a particular geographic area or region, content representative of a particular topic, and content that may be presented as part of a particular news feed. Furthermore, a selection of a particular type of content may be conditioned by a time limit, such as for example, over the next day or week.

In other examples similar to those illustrated in FIGS. 29B and 29C, a host invitation and host response may not be necessary. For example, if the potential host of content is an individual or an entity, such as a news organization, that is always willing to (or capable of) serving as a host for any new content generated or received at the device of the host, the informational exchange embodied in the host invitation and host response may be unnecessary. Thus, after the capture of content and/or the detection of a related user action, thus causing a gesture indication to be transmitted to the server, the potential visitors may be determined, the distribution server selected, the distribution server indications issued, and the content distribution initiated, as discussed above.

In one implementation, potential visitors may be determined by way of presenting indications of potential items or streams of content for selection by the potential visitors, such as by way of the social network. For example, a webpage associated with the social network may present a number of "featured" items or areas of content, such as different types of news, sports, and the like, or different geographic areas, such as specific cities, states, or countries. After being presented with these options, the potential visitor may select one or more of the features items for reception and viewing. In one example, such selections may only apply to a one-time item of content, after which such selections may have no effect for that visitor.

In other examples, the determination of one or more distribution servers and the associated distribution server indications may not be implemented if the distribution servers are known in advance to the various devices involved in the sharing of the content.

While FIGS. 29A, 29B, and 29C reflect separate devices for hosts and visitors, a single device may serve as both a host and a visitor for different items or streams of content. For example, the sharing of content between two devices may occur simultaneously there between using the various concepts described above, although employing a device as a host device and a visitor device is not restricted to a bidirectional, one-to-one sharing of content.

Figure 29:
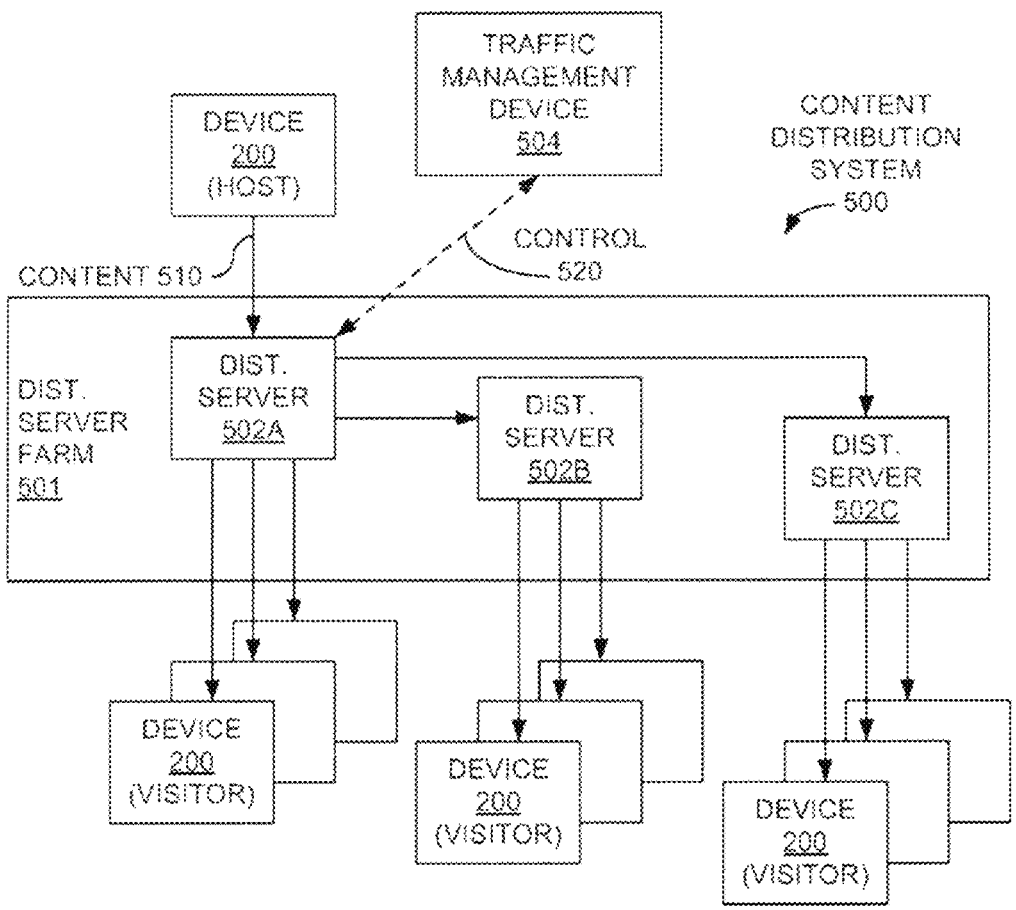
FIG. 29 is a block diagram of an example content distribution system associated with an example communication system.

FIG. 29 is a block diagram of an example content distribution system in which the device of the host transmits content to a distribution server, which in turn distributes the content to one or more devices for visitors of the host. In one example, the distribution server is selected as part of the example methods, and of FIGS. 29A, 29B, and 29C, respectively. As discussed earlier, the distribution server selection module of the server (FIG. 25) may perform the selection of the distribution server. In other examples, other distribution servers and may be selected for distribution of the content to other visitor devices by either the distribution server selection module or a separate traffic management device 504, shown in FIG. 29. Further, as described below, the distribution server selection module in the server (FIG. 25) or the traffic management device 504 may communicate with the distribution server by way of a control connection to determine whether more or fewer distribution servers may be desirable for distributing the content. In the implementation depicted in FIG. 29, the multiple distribution servers may constitute at least a portion of a distribution server farm. While the server farm of FIG. 29 explicitly illustrates only three distribution servers, a higher number of such servers may be included in the server farm in other embodiments.

In one implementation, the first distribution server may be termed a "canonical server" for its status as the primary distribution server employed for sharing of the content. in one example, the canonical server may not be capable of distributing the content (for example, an audio/video stream) to each of the visiting devices. As a result, the canonical server may keep the traffic management device appraised of the visitor devices currently receiving the content, as well as any other information that may aid the traffic management device in enlisting another distribution server, into service for the distribution of the content.

In one example, the canonical distribution server may be transferring multiple streams of content simultaneously, with no other distribution servers, involved. While performing these transfers, the canonical distribution server may determine that the number of visitor devices receiving a particular stream of content has increased beyond a predetermined threshold. In response, the canonical distribution server may inform the traffic management device of the condition, causing the traffic management device to instruct the canonical server to assign one or more of the remaining distribution servers, to additional visitor devices requesting the content. In one example, the traffic management device determines and informs the canonical server which of the remaining distribution servers are to be used. Such information may be based on random selection, consideration of current traffic levels regarding the content, and other factors.

In response to the selection of at least one additional distribution server, the canonical server directs the incoming content to the selected distribution server, In one implementation, the canonical server establishes a proxy connection with the selected distribution server, thereby accessing the selected distribution server, as a pseudo-visitor device. In addition, the canonical distribution server, the traffic management device, the original server, or another device informs each newly-joining visitor device of the identity of the distribution server, assigned thereto.

As a result, the canonical distribution server acts as the single receiving point for the content from the host device. In addition, the canonical server then delivers the content directly to one or more visitor devices, and may direct the content to one or more additional servers, which in turn transfer the content directly to additional visitor devices. Therefore, the maximum number of distribution servers separating the device for the host and each of the devices of the visitors may be two, thereby reducing the overall latency incurred in the transmission of the content.

Thereafter, as fewer visitors decide to continue to receive a particular stream of content, the number of distribution servers utilized to forward the content to devices of the visitors may be reduced accordingly, possibly to the point at which the canonical server is only forwarding the content directly to a number of devices instead of also forwarding the content to one or more of the remaining distribution servers, of the server farm.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. it will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Processing Expressions from Wearable Devices/Screens

The back-end of the present invention allows wearable device/screen users to create their own self-expressions using images, words and combinations thereof. As a non-limiting example, the creation tools can be for creating multi-color images, words fonts, and the like using photographs and combining them to create unique visual images and expressions. Software and hardware is provided that allows others to down load existing images from friends, the internet, mobile devices and the like. These can then be altered through the systems software resources into a format that can be uploaded onto the user's wearable device/screens.

Additionally, advertisers and those interested in initiating communal expressions can utilize the hardware and software of the present invention to provide their expression in the correct format for use across all users of the wearable devices/screens. The aggregate dashboard is able to communicate and read the imbedded codes which the software adds onto the expressions. This can be achieved in a manner similar to a "meta tag" as well as other ways to read the creations of self-expressions.

Figure 30:
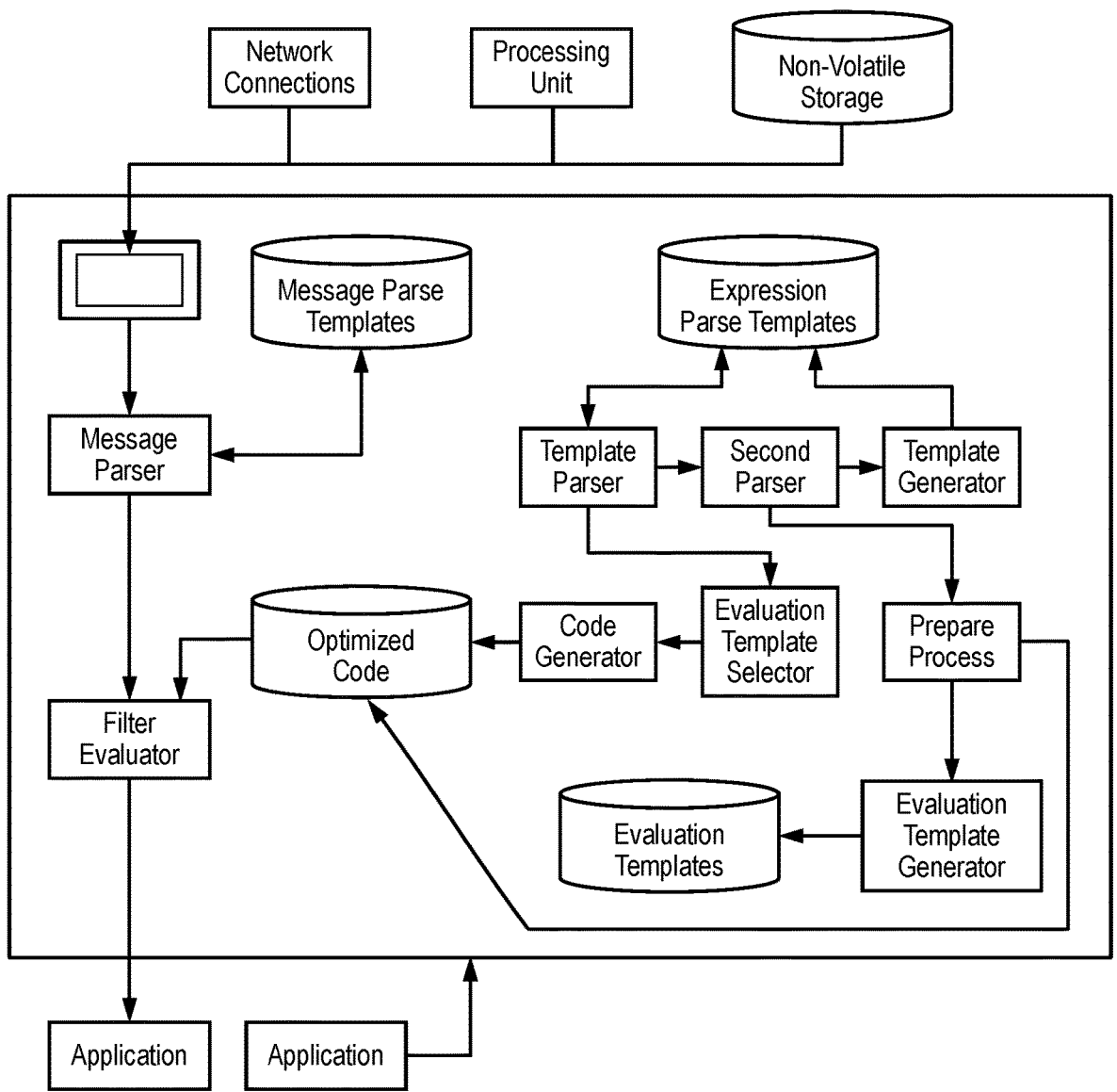
FIG. 30 is a schematic representation a data processing system according to some embodiments.
Figure 31:
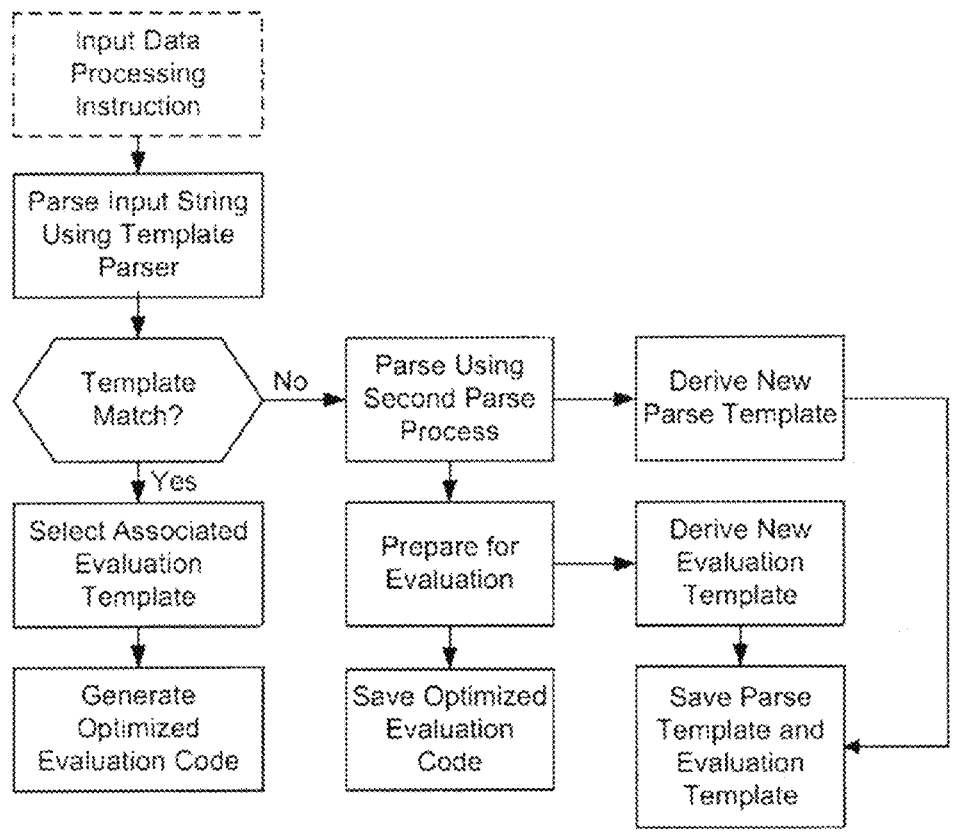
FIG. 31 illustrates a sequence of steps of a method for preparing optimized evaluation code according to some embodiments.
Figure 32:
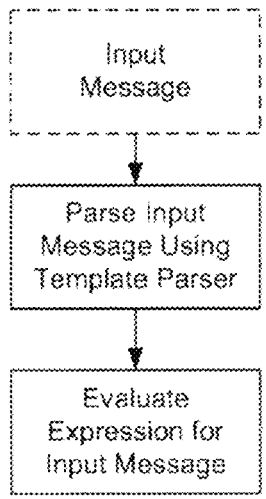
FIG. 32 illustrates the corresponding evaluation of an input message.

FIG. 30 is a schematic representation of components of a first embodiment of the invention, within a network-connected data processing system comprising a data processing unit, main memory, non-volatile storage 580, input/output network connections, and an internal communications bus 590. In this first embodiment, the invention is implemented using a various data repositories and executable components of a JMS provider (a MOM product) within the system memory. The JMS provider provides support to conventional JMS consumer applications that also run in the system memory. The operations performed by the various components shown in FIG. 30 are described below with reference to FIGS. 31 and 32.

In the first embodiment of the invention, when an instruction to create a new JMS consumer session.createConsumer( . . . , selector) is received by a JMS provider, the instruction is initially passed to a template parser. The template parser accesses a template tree representing a set of stored templates and compares the input string with the set of parsing templates that are currently represented within the template tree. The set of templates includes at least one template for handling 'selectors'—i.e. a template for handling the filter expressions that are typically included in an instruction to create a new JMS message consumer.

If there is no available matching template, the selector within the create instruction is parsed by a second parser in a conventional manner. This parse compares the input string with known syntax rules to determine the structure of the selector and to enable its evaluation for message selection filtering—identifying the various expression parameters including common parameter types and their data values and then putting them into a data structure that can be processed. A prepare process is performed on the parsed result to prepare the selector for more efficient evaluation processing. This is a conventional step that typically involves transforming the structure or syntax of the parsed input string into a new format that will enable more efficient processing—in this case efficient message selection filter evaluation.

In the case where no matching parse template is identified, the parse and prepare steps, are performed as described above and then the results are saved as optimized evaluation code. In this preferred embodiment, the results of the parse are also input to a parsing template generator to generate a new parsing template. The results of the prepare step are passed to an evaluation template generator to generate a new expression evaluation template. The new parsing template is a representation of identified parameters of the selector expression, but with the data values of these parameters left blank. The new expression evaluation template is derived from the parsing template and the transformed expression that was generated during the previous prepare step. Any newly generated parsing templates are added to the parsing template tree, and new expression evaluation templates are added to a separate store of expression evaluation templates. In this embodiment, the new expression evaluation templates are associated with respective parsing templates by associating each expression evaluation template with a leaf node of the parsing template tree.

Thereafter, when a new JMS Consumer is defined with a similar selector, the repeated pattern of parameters can be recognized and parsed using the new parsing template. That is, when a selector specified within a new instruction session.createConsumer ( . . . , selector) is passed to the template parser, the template parser compares the new selector with the set of templates represented in its template tree. The new parsing template is identified as a match and is used to analyze the structure of the selector and to extract parametric information for the selector's filter expression. Since an expression evaluation template has already been created for filter expressions of this type, there is no need to perform any new explicit prepare step or to create a new evaluation template. Instead, the previously-saved expression evaluation template (which already represents this type of expression in a format that can be evaluated efficiently) can be selected by an evaluation template selector 690 for evaluating the new message selection filter expression. For example, the SQL-like syntax of a JMS filter expression has been replaced in a stored expression evaluation template with a different syntax that is more efficiently processed by the respective MOM program code.

Information inferred from a successful template-based parsing step enables selection of an appropriate one of a set of stored expression evaluation templates. The parse step also extracts parameters that can be combined 840 with the evaluation template by a code generator to generate optimized evaluation code. In this way, recognition of a repeated pattern has enabled reuse of the results of a previous parse and reuse of a previous preparation of an efficient execution path—preparing for the evaluation step with less processing than conventional solutions.

For example, if a JMS message selection component sees a filter expression: E-filter1: "JMSCorrelId='abc' and 777='zxr'".

The message selection component can parse the filter expression and then explicitly perform prepare processing to generate optimized evaluation code that can be represented as follows: Opt-code 1: MQCorrelId::abc [[ZZZ::zxc]]

This provides a representation of the filter expression in a form that is suitable for evaluation, but has not yet enabled any reuse or saved any processing overhead. The message filter expression can also be processed to create a parse template that will recognize repetition of elements of the expression, as follows: E-parse template 1: JMSCorrelId='% 1%' and ZZZ='% 2%'

The message selection component can then associate this parse template with an evaluation template that is related to the optimized evaluation code and is optimized for the use of a particular evaluation function: E-evaluation template 1: MQCorrelId:: % 1% [[ZZZ:: % 2%]], associated with JMSCorrelId='% 1%' and ZZZ='% 2%')

In this illustrative example, the use of symbols ':' and '[[ ]]' indicates an efficient internal representation that can be used to test messages retrieved from a MOM system by a 'GetMessage' operation.

The parsing of the initial filter expression will extract parameters that could be inserted into the evaluation template, and these may be represented as follows: E-inserts1:→E-evaluation template 1% 1%=abc % 2%=zxc, where the representation '→E-evaluation template 1' indicates that these inserts are for use with template E-evaluation template 1', and where the insert values are 'abc' and 'zxc').

In the above example, the parsed expressions are separated into parts that are common to all expressions of that type (which parts can be represented in a template) and variable parts (the inserts). The common parts typically include the field names (such as 'JMSCorrelId') and operators (such as '=' and 'and') whereas the inserts typically include the 'constants' within the expression (i.e. the values that vary between different instances of a particular type of expression).

In alternative embodiments of the invention, there may be a different set of rules for determining which elements of an expression should be part of a template and which should be handled as inserts. For example, it may be beneficial to recognize JMSPriority as a special case, treating the subexpression 'JMSPriority=1' as part of a template and distinct from 'JMSPriority=2'.

Example 1

Figure 22:
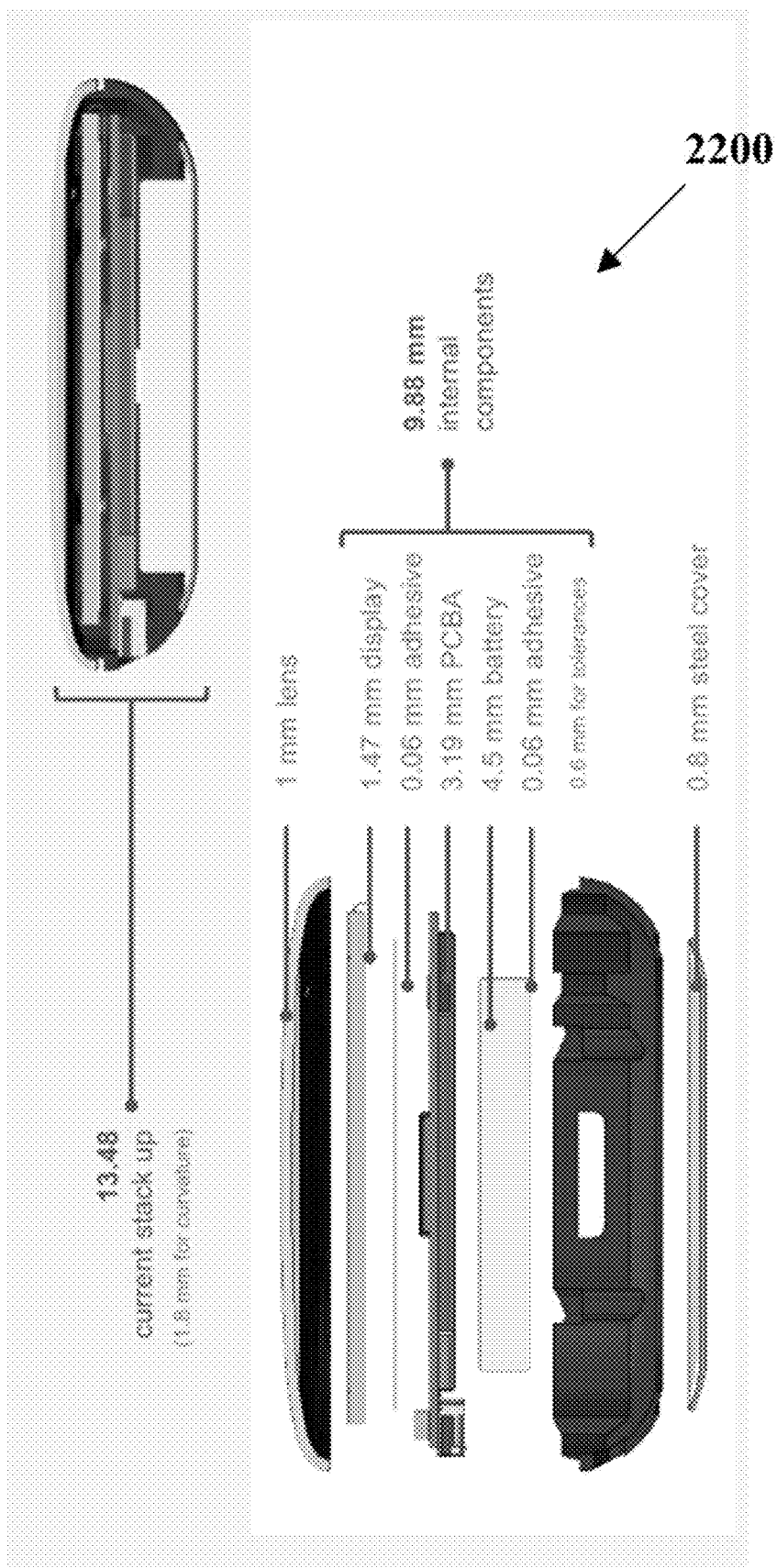
FIG. 22 shows a display device that is configured to display media selected by a user.

FIG. 22 shows a display device 2200 that is configured to display media selected by a user. FIG. 22 shows an exploded side view of the display device. The display device includes a circular display, printed circuit board assembly (PCBA), battery, a back housing (or carrier) and steel cover. The display device has a thickness of about 13.48 millimeter. The internal components (i.e., display, PCBA and battery) have a thickness of about 9.88 mm. The display device 2200 may be as described in PCT/US2015/041308 ("WEARABLE DISPLAY DEVICES"), which is entirely incorporated herein by reference.

Example 2

Figure 33:
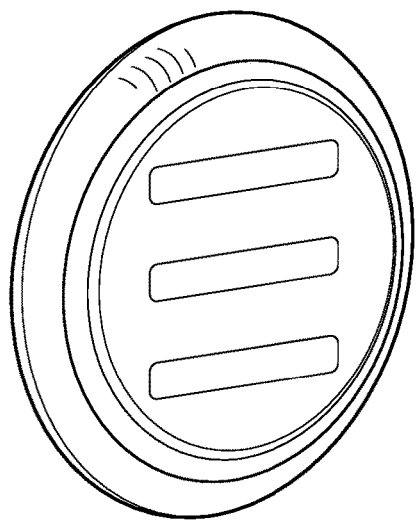
FIG. 33 shows an example of a wearable device that is a button.
Figure 33:
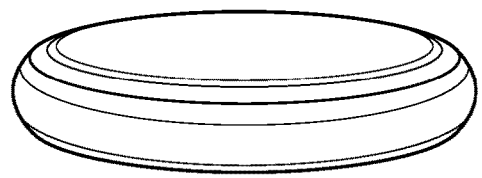
Figure 33:
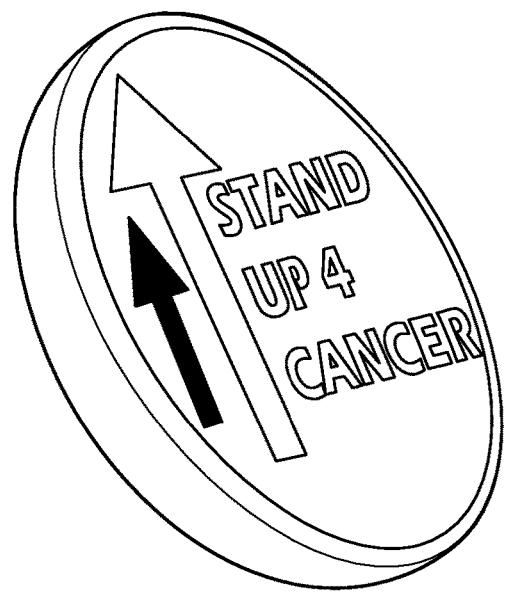
Figure 33:
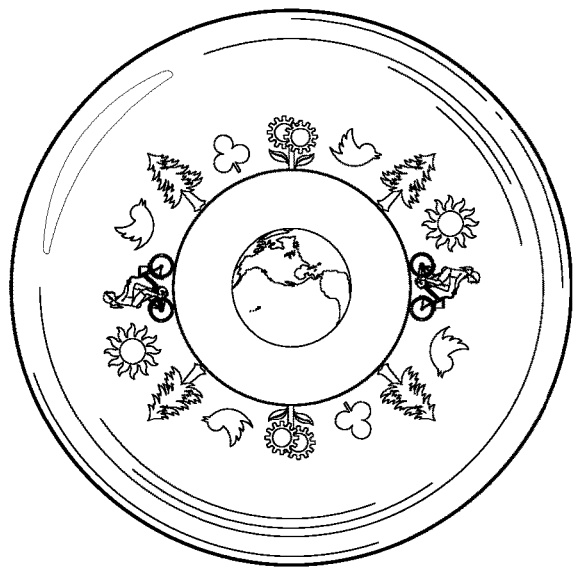
Figure 37:
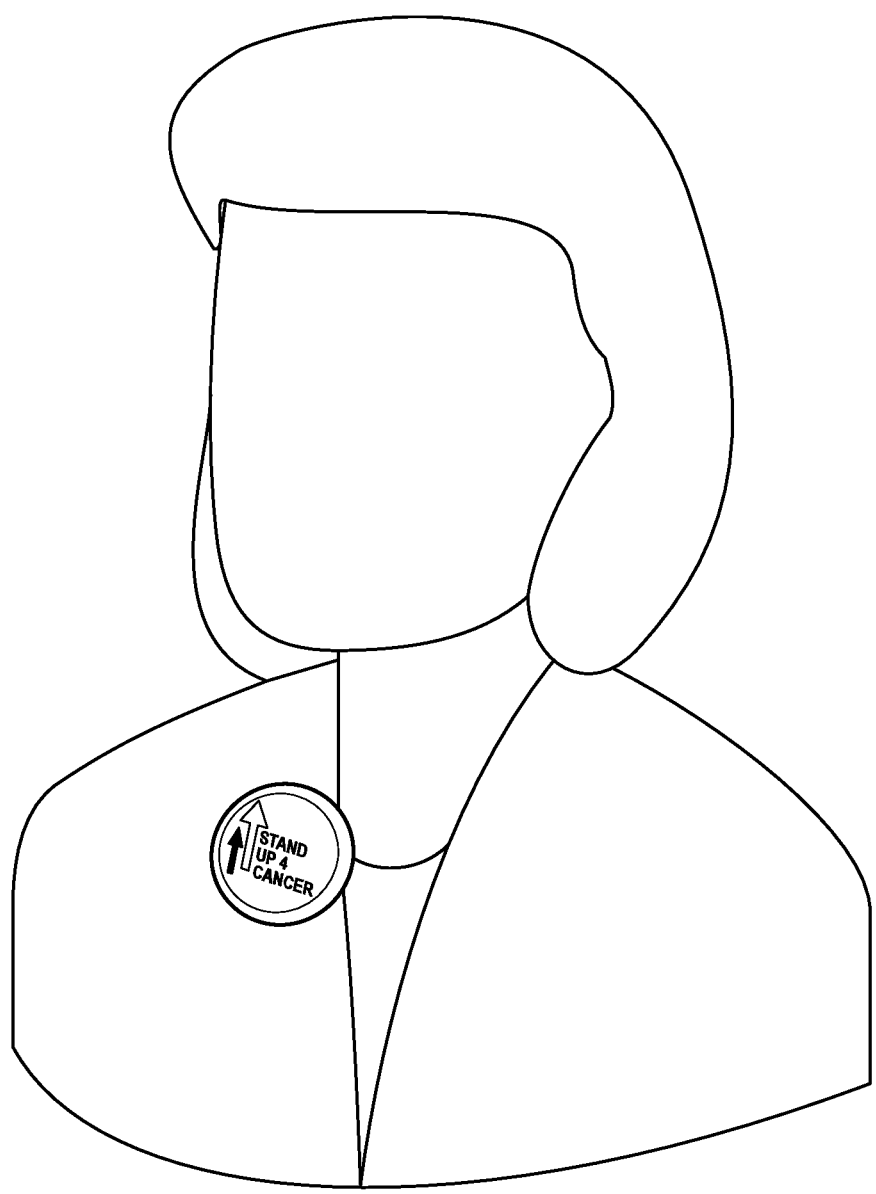
FIG. 37 shows a user wearing a wearable device on a shirt of the user.

The present disclosure provides various non-limiting examples of display devices. The display devices can be wearable devices. The display devices can be mountable on a user or an inanimate object. FIG. 33 shows examples of a wearable device of a user that is in the form of a button. A display screen of the wearable device shows expressions (e.g., three bands or "STAND UP TO CANCER" with arrows, and "Save the Planet"), including media (e.g., arrows, trees and bicycle). The expressions may be retrieved from an electronic device of the user. The expressions may be created on the electronic device or downloaded from another system or device, such as a server. FIG. 37 shows the user wearing the wearable device on a shirt of the user.

Figure 34:
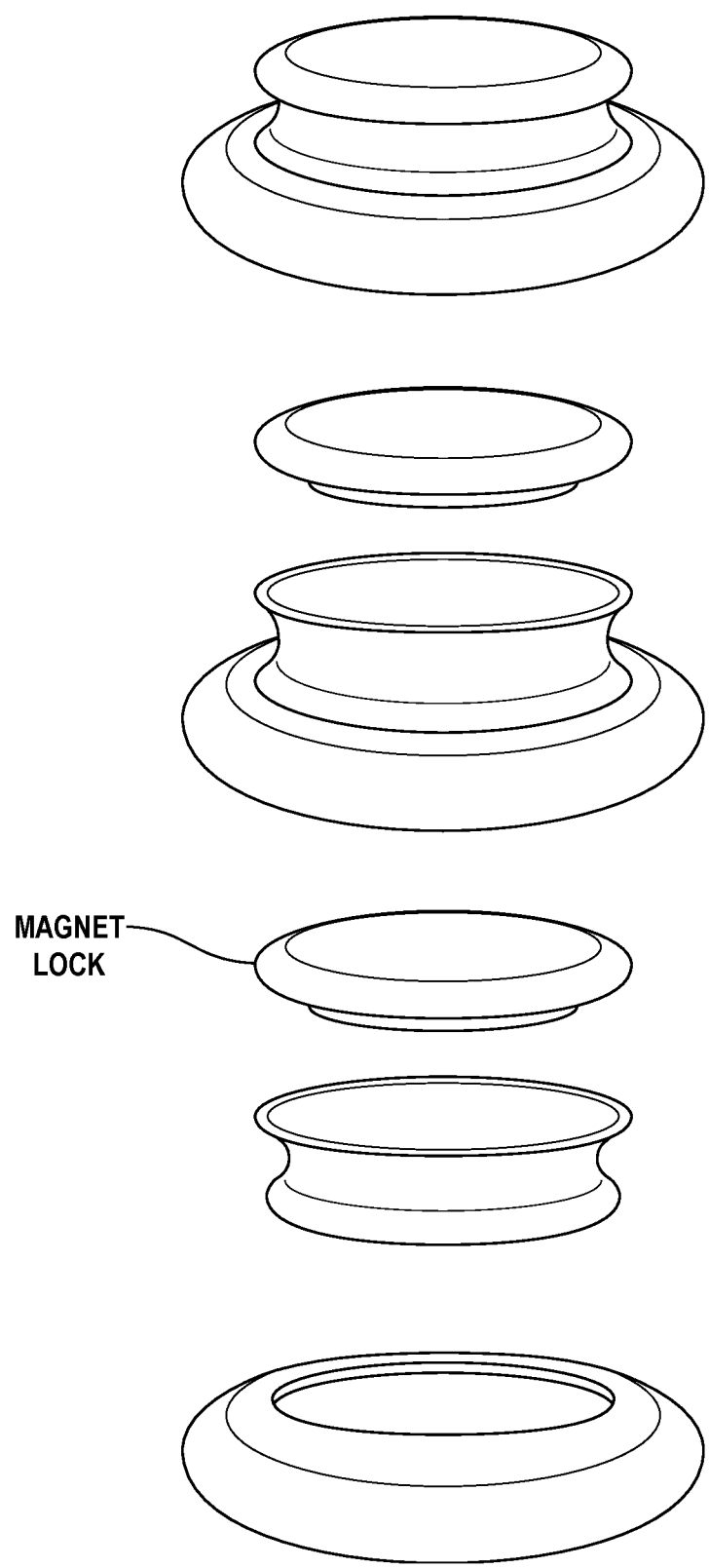
FIG. 34 shows an example of a wearable device with a magnetic attachment.

FIG. 34 shows a wearable device with a magnetic attachment, including a magnetic lock. The magnetic attachment can permit the wearable device to be secured against an article of clothing of the user.

Figure 35:
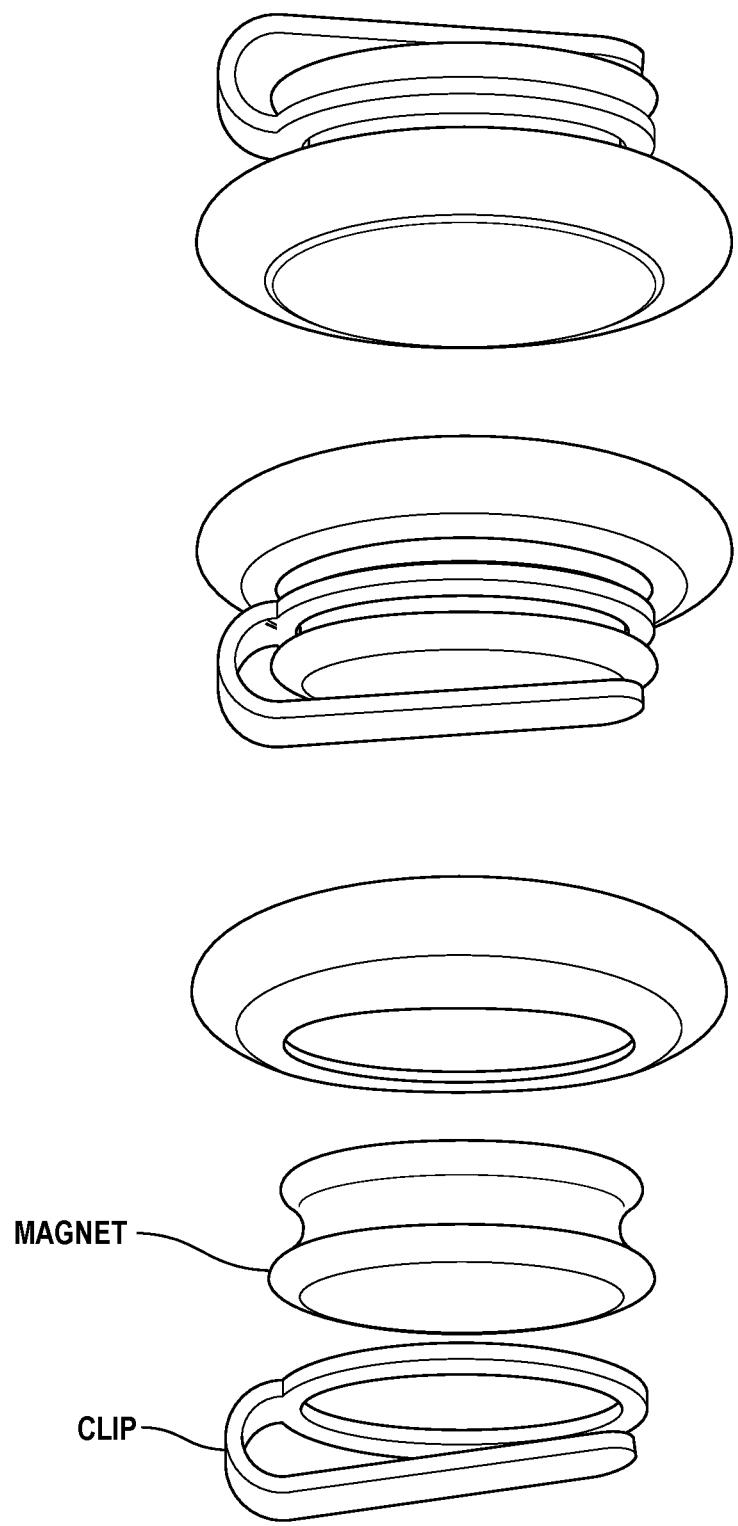
FIG. 35 shows an example of a wearable device with a clip.

FIG. 35 shows a wearable device with a clip. The clip can permit the wearable device to be secured against an article of clothing of the user, or another object (e.g., bag).

Figure 36:
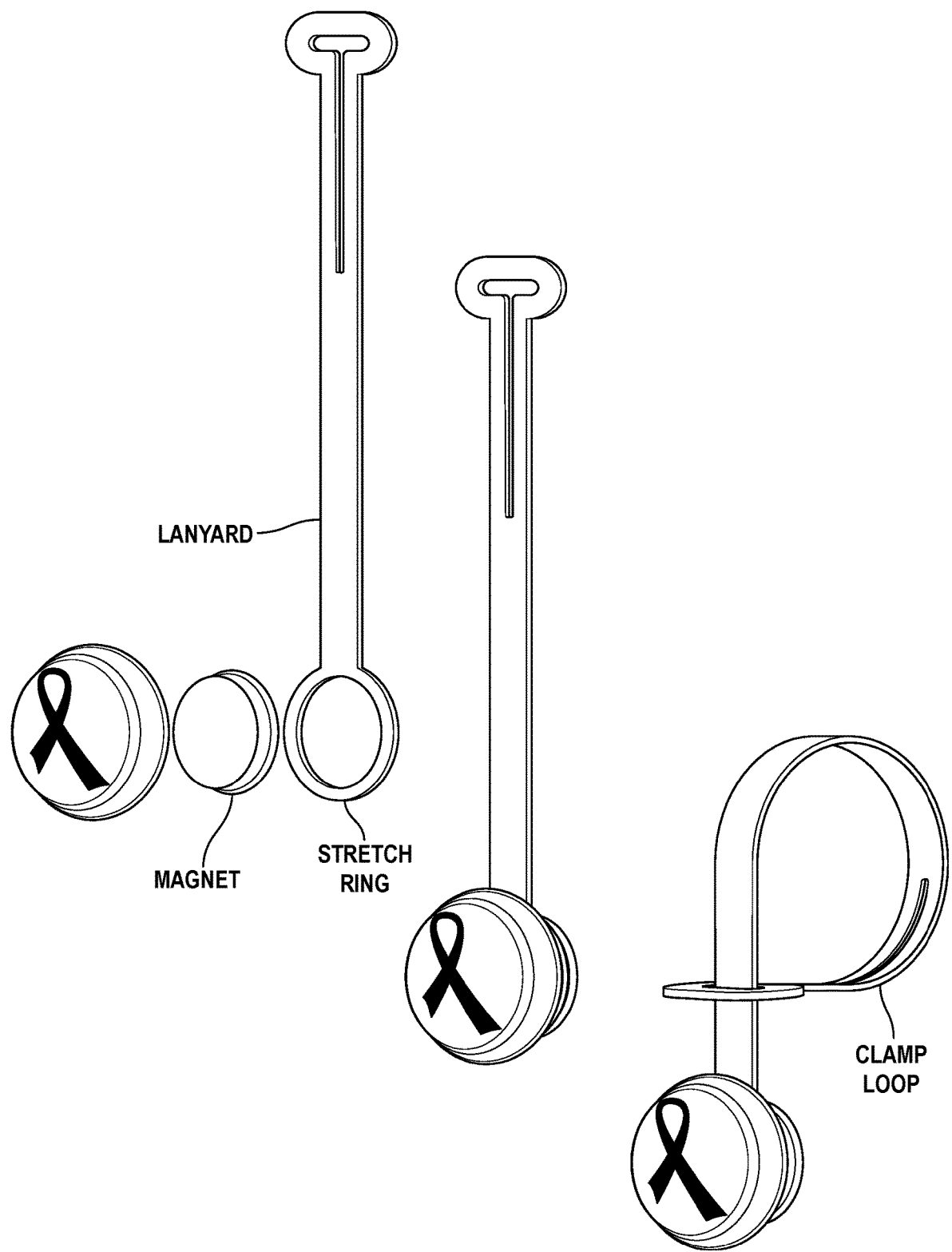
FIG. 36 shows an example of a wearable device with a lanyard.

FIG. 36 shows a wearable device with a lanyard. The lanyard can permit the wearable device to be secured against the user or another object (e.g., bag).

Figure 38:
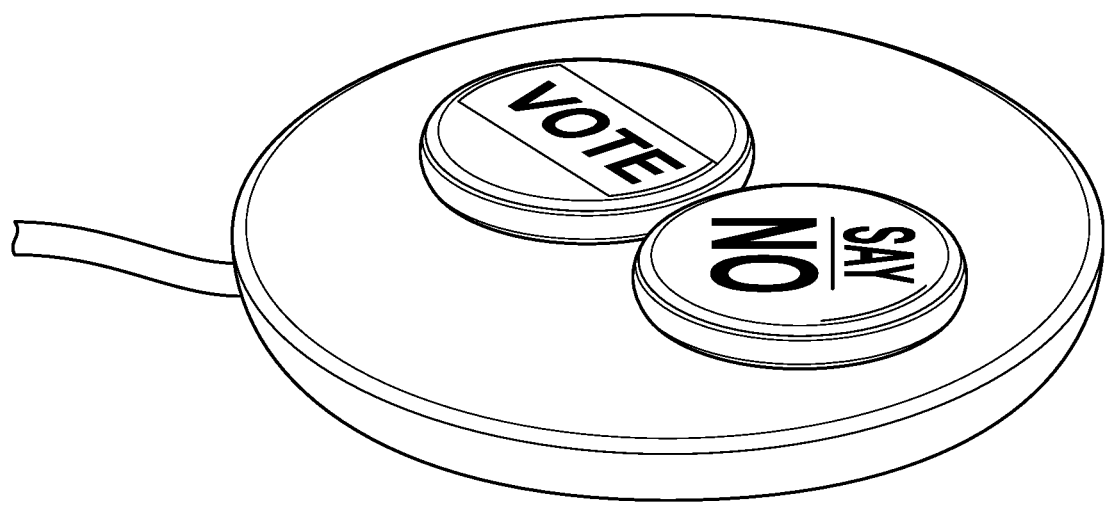
FIG. 38 shows a charger for charging a wearable device.

FIG. 38 shows a charger with an inductive charging area for charging a wearable device. The user may deposit the wearable device in the charging area for automatic charging.

Figure 39A:
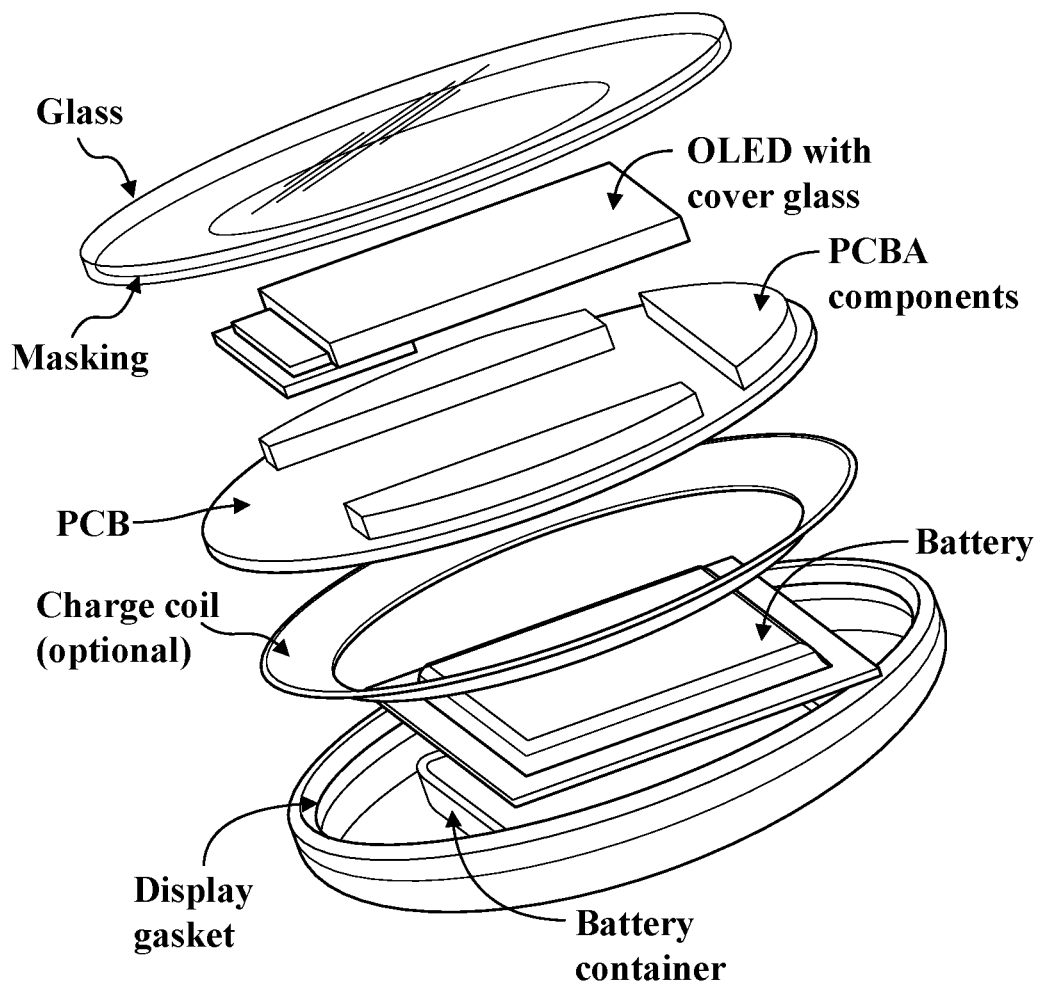
FIGS. 39A and 39B show exploded views of another example of a wearable device.
Figure 39B:
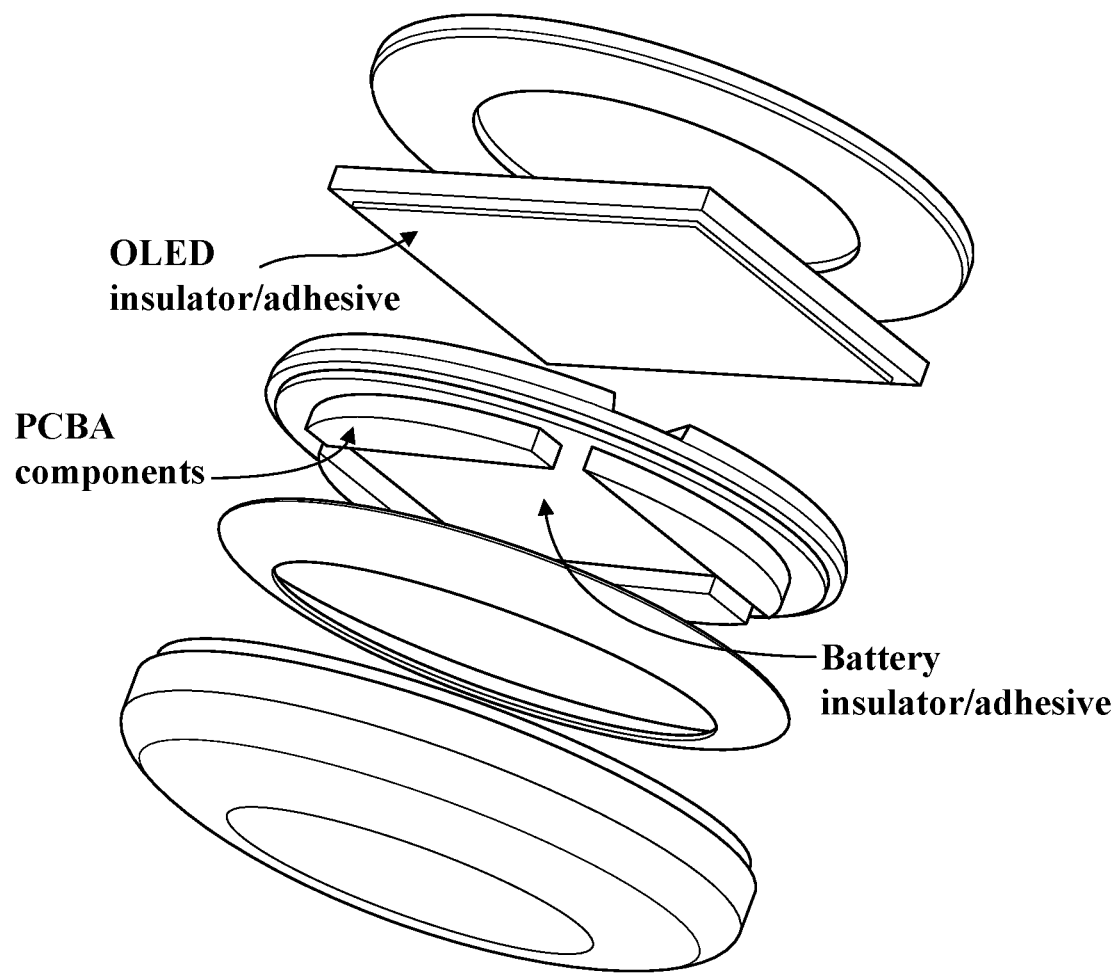

FIGS. 39A and 39B show exploded views of another example of a wearable device. The wearable device includes a light emitting diode (LED) display, which can be an OLED. The wearable device can include a charge coil for inductive charging.

Figure 40A:
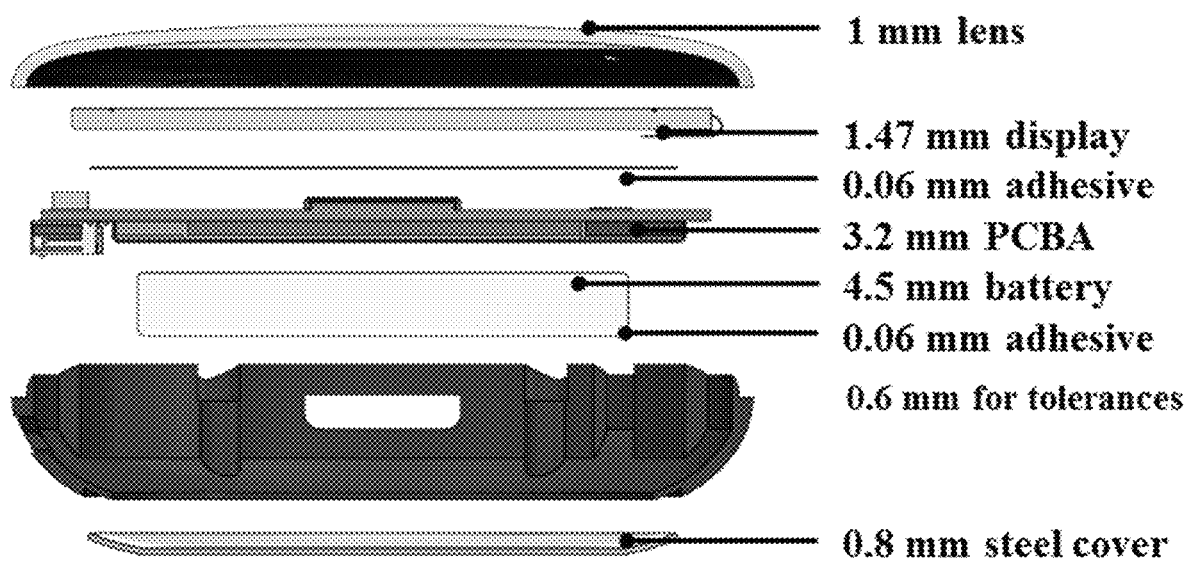
FIGS. 40A and 40B show exploded side and cross-section views, respectively, of another example of a wearable device.
Figure 40B:
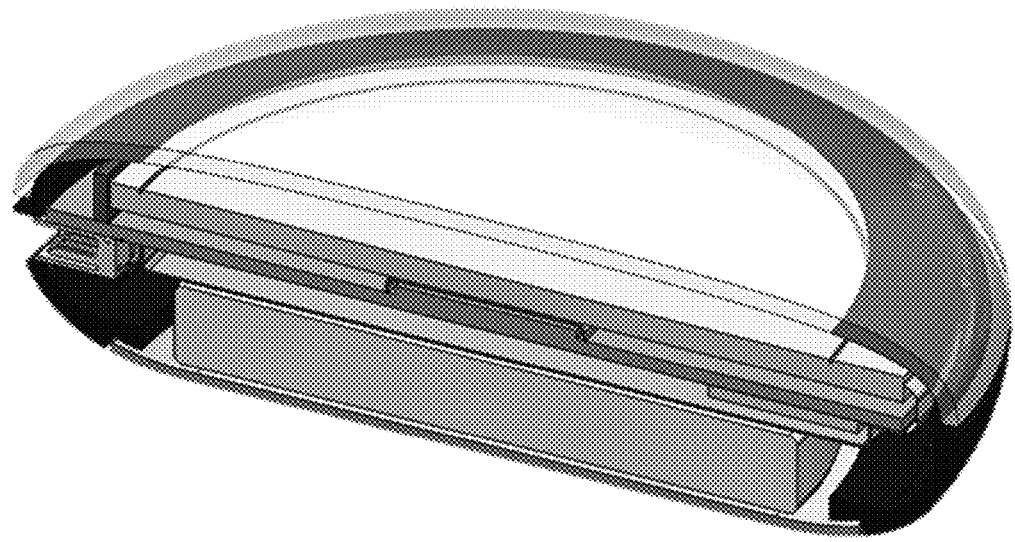

FIGS. 40A and 40B show exploded side and cross-section views, respectively, of another example of a wearable device. The wearable device includes a 1 millimeter (mm) lens adjacent to a 1.47 mm display.

Figure 41A:
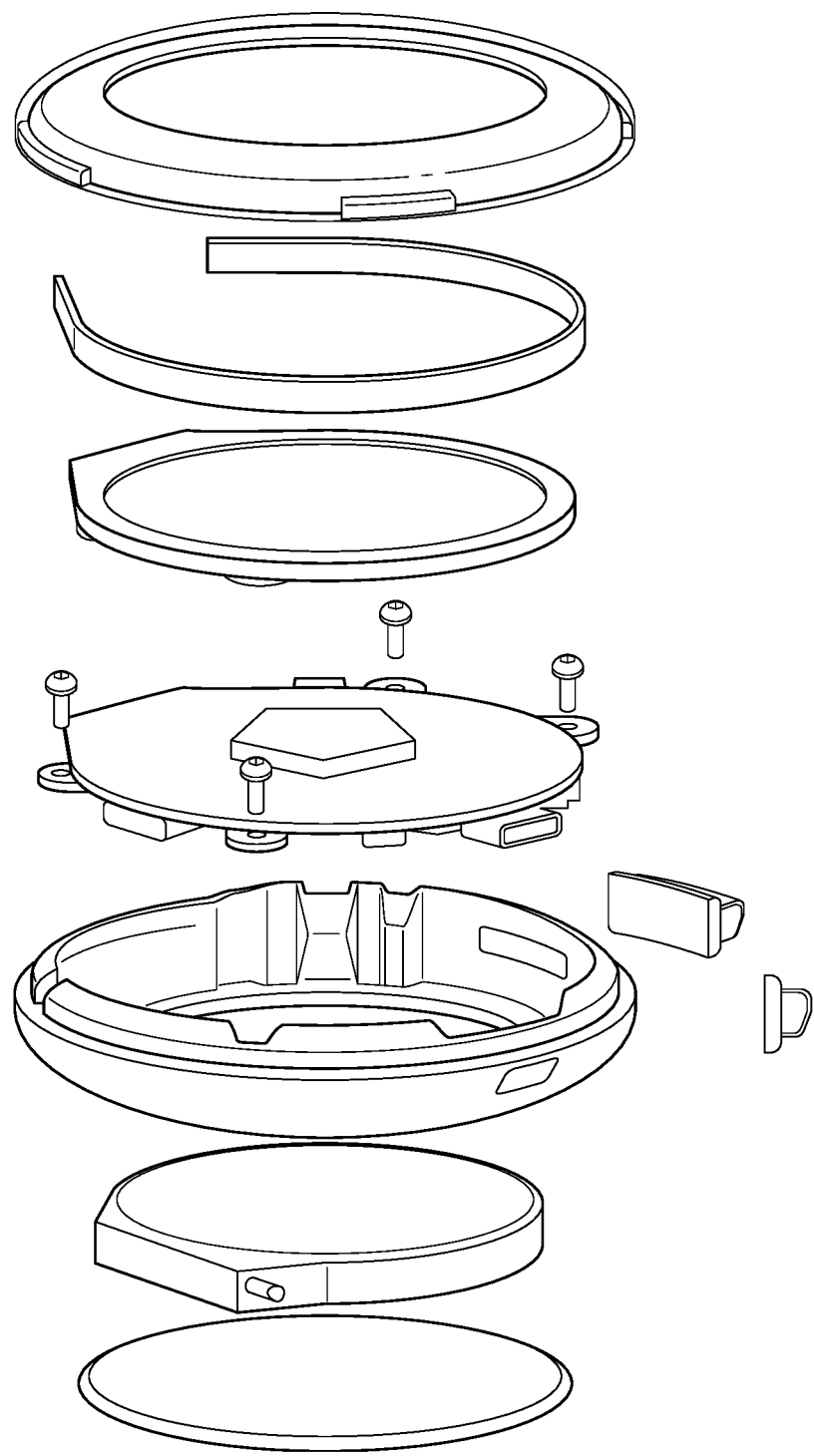
FIGS. 41A and 41B show schematics of another example of a wearable device.
Figure 41B:
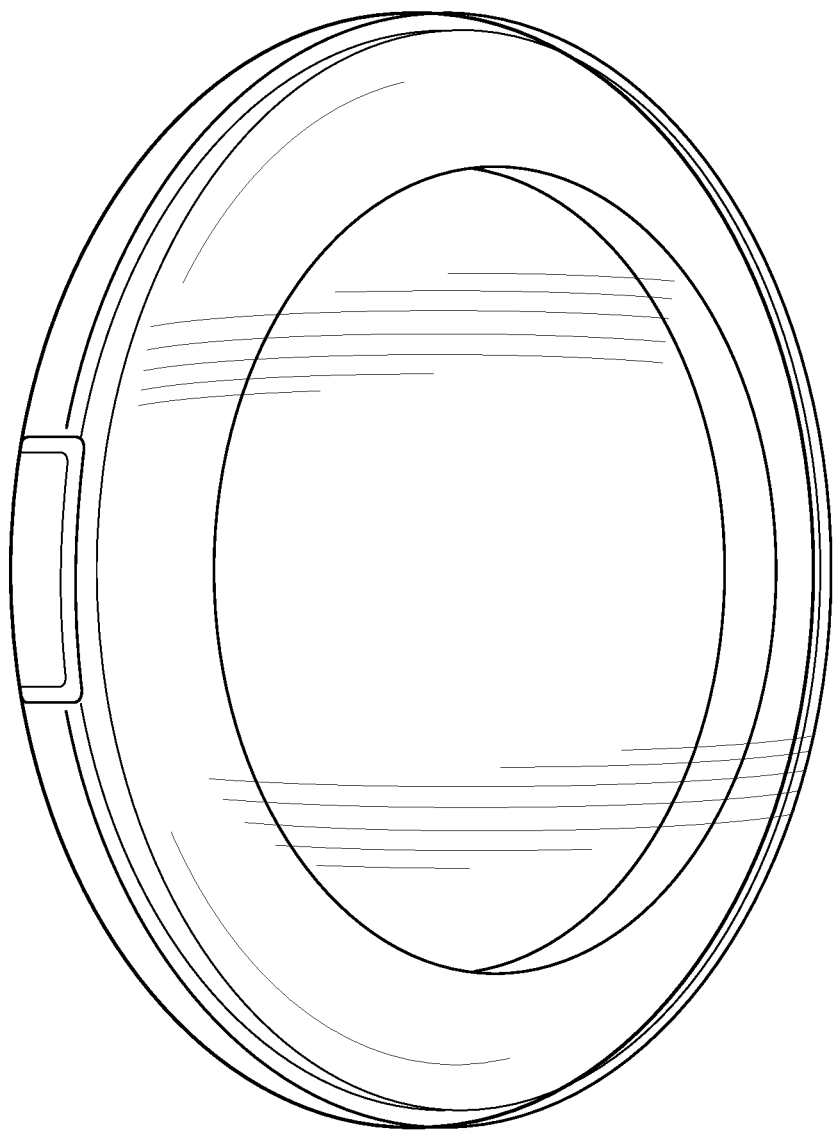

FIGS. 41A and 41B show schematics of another example of a wearable device. FIG. 41A is an exploded side view of another example of a wearable device. FIG. 41B is an angled view of the wearable device. The wearable device is in the form of a round button, though other shapes may be used.

Figure 42:
FIG. 42 shows a display device mounted on a rear windshield of a vehicle.

FIG. 42 shows a display device mounted on a rear windshield of a vehicle. The display device is circular, but other shapes may be used. For example, the display device can be triangular, square or rectangular. The display device can be mounted on various locations of the vehicle, including, without limitation, the bumper (e.g., the display device can be a bumper sticker).

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

The invention claimed is:

1. A method for customizing a digital button, comprising:
communicatively coupling, by a media server, to a mobile device of a user;
identifying, by the media server, one or more interests of the user based on a profile of the user associated with a user account at the media server;
selecting, by the media server, one or more media objects stored by the media server based on the identified one or more interests of the user; and
transmitting, by the media server, the selected media objects to the mobile device of the user, wherein said the mobile device configured to organize a subset of the selected media objects into a queue and to provide the organized subset of selected media objects to the digital button, the digital button configured to display the subset of selected media objects in an order defined by the queue.

2. The method of claim 1, wherein the digital button comprises a curvilinear display, and wherein each selected media object is formatted into dimensions corresponding to the curvilinear display.

3. The method of claim 1, wherein the media server comprises a social networking system server, and wherein the profile of the user comprises a user profile corresponding to the social networking system.

4. The method of claim 1, wherein the selection of the one or more media objects is performed in response to a triggering event.

5. The method of claim 1, wherein the digital button comprises attachment means on a side opposite a display of the digital button such that when the digital button is attached to an object, person, or surface, the selected media objects are displayed outward and away from the digital object, person, or surface.

6. The method of claim 1, wherein selecting one or more media objects based on the identified one or more interests of the user comprises selecting media objects stored by the media server that are determined to be relevant to the one or more interests of the user.

7. The method of claim 1, wherein selecting one or more media objects based on the identified one or more interests of the user comprises selecting media objects stored by the media server that have been selected by additional users connected to the user.

8. A method for customizing a digital button, comprising:
communicatively coupling, by a media server, to a mobile device of a user, the mobile device communicatively coupled to the digital button;
in response to detecting a triggering event, selecting, by the media server, one or more media objects stored by the media server; and
transmitting, by the media server, the selected media objects to the mobile device, the mobile device configured to organize a subset of the selected media objects into a queue and to provide the organized subset of the selected media objects to the digital button, the digital button configured to display the subset of selected media objects in an order defined by the queue.

9. The method of claim 8, wherein the digital button comprises a curvilinear display, and wherein each selected media object is formatted into dimensions corresponding to the curvilinear display.

10. The method of claim 8, wherein the triggering event comprises an action taken by the user, and wherein the one or more media objects are selected based on the action taken by the user.

11. The method of claim 8, wherein the triggering event comprises an action taken by a person other than the user, and wherein the one or more media objects are selected based on the action taken by the person other than the user.

12. The method of claim 8, wherein the triggering event comprises receiving a communication, and wherein the one or more media objects are selected based on content of the received communication.

13. The method of claim 8, wherein the digital button comprises attachment means on a side opposite a display of the digital button such that when the digital button is attached to an object, person, or surface, the selected media objects are displayed outward and away from the digital object, person, or surface.

14. A non-transitory computer-readable storage medium storing executable computer instructions for customizing a digital button, the instructions configured to, when executed by a processor, perform steps comprising:
communicatively coupling, by a media server, to a mobile device of a user;
identifying, by the media server, one or more interests of the user based on a profile of the user associated with a user account at the media server;
selecting, by the media server, one or more media objects stored by the media server based on the identified one or more interests of the user; and
transmitting, by the media server, the selected media objects to the mobile device of the user, wherein said the mobile device configured to organize a subset of the selected media objects into a queue and to provide the organized subset of selected media objects to the digital button, the digital button configured to display the subset of selected media objects in an order defined by the queue.

15. The non-transitory computer-readable storage medium of claim 14, wherein the digital button comprises a curvilinear display, and wherein each selected media object is formatted into dimensions corresponding to the curvilinear display.

16. The non-transitory computer-readable storage medium of claim 14, wherein the media server comprises a social networking system server, and wherein the profile of the user comprises a user profile corresponding to the social networking system.

17. The non-transitory computer-readable storage medium of claim 14, wherein the selection of the one or more media objects is performed in response to a triggering event.

18. The non-transitory computer-readable storage medium of claim 14, wherein the digital button comprises attachment means on a side opposite a display of the digital button such that when the digital button is attached to an object, person, or surface, the selected media objects are displayed outward and away from the digital object, person, or surface.

19. The non-transitory computer-readable storage medium of claim 14, wherein selecting one or more media objects based on the identified one or more interests of the user comprises selecting media objects stored by the media server that are determined to be relevant to the one or more interests of the user.

20. The non-transitory computer-readable storage medium of claim 14, wherein selecting one or more media objects based on the identified one or more interests of the user comprises selecting media objects stored by the media server that have been selected by additional users connected to the user.

* * * * *